(12) United States Patent
Kawarago et al.

(10) Patent No.: US 10,329,106 B2
(45) Date of Patent: Jun. 25, 2019

(54) SHEET FEEDING DEVICE

(71) Applicant: CANON KABUSHIKI KAISHA, Tokyo (JP)

(72) Inventors: Atsushi Kawarago, Suntou-gun (JP); Fumiaki Mizuno, Suntou-gun (JP); Yuta Hojo, Suntou-gun (JP); Takao Nada, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/370,334

(22) Filed: Dec. 6, 2016

(65) Prior Publication Data
US 2017/0166411 A1 Jun. 15, 2017

(30) Foreign Application Priority Data
Dec. 10, 2015 (JP) .................................. 2015-241223

(51) Int. Cl.
B65H 3/06 (2006.01)
B65H 5/06 (2006.01)
(Continued)

(52) U.S. Cl.
CPC .............. B65H 3/0669 (2013.01); B65H 3/46 (2013.01); B65H 3/5261 (2013.01); B65H 5/062 (2013.01); B65H 7/02 (2013.01); B65H 7/12 (2013.01); H04N 1/0066 (2013.01); H04N 1/00602 (2013.01); H04N 1/00631 (2013.01);
(Continued)

(58) Field of Classification Search
CPC ... B65H 7/12; B65H 7/02; B65H 3/46; B65H 3/0669; B65H 2403/732
See application file for complete search history.

(56) References Cited

U.S. PATENT DOCUMENTS 4,203,586 A * 5/1980 Hoyer ...................... B65H 7/12
271/122
6,783,126 B2 8/2004 Amamoto
(Continued)

FOREIGN PATENT DOCUMENTS

CN 1427310 A 7/2003
CN 1590259 A 3/2005
(Continued)

OTHER PUBLICATIONS

Translated Japanese Office action dated May 31, 2017.*
(Continued)

Primary Examiner — Patrick Cicchino
(74) Attorney, Agent, or Firm — Venable LLP

(57) ABSTRACT

A sheet feeding device includes a stacking portion, a first roller, a second roller, a third roller rotatable to provide peripheral movement in a predetermined direction and to provide peripheral movement in a direction opposite to the predetermined direction, a detecting unit, a driving unit for executing a feeding operation by the first roller, and a control unit for providing an instruction to the driving unit so as to continue or stop the feeding operation. The predetermined rotational frequency is larger than 0 and is smaller than a rotational frequency of the third roller in a period in which the third roller is rotated in the predetermined direction in a state in which a single recording material is fed to the nip.

18 Claims, 25 Drawing Sheets

(51) Int. Cl.
*B65H 7/02* (2006.01)
*B65H 7/12* (2006.01)
*B65H 3/52* (2006.01)
*H04N 1/00* (2006.01)
*B65H 3/46* (2006.01)

(52) U.S. Cl.
CPC .. *B65H 2403/724* (2013.01); *B65H 2403/732* (2013.01); *B65H 2511/33* (2013.01); *B65H 2513/11* (2013.01); *B65H 2513/512* (2013.01); *B65H 2553/00* (2013.01)

(56) References Cited

U.S. PATENT DOCUMENTS

| | | | |
|---|---|---|---|
| 7,270,326 | B2 | 9/2007 | Mitsuya et al. |
| 7,416,180 | B2 | 8/2008 | Mitsuya et al. |
| 7,429,040 | B2 * | 9/2008 | Ueda ............... B65H 3/0623 271/10.03 |
| 7,591,460 | B2 * | 9/2009 | Ohshima ............ B65H 7/12 271/110 |
| 7,658,374 | B2 | 2/2010 | Yasukawa et al. |
| 7,717,416 | B2 | 5/2010 | Mitsuya et al. |
| 7,887,043 | B2 * | 2/2011 | Takamori ........... B65H 3/0684 271/121 |
| 8,177,228 | B2 | 5/2012 | Nützel et al. |
| 8,430,392 | B2 | 4/2013 | Nada et al. |
| 8,430,393 | B2 * | 4/2013 | Matsushima ........ B65H 1/266 271/10.01 |
| 9,359,159 | B2 * | 6/2016 | Noda .................. B65H 7/14 |
| 2003/0116906 | A1 | 6/2003 | Amamoto |
| 2005/0082739 | A1 | 4/2005 | Mitsuya et al. |
| 2006/0214356 | A1 | 9/2006 | Yasukawa et al. |
| 2007/0085262 | A1 | 4/2007 | Mitsuya et al. |
| 2007/0096385 | A1 * | 5/2007 | Mandel ............. B65H 3/5261 271/122 |
| 2007/0210506 | A1 | 9/2007 | Mitsuya et al. |
| 2009/0152800 | A1 | 6/2009 | Nützel et al. |
| 2011/0006469 | A1 | 1/2011 | Matsushima et al. |
| 2011/0278790 | A1 * | 11/2011 | Yamagishi ........... B65H 3/063 271/265.01 |
| 2012/0262746 | A1 * | 10/2012 | Hanabusa ........... H04N 1/00588 358/1.12 |
| 2013/0001852 | A1 * | 1/2013 | Ogasawara ......... B65H 3/5261 271/3.14 |
| 2015/0048566 | A1 * | 2/2015 | Utagawa .............. B65H 1/14 271/10.02 |
| 2016/0347563 | A1 * | 12/2016 | Takuwa ................ B65H 7/20 |

FOREIGN PATENT DOCUMENTS

| | | | |
|---|---|---|---|
| CN | 1817770 | A | 8/2006 |
| CN | 101896413 | A | 11/2010 |
| JP | 07-172600 | A | 7/1995 |
| JP | 2000-177868 | A | 6/2000 |
| JP | 2002-338070 | A | 11/2002 |
| JP | 2005-075630 | A | 3/2005 |
| JP | 2011-057384 | A | 3/2011 |
| JP | 2014-156354 | A | 9/2014 |
| JP | 2014-177326 | A | 9/2014 |
| JP | 2014177326 | A * | 9/2014 |
| WO | 2011007406 | A1 | 1/2011 |

OTHER PUBLICATIONS

Copending, unpublished U.S. Appl. No. 15/291,170 to Ryuichi Umehara, dated Oct. 12, 2016.
Copending, unpublished U.S. Appl. No. 15/352,974 to Yuta Hojo, dated Nov. 16, 2016.
Copending, unpublished U.S. Appl. No. 15/404,529 to Masatoshi Yoshida, dated Jan. 12, 2017.
European Search Report issued in corresponding European Application No. 16201071.7 dated May 12, 2017.
European Search Report issued in corresponding European Application No. 16201041.7 dated May 12, 2017.
Japanese Office action dated Jun. 6, 2017 in corresponding Japanese Application No. 2015-241223.
Nov. 1, 2018 Chinese Official Action in Chinese Patent Appln. No. 201611129115.6.
Ryuichi Umehara et al., U.S. Appl. No. 15/291,170, filed Oct. 12, 2016.
Yuta Hojo, U.S. Appl. No. 15/352,974, filed Nov. 16, 2016.
Masatoshi Yoshida, U.S. Appl. No. 15/404,529, filed Jan. 12, 2017.

* cited by examiner (a)

(b)

(a)

(b)

SHEET FEEDING DEVICE

FIELD OF THE INVENTION AND RELATED ART

The present invention relates to a sheet feeding device (paper feeding device) and an image forming apparatus, such as a copying machine, a printer or a facsimile machine, and particularly relates to a technique capable of reducing sheet feeding variation and shortening a sheet feeding interval.

In a conventional sheet feeding device for use with the image forming apparatus such as the copying machine, the printer or the facsimile machine, as one of sheet feeding types, a retard roller type has been used. FIGS. 22 and 23 are schematic views for illustrating a conventional image forming apparatus 100 and sheet feeding device 101 using the retard roller type. In such a retard roller type, even in the case where a sheet S1 and a sheet S2 are fed doubly as shown in (f) of FIG. 23, the uppermost sheet S1 is capable of being separated and fed one by one.

In order to improve productivity in the sheet feeding device 101, a method of shortening a sheet interval is selected. When a state of (h) of FIG. 23 and a state of (c) of FIG. 23 are compared with each other, a leading end position of the uppermost sheet S2 (sheet S1 in (c) of FIG. 23) moves to a downstream state with respect to a feeding direction P. This movement amount generates due to a difference in frictional force among stacked sheets S and depends on a kind of the sheets S, a stacking manner, an environmental condition and the like, so that it is difficult to control the movement amount. That is, the leading end position of the sheet during start of the sheet feeding causes a variation in a range from the leading end of the sheets S stacked in a sheet feeding cassette 15 to a separation nip (distance Ld shown by a double-pointed arrow in (h) of FIG. 23) (hereinafter, this variation is referred to as a sheet feeding variation Ld). For this reason, the sheet interval was required to be not less than (at least) the sheet feeding variation Ld. Therefore, in order to reduce a degree of the sheet feeding variation, a constitution in which the leading end position of the sheet during start of the sheet feeding is uniformized has been proposed (for example, International Publication No. 2011/007406).

In each of FIGS. 24 and 25, (a) to (c) are schematic views for illustrating a sheet feeding device 201 using a type disclosed in International Publication No. 2011/007406. In the constitution shown in (a) to (c) of each of FIGS. 24 and 25, rotation of a retard roller 207 is detected during sheet feeding of an uppermost sheet S1, and drive of a sheet feeding (device) drive is stopped in synchronism with rotation stop or reverse rotation of the retard roller 207. As a result, a lower sheet S2 can be fed to a separation nip. For this reason, the sheet feeding variation Ld generated in the conventional constitution can be reduced.

However, in order to further narrow the sheet interval during the sheet feeding, there is a problem regarding a time required for detecting the rotation stop of the retard roller 207. As shown in (d) of FIG. 24, when the sheets S1 and S2 are fed to the separation nip in a state in which a trailing end of the sheet S1 and a leading end of the sheet S2 overlaps with each other, the retard roller 207 finally stops due to a rotational load of a torque limiter. At this time, the retard roller 207 gradually decelerates toward stop from rotation in the feeding direction P at a rotational speed somewhat slower than a feeding speed of the sheet S1, and therefore it takes time to stop the retard roller 207. When the time to stop the retard roller 207 becomes long, during feeding of the sheet S2 placed under the sheet S1, there is a liability that a feeding operation of the sheet S2 is influenced. For example, in the case where a basis weight of the sheet S is small (e.g., in the case of thin paper), there is a liability that a loop as shown in (d) of FIG. 25 generates. Further, for example, in the case where the basis weight of the sheet S is large (in the case of thick paper), as shown in (e) of FIG. 25, there is also a liability that the leading end of the sheet S2 overshoots the separation nip. In order to suppress such a phenomenon, it would be also considered that a constitution in which a pick roller 205 and the retard roller 207 are interrelated with each other is employed, but an adjustable range of respective parameters such as a rotational load or the like of the pick roller 205 becomes narrow, so that there is a liability that it becomes difficult to compatibly realize a fed sheet separating performance and durability or the like inexpensively.

SUMMARY OF THE INVENTION

The present invention has been accomplished in the above-described circumstances. A principal object of the present invention is to reduce a degree of a variation in leading end position of a sheet and shorten a sheet feeding interval when sheets are fed.

According to an aspect of the present invention, there is provided a sheet feeding device comprising: a stacking portion for stacking a recording material; a first roller for feeding the recording material stacked on the stacking portion; a second roller for feeding the recording material fed by the first feeding roller; a third roller for forming a nip in cooperation with the second roller, wherein the third roller is rotated to provide peripheral movement in a predetermined direction so as to feed a single recording material when the single recording material is fed to the nip and is stopped in rotation and is rotated to provide peripheral movement in a direction opposite to the predetermined direction when a plurality of sheets of recording materials are fed to the nip; a detecting unit for detecting a rotational frequency per unit time of the third roller; a driving unit for executing a feeding operation by the first roller; and a control unit for providing an instruction to the driving unit so as to continue the feeding operation when the rotational frequency of the third roller detected by detecting unit is larger than a predetermined rotational frequency and so as to stop the feeding operation when the rotational frequency of the third roller is smaller than the predetermined rotational frequency, wherein the predetermined rotational frequency is larger than 0 and is smaller than the rotational frequency of the third roller in a period in which the third roller is rotated in the predetermined direction in a state in which the single recording material is fed to the nip.

Further features of the present invention will become apparent from the following description of exemplary embodiments with reference to the attached drawings.

DESCRIPTION OF THE EMBODIMENTS

Embodiments of the present invention will be specifically described with reference to the drawings. Dimensions, materials, shapes and relative arrangements of constituent elements described in the following embodiments should be appropriately be changed depending on structures and various conditions of devices (apparatuses) to which the present invention is applied, and therefore, the scope of the present invention is not intended to be limited to the following embodiments.

[Conventional Sheet Feeding Type]

Figure 22:
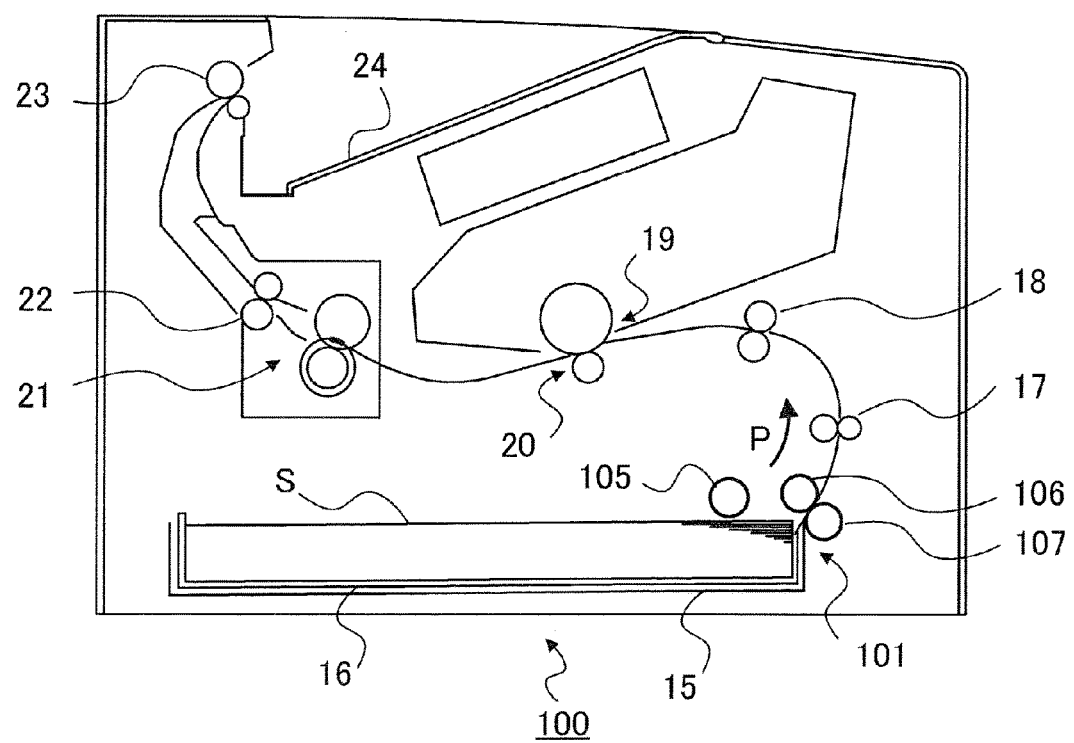
FIG. 22 is a schematic sectional view showing an image forming apparatus in a conventional example.
Figure 23:
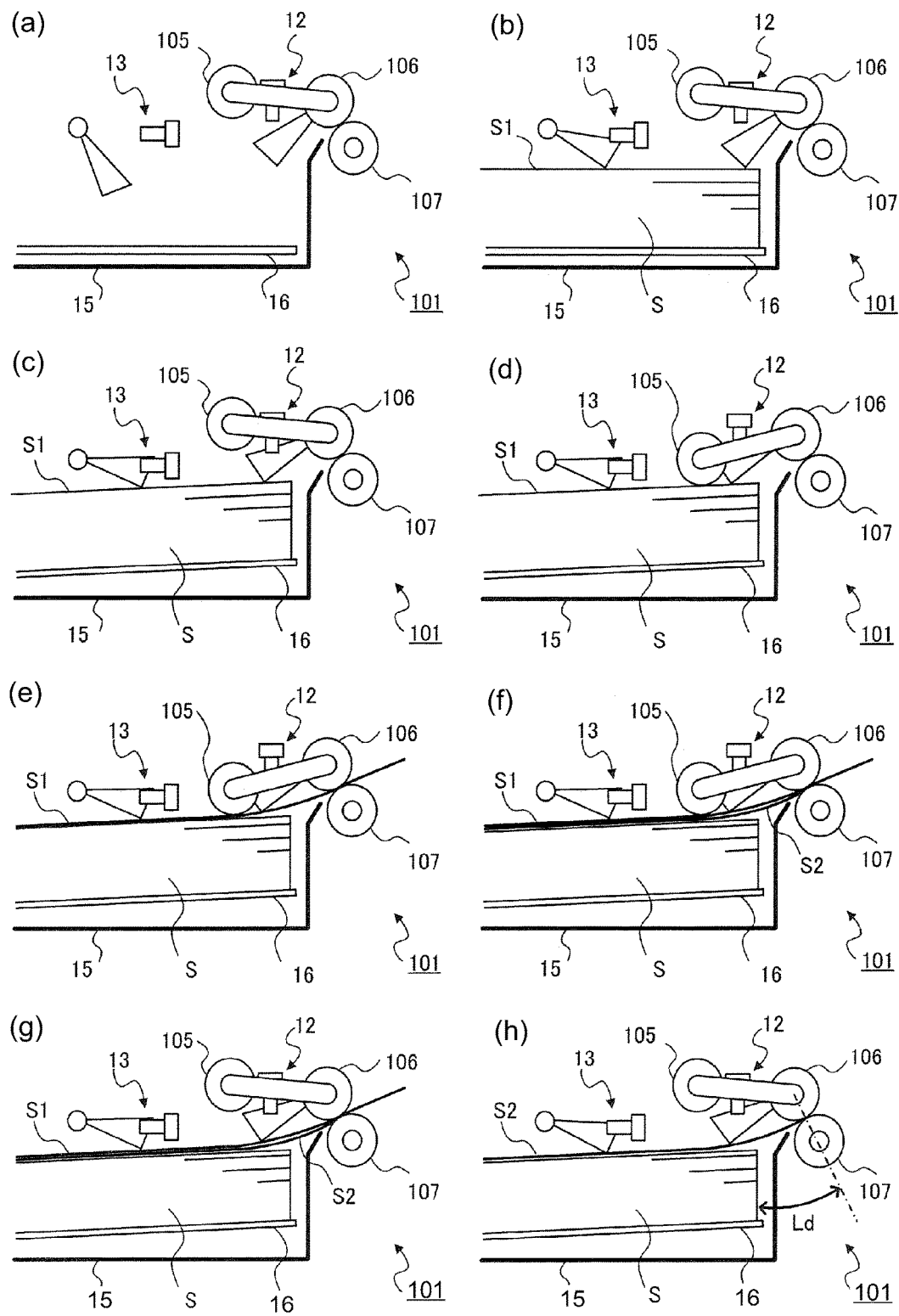
In FIG. 23, (a) to (h) are schematic views showing a sheet feeding device in the conventional example.

The conventional sheet feeding device 101 of the image forming apparatus 100 such as the copying machine, the printer or the facsimile machine will be described. In the conventional sheet feeding device 101, as one of sheet feeding types, the retard roller type is used. The image forming apparatus 100 and the sheet feeding device 101 which will use the retard roller type will be described with reference to FIGS. 22 and 23. FIG. 23 is a schematic sectional view showing the conventional image forming apparatus 100 using the retard roller type. In FIG. 23, (a) is a partially schematic sectional view showing the sheet feeding device 101 before sheets S are set, and (b) is a partially schematic sectional view showing the sheet feeding device 101 after the sheets S are set. Incidentally, of the sheets S, an uppermost sheet is S1 and a sheet subsequent to the sheet S1 is S2. In FIG. 23, (c) is a partially schematic sectional view showing the sheet feeding device 101 after the intermediary plate 16 rises, (d) is a partially schematic sectional view showing the sheet feeding device 101 after sheet feeding drive is started, (e) is a partially schematic sectional view showing the sheet feeding device 101 during feeding of the sheet S1, (f) is a partially schematic sectional view showing the sheet feeding device 101 during separation between the sheet S1 and the sheet S2, (g) is a partially schematic sectional view showing the sheet feeding device 101 after the sheet feeding drive is stopped, and (h) is a partially schematic sectional view showing the sheet feeding device 101 after the sheet feeding of the sheet S1 is completed.

An outline of an operation of the image forming apparatus 100 will be described with reference to FIG. 22. As shown in FIG. 22, in the image forming apparatus 100, the sheet S as the recording material stacked in the sheet feeding cassette 15 as a sheet feeding portion is subjected to a sheet feeding operation and a separating operation (hereinafter referred to as sheet feeding separation) by a pick roller 105, a feed roller separation) by a pick roller 105, a feed roller 106 and a retard roller 107. The sheet S is fed in an arrow P direction (feeding direction) in FIG. 22. The sheet S subjected to the sheet feeding separation is fed to an image forming portion 19 by a feed roller pair 17, 18, and a toner image formed by the image forming portion 19 is transferred onto the sheet S at a transfer portion 20. On the sheet S on which an unfixed toner image is transferred, the toner image is fixed at fixing portion 21, and the sheet S is discharged onto a sheet discharge tray 24 by feed roller pair 22, 23.

(Sheet Feeding Operation of Sheet Feeding Device)

Details of the operation of the sheet feeding device 101 will be described with reference to FIG. 23. The sheet feeding cassette 15 is provided detachably mountable to the image forming apparatus 100 and includes the intermediary plate 16 capable of rising and lowering while stacking the sheet S. The pick roller 105 is held at a position shown in (a) of FIG. 23 (hereinafter referred to as a retracted position) and is constituted so as not to contact the stacked sheet S when the sheet feeding cassette 15 is inserted in and pulled out Above the intermediary plate 16, a sheet (paper) surface sensor 12 for detecting a raised position of the stacked sheet S and a presence-absence sensor 13 for detecting the presence or absence of the sheet S on the intermediary plate 16 are provided.

As shown in (b) of FIG. 23, when the sheet feeding cassette 15 in which the sheets S are stacked is inserted in the image forming apparatus 100, by an unshown intermediary plate raising and lowering device, the intermediary plate 16 is raised toward the pick roller 105. As shown in (c) of FIG. 23, at the time when the intermediary plate 16 is raised to a position where the uppermost sheet 1 is suitable for the sheet feeding operation, the sheet surface sensor 12 detects the sheet S1, so that a raising operation of the intermediary plate 16 by the unshown intermediary plate raising and lowering device. Therefore, as shown in (c) of FIG. 23, the sheet S1 is held at the position suitable for the sheet feeding operation. Further, the sheet surface sensor 12 detects the sheet S and is in a sheet feedable state.

In the case where the unshown intermediary plate raising and lowering device raises the intermediary plate 16 in a state in which the sheet S is not stacked, the surface sheet sensor 12 detects the raising of the intermediary plate 16 in place of the sheet S1. At this time, in the case where the presence-absence sensor 13 does not detect the sheet S, discrimination that the sheet S is not stacked in the sheet feeding cassette 15 is made, so that a raising operation by the unshown intermediary plate raising and lowering device is stopped and a user is prompted by an unshown display value to set the sheet S. Accordingly, even in a state in which the sheet S is not stacked in the sheet feeding cassette 15, it becomes possible to provide proper information to the user without excessively raising the intermediary plate 16.

Further, to the retard roller 107, drive (driving force) from an unshown driving unit is transmitted so as to rotate the retard roller 107 to provide peripheral movement in a direction opposite to the feeding direction, and the retard roller 107 is provided with an unshown torque limiter for imparting a rotational load in the feeding direction. Further, to the retard roller 107, a separation pressure as a contact pressure to the feed roller 106 is applied. On the other hand, the feed roller 106 is provided with an unshown one-way clutch which permits rotation in the feeding direction P only during the sheet feeding drive but which does not permit rotation to provide peripheral movement in the direction opposite to the feeding direction P during the sheet feeding drive. That is, after the sheet feeding drive is stopped, the feed roller 106 can be rotated to provide peripheral movement in the direction opposite to the feeding direction P. For that reason, the retard roller 107 during the sheet feeding rotates to provide peripheral movement in the direction opposite to the feeding direction P upon transmission of the driving force, and in the case where the sheet feeding drive is at rest, the retard roller 107 rotates the contacting feed roller 106 to provide peripheral movement in the direction opposite to the feeding direction by the separation pressure. Then, the pick roller 105 and the feed roller 106 start rotation thereof by an unshown sheet feeding and driving unit into which a sheet feeding starting signal from an unshown controller is inputted. Together with the start of the rotation in the feeding direction P, the pick roller 105 is swung from the retracted position toward a sheet S direction by an unshown swinging unit for swinging the pick roller 105 as shown in (d) of FIG. 23, so that the pick roller 105 contacts the uppermost sheet S1 by a contacting force suitable for the sheet feeding. In the following, a position of the pick roller 105 when the pick roller 105 contacts the sheet S is referred to as a contact position. Then, as shown in (e) of FIG. 23, the pick roller 105 feeds the uppermost sheet S1 to a separation nip formed by the feed roller 106 and the retard roller 107.

The feed roller 106 is provided with the one-way clutch acting during the sheet feeding drive, and therefore, rotation of the feed roller 106 changes from reverse rotation by a rotational force from the retard roller 107 to rotation in the feeding direction P by the drive by the unshown sheet feeding and driving unit. The retard roller 107 rotates in the feeding direction P since the rotational force receiving from the feed roller 106 is set at a value larger than the rotational load of the torque limiter. Further, the retard roller 107 continuously rotates in the feeding direction P also during the feeding of the sheet S1 since the rotational force receiving by a frictional force with the sheet S1 fed to the separation nip is set at a value larger than the rotational load of the torque limiter. Therefore, of the stacked sheets S, only the uppermost sheet S1 is fed and conveyed.

In the case where the frictional force between the sheet S1 fed by the pick roller 105 and the sheet S2 under (subsequent to) the sheet S1 is relatively large, as shown in (f) of FIG. 23, both of the sheet S1 and the sheet S2 are fed by the pick roller 105 in some cases. When the two sheets S1, S2 are fed to the separation nip, the sheet S1 is fed toward a downstream side with respect to the feeding direction P by the feed roller 106. On the other hand, the sheet S2 is subjected to a feeding force in the feeding direction P by the frictional force with the sheet S1 and a feeding force in the direction opposite to the feeding direction P by the rotational load by the torque limiter. The rotational load of the torque limiter is set at a value smaller than the feeding force when the retard roller 107 contacts the feed roller 106 and the feeding force when a single sheet S is fed to the separation nip, and is larger than the feeding force when two or more sheets S are fed to the separation nip. For this reason, in the case where the sheets S1, S2 are fed to the separation nip, the retard roller 107 stops by the feeding force and the rotational load which are comparable (equal) to each other or rotates to provide peripheral movement in the direction opposite to the feeding direction P by a larger rotational load.

For that reason, in the case where the retard roller 107 stops, the sheet S2 contacting the retard roller 107 remains in the separation nip, and in the case where the retard roller 107 rotates to provide peripheral movement in the direction opposite to the feeding direction P, the sheet S2 is pushed back toward an upstream side with respect to the feeding direction P. Therefore, of the stacked sheets S, only the single (uppermost) sheet S1 is fed and separated and then is to be conveyed. Incidentally, even in the case where the number of sheets to be fed by the pick roller 105 is two or more, similarly as in the case of the two sheets, only the uppermost sheet S1 is fed and separated and then is conveyed.

When the fed sheet S1 reaches the feeding (conveying) roller pair 17, the drive of the unshown sheet feeding and driving unit is stopped, and as shown in (g) of FIG. 23, the pick roller 105 is retracted again to the retracted position by the swinging unit. With the drive stop of the sheet feeding and driving unit, the feed roller 106 loses the driving force, but continuously rotates in the feeding direction P by the frictional force with the sheet S1 during the feeding by the feed roller pair 17. On the other hand, to the retard roller 107, the drive transmission from the driving unit for driving the retard roller 107 is continued, so that the predetermined 107 is subjected to the rotational force in the direction opposite to the feeding direction P. In the case where the single sheet is fed to the separation nip, the retard roller 107 rotates in the feeding direction P, and in the case where two or more sheets are fed to the separation nip, the retard roller 107 stops or rotates to provide peripheral movement in the direction opposite to the feeding direction P.

For this reason, also after the drive of the sheet feeding and driving unit for driving the pick roller 105 is stopped, only the sheet S1 in continuously fed and separated and then conveyed without being fed together with the sheet S2. In the following, feeding of a plurality of sheets by the pick roller 105 is referred to as double feeding. When the number of the sheets S stacked in the sheet feeding cassette 15 is decreased by the sheet feeding operation by the pick roller 105, the decrease in the number of the sheets S is detected by the sheet surface sensor 12. When the decrease in the number of the sheets S is detected by the sheet surface sensor 12, the unshown intermediary plate raising and lowering device raises the intermediary plate 16 to the position suitable for the sheet feeding operation again. Therefore, the proper sheet feeding operation can be performed irrespective of the number of the sheets S stacked in the sheet feeding cassette 15. Further, when the sheet S is used up, the absence of the sheet S is detected by the sheet presence-absence sensor 13, so that the raising operation by the intermediary plate raising and lowering device is stopped and the user is prompted by the unshown display unit to set the sheets S. As described above, the sheet feeding device 101 receives the sheet feeding starting signal from the unshown controller and is capable of separating and feeding the uppermost sheet S1 one by one from the stacked sheets S.

[Problem of Conventional Example]

In the case where improvement in productivity is intended to be realized by the sheet feeding device 101, there are principally two methods. One is a method of increasing a feeding speed of the sheet S, and the other is a method of shortening a distance (interval) between a trailing end of the sheet S during the feeding and a leading end of the sheet S to be subsequently fed (hereinafter this interval is referred to as a sheet interval). Incidentally, the productivity is the number of sheets outputted per unit time. In the case where the feeding speed of the sheet S is increased, in order to meet durability, operation noise, heat dissipation and the like in the image forming portion 19, the transfer portion 20, the fixing portion 21 and the like, there is a liability that a cost increases. For this reason, a method of shortening the sheet interval while suppressing the increase in feeding speed to the possible extent is selected. However, in the method of shortening the sheet interval, a reduction of variation in sheet interval at the sheet feeding portion was problematic.

In FIG. 23, (h) shows a state in which after the sheet feeding separation and conveyance of the sheet S1 are completed ((g) of FIG. 23), the sheet feeding device 101 is on stand-by until a subsequent sheet feeding starting signal is inputted from the unshown controller. When compared with the state of (c) of FIG. 23, the leading end position of the uppermost sheet S2 (sheet S1 in (c) of FIG. 23) moves to a downstream side with respect to the feeding direction P. This movement amount generates due to a difference in frictional force among the stacked sheets S and varies depending on a kind of the sheets S, a manner of stacking, an environment condition and the like, so that it is difficult to control the movement amount. That is, the leading end position of the sheet during start of the sheet feeding generates a variation therein in a range from the leading end of the sheets S when the sheets S are set to the separation nip (distance Ld shown by a double-pointed arrow in (h) of FIG. 23). The variation corresponding to the distance Ld (hereinafter referred to as sheet feeding variation Ld) generates, and therefore there is a need to provide the sheet interval which is not less than (at least) the sheet feeding variation Ld and was problematic in terms of shortening of the time. Therefore, in order to reduce the sheet feeding variation Ld, a constitution in which the leading end position of the sheet S during the sheet feeding start is uniformized has been proposed.

(Case of Single Sheet Fed)

Figure 24:
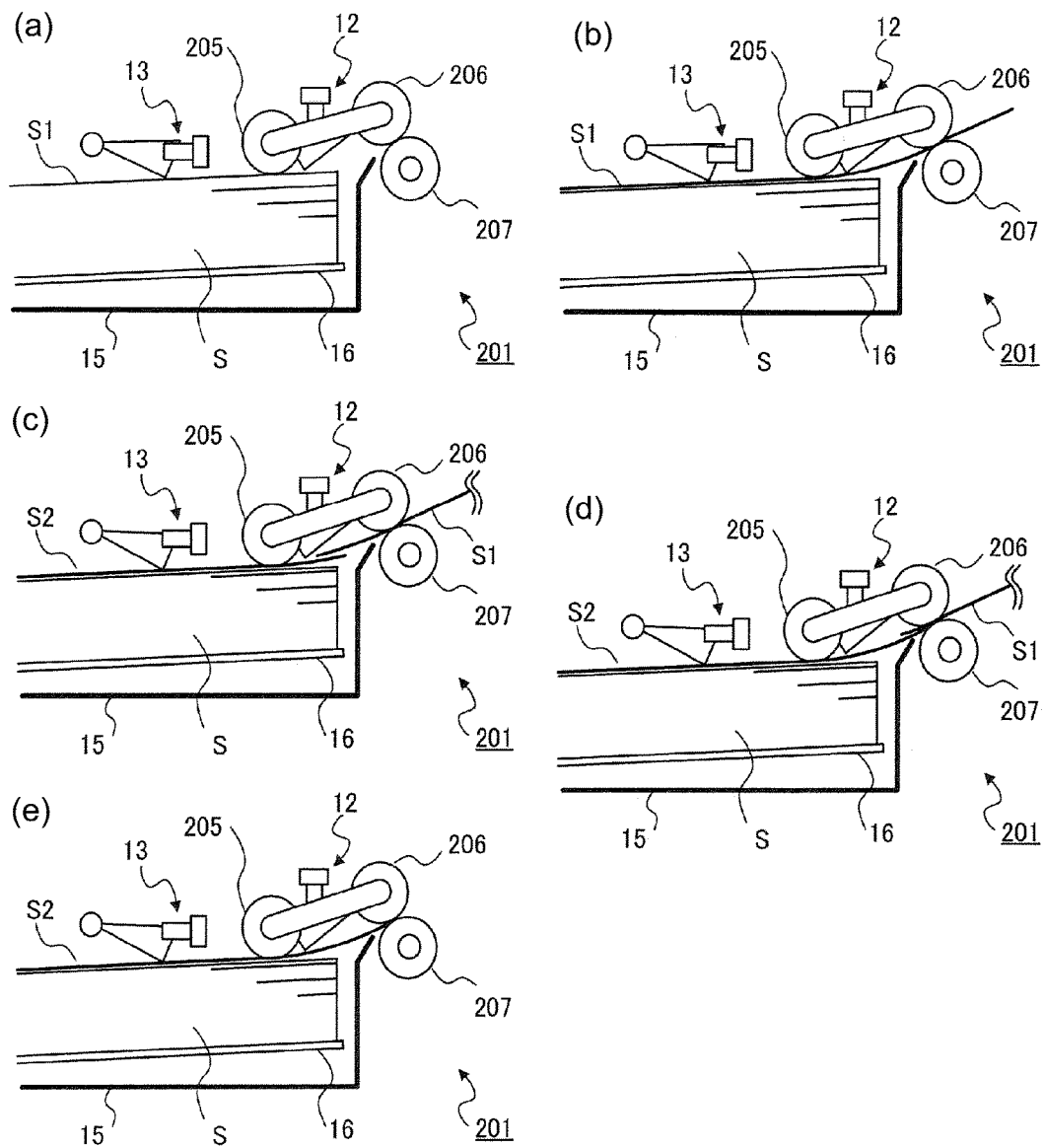
In FIG. 24, (a) to (e) are schematic views showing the sheet feeding device in the conventional example.

The sheet feeding device 201 having a constitution in which the leading end position of the sheet S during the sheet feeding start is uniformized will be described using FIG. 24. In FIG. 24, (a) is a partially schematic sectional view showing the sheet feeding device 201 immediately after start of the drive of the pick roller 205, (b) is a partially schematic sectional view showing the sheet feeding device 201 during the sheet feeding of the sheet S1, (c) is a partially schematic sectional view showing the sheet feeding device 201 during the sheet feeding of a subsequent sheet S2, (d) is a partially schematic sectional view showing the sheet feeding device 201 when the leading end of the sheet S2 reaches the separation nip, and (e) is a partially schematic sectional view showing the sheet feeding device 201 after the sheet feeding of the sheet S1 is completed. Here, constituent elements similar to those of the sheet feeding device 101 described with reference to FIG. 23 are represented by the same reference numerals or symbols and will be omitted from description.

In FIG. 24, (a) shows a state in which the sheets S are stacked in the sheet feeding cassette 15 and the intermediary plate 16 is raised to a position suitable for the sheet feeding operation and is kept at the position. In FIG. 24, (a) also shows a state in which the pick roller 205, the feed roller 206 and the retard roller 207 are driven by the unshown sheet feeding and driving unit in which the sheet feeding starting signal is inputted from the unshown controller. To the retard roller 207, drive (driving force) in the direction opposite to the feeding direction P is transmitted, and an unshown torque limiter for imparting the rotational load in the feeding direction P is provided. Further, to the retard roller 207, a separation pressure as a contacting portion to the feed roller 206 is applied.

On the other hand, the feed roller 206 is provided with an unshown one-way clutch which permits rotation in the feeding direction P but which does not permit rotation to provide peripheral movement in the direction opposite to the feeding direction P. A difference of FIG. 24 from FIG. 23 is that the one-way clutch of the feed roller 206 does not permit the rotation not only during the sheet feeding drive but also after stop of the sheet feeding drive. For that reason, when the driving force is applied to the retard roller 207, the retard roller 207 applies the rotational force in the direction opposite to the feeding direction P and makes the contacting feed roller 206 to rotate to provide peripheral movement in the direction opposite to the feeding direction P by the separation pressure. However, by the action of the one-way clutch of the feed roller 206, when the pick roller 205 starts rotation in the feeding direction P, the pick roller 205 feeds the uppermost sheet S1 to the separation nip formed by the feed roller 206 and the retard roller 207.

In FIG. 24, (b) shows the case where a single uppermost sheet S1 is fed from the sheets S by the pick roller 205. Incidentally, the case where two or more sheets, e.g., the sheet S1 and the sheet S2 are fed from the sheets S will be described later.

The feed roller 206 is rotated in the feeding direction P by the drive of the sheet feeding driving unit. The retard roller 207 is rotated in the feeding direction P since the rotational force received from the feed roller 206 is set at a value larger than the rotational load of the torque limiter. Further, the retard roller 207 continuously rotates in the feeding direction P during the feeding of the sheet S1 since the rotational force received by the frictional force with the sheet S1 is set at a value larger than the rotation load of the torque limiter. Therefore, from the sheets S stacked in the sheet feeding cassette 15, only one sheet, i.e., the uppermost sheet S1 is fed and conveyed. The retard roller 207 is provided with an unshown rotation detecting unit for detecting the rotation of the retard roller 207, and is different from the constitution of FIG. 23.

In FIG. 24, (c) shows a state in which the sheet S1 is fed and separated and then is conveyed and thus the trailing end of the sheet S1 is fed toward the downstream side by the pick roller 205. At this timing, at the separation nip, only the sheet S1 is fed, and therefore, the retard roller 207 rotates in the feeding direction P. Therefore, the rotation detecting unit detects the rotation of the retard roller 207. In the constitution of FIG. 24, during the detection of the rotation of the retard roller 207, the drive by the sheet feeding driving unit is continued, so that rotation of the pick roller 205 and the feed roller 206 is continued. For that reason, after the trailing end of the sheet S1 passes through the pick roller 205, the pick roller 205 contacts the sheet S2 under (subsequent to) the sheet S1 and starts the sheet feeding of the sheet S2. That is, during this period, the trailing end of the sheet S1 and the leading end of the sheet S2 are fed to the separation nip in a partially overlapping state.

In FIG. 24, (d) shows a state in which the sheets S1, S2 are fed to the separation nip in the state in which the trailing end of the sheet S1 and the leading end of the sheet S2 overlap with each other and the leading end of the sheet S2 reached the separation nip. When the two sheets S1, S2 are fed to the separation nip, the sheet S1 is fed toward the downstream side with respect to the feeding direction P by the feed roller 206. On the other hand, the sheet S2 is subjected to the feeding force in the feeding direction P by the frictional force with the sheet S1, the feeding force in the feeding direction P by the frictional force with the pick roller 205, and the feeding force in the direction opposite to the feeding direction P by the rotation load of the torque limiter with the retard roller 207.

The rotation load of the torque limiter is set at a value which is smaller than the feeding force by the feed roller 206 in the case where the retard roller 207 contacts the feed roller 206 and which is smaller than the feeding force by the sheet S in the case where one sheet S is fed to the separation nip. On the other hand, the rotation load of the torque limiter is set at a value larger than the feeding force by the sheet S in the case where the two or more sheets S are fed to the separation nip. For that reason, the retard roller 207 stops by the feeding force and the rotation load which are equal to each other or starts rotation to provide peripheral movement in the direction opposite to the feeding direction position by a larger rotation load of the torque limiter. The feeding force in the case where the two or more sheets S are fed to the separation nip is generated by the frictional force between the sheets S1, S2 in the constitution of FIG. 23, but is generated by the frictional force between the pick roller 205 and the sheet S2. This is a difference between the constitutions of FIGS. 23, 24.

As described above, when the rotation detecting unit detects the stop or the reverse rotation of the retard roller 207, the drive of the sheet feeding and driving unit is stopped. Therefore, also the rotation of the pick roller 205 is stopped and thus also the sheet feeding of the sheets S2 is stopped. The feed roller 206 loses the feeding force thereof, but is continuously rotated in the feeding direction P by the frictional force with the sheet S1 during the feeding in a period in which the sheet S1 contacts the feed roller 206. The sheet S2 which is fed to the separation nip and of which rotation is stopped by the retard roller 207 remains at the separation nip even after the sheet feeding of the sheet S1 is completed, as shown in (e) of FIG. 24.

Thus, the drive of the sheet feeding and driving unit is stopped by detecting the rotation stop or the reverse rotation of the retard roller 207, so that the sheet S2 can be fed to the separation nip. Therefore, in the case where a subsequent sheet feeding starting signal and a later signal are inputted and the drive of the sheet feeding and driving unit is started, the leading end of the sheet S2 is uniformized at the position of the separation nip, and therefore the sheet feeding variation Ld as shown in (h) of FIG. 23 can be reduced.

(Case of Two Sheets Fed)

Figure 25:
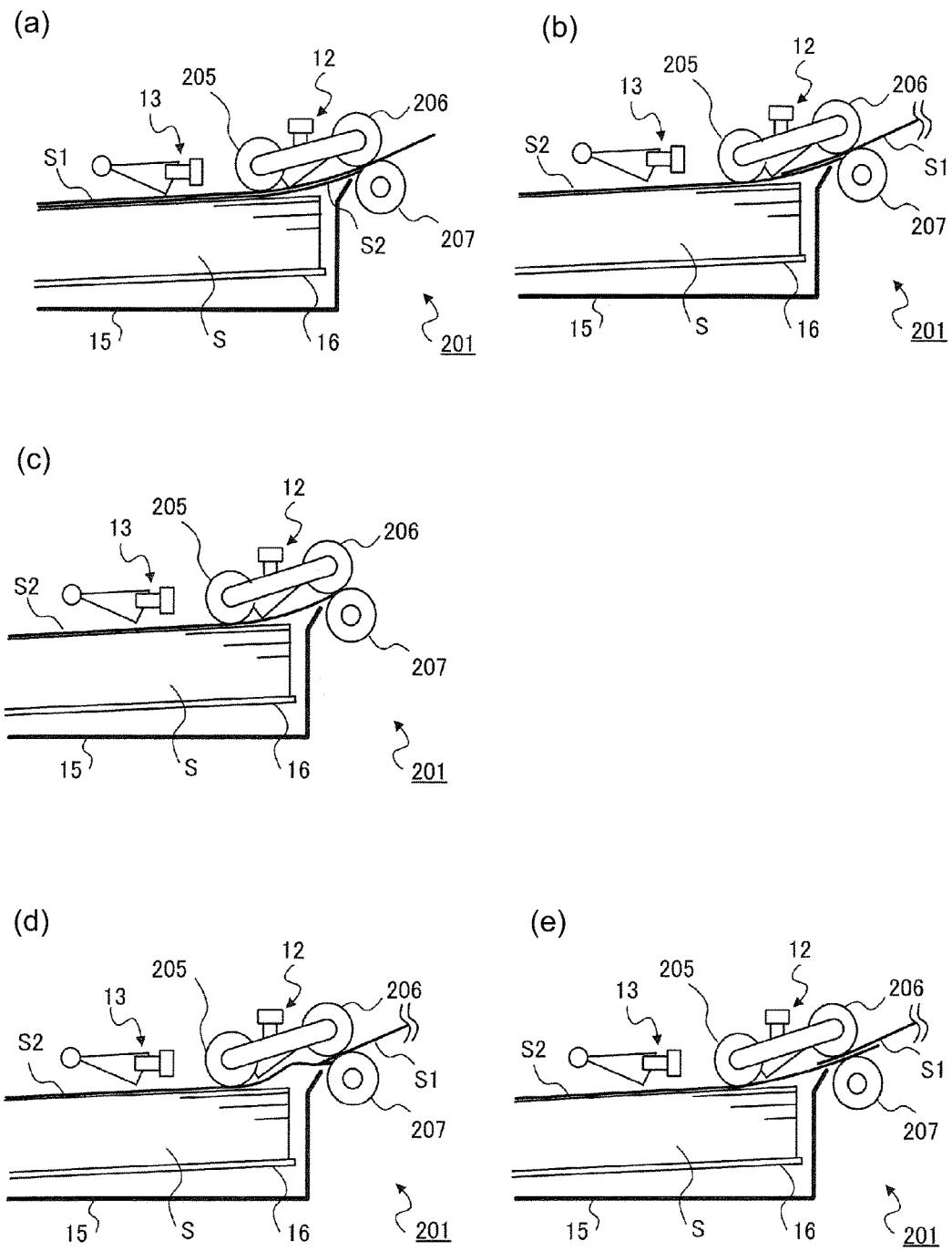
In FIG. 25, (a) to (e) are schematic views showing the sheet feeding device in the conventional example.

The case where the number of sheets fed by the pick roller 205 at the time of start of the sheet feeding is two will be described. In FIG. 25, (a) is a partially schematic sectional view showing the sheet feeding device 201 during separation between the sheet S1 and sheet S2, (b) is a partially schematic sectional view showing the sheet feeding device 201 immediately before completion of the sheet feeding of the sheet S1, and (c) is a partially schematic sectional view showing the sheet feeding device 201 after the sheet feeding of the sheet S1 is completed. Constituent elements similar to those shown in FIG. 24 are represented by the same reference numerals or symbols and will be omitted from description.

In the case where the frictional force between the sheet S1 and the subsequent sheet S2 which are fed by the pick roller 205 is relatively large, the sheets S1, S2 are fed by the pick roller 205 in some instances as shown in (a) of FIG. 25. When the two sheets S1, S2 are fed to the separation nip, the sheet S1 is fed toward the downstream side with respect to the feeding direction P by the feed roller 206.

On the other hand, the sheet S2 is subjected to the feeding force in the feeding direction P by the frictional force with the sheet S1 and the feeding force in the direction opposite to the feeding direction P by the rotation load of the torque limiter with the retard roller 207.

The rotation load of the torque limiter is set at a value which is smaller than the feeding force by the feed roller 206 in the case where the retard roller 207 contacts the feed roller 206 and which is smaller than the feeding force by the sheet S in the case where one sheet S is fed to the separation nip, and which is larger than the feeding force by the sheet S in the case where the two or more sheets S are fed to the separation nip. For that reason, in the state of (b) of FIG. 25, the retard roller 207 stops by the feeding force and the rotation load which are equal to each other or starts rotation to provide peripheral movement in the direction opposite to the feeding direction position by a larger rotation load of the torque limiter. For that reason, the sheet S2 contacting the retard roller 207 remains in the separation nip in the case where the retard roller 207 stops and is pushed back to the upstream side with respect to the feeding direction P in the case where the retard roller 207 is rotated to provide peripheral movement in the direction opposite to the feeding direction P.

Here, when the rotation detecting unit detects the stop or the reverse rotation of the retard roller 207, the drive of the sheet feeding and driving unit is stopped. Therefore, also the rotation of the pick roller 205 is stopped and thus the feeding of the sheets S1 by the pick roller 205 is stopped. The feed roller 206 loses the feeding force thereof, but is continuously rotated in the feeding direction P by the frictional force with the sheet S1 continuously fed by the feed roller pair 17 and the like provided downstream of the separation nip with respect to the feeding direction P, in a period in which the sheet S1 contacts the feed roller 206. Here, the sheet S2 which is fed to the separation nip and of which rotation is stopped by the retard roller 207 remains at the separation nip during the feeding of the sheet S1.

In FIG. 25, (b) shows a state in which the sheet S1 is fed and the trailing end of the sheet S1 is fed toward the downstream side with respect to the feeding direction P by the pick roller 205. At this timing, the drive of the sheet feeding and driving unit has already been stopped. For that reason, after the pick roller 205 feeds the trailing end of the sheet S1, the pick roller 205 contacts the sheet S2 subsequent to the sheet S1, but the drive is stopped, and therefore feeding of the sheet S2 is not continued. Therefore, in the case where the subsequent sheet feeding starting signal and the later signal are inputted and the drive of the sheet feeding and driving unit is started, as shown in (c) of FIG. 25, similarly as in (e) of FIG. 24, the leading end of the sheet S2 is uniformized at the position of the separation nip. Even in the case where the number of sheets fed by the pick roller 205 is two or more, only the sheet S1 is fed and separated and then is conveyed similarly, and the leading end of the sheet S2 is uniformized similarly at the position of the separation nip.

As described above, the rotation of the retard roller 207 during the feeding of the uppermost sheet S1 is detected, and the drive of the sheet feeding and driving unit is stopped in synchronism with the rotation stop or the reverse rotation of the retard roller 207, so that the subsequent sheet S2 can be fed to the separation nip. For this reason, the sheet feeding variation Ld generated in the constitution of FIG. 23 can be reduced.

[Problem in Constitution of FIG. 24 and (a) to (c) of FIG. 25]

In the conventional example, the rotation of the retard roller 207 when the uppermost sheet S1 is fed, separated and conveyed is detected and in synchronism with the rotation stop or the reverse rotation of the retard roller 207, the drive of the sheet feeding and driving unit is stopped. As a result, the sheet feeding variation Ld is reduced by feeding the sheet S2 subsequent to the sheet S1 to the separation nip. However, in order to further narrow the sheet interval during the sheet feeding, there is a problem in the time required for detecting the rotation stop of the retard roller 207. As shown in (d) of FIG. 24, when the sheets S1, S2 are fed to the separation nip in the state in which the trailing end of the sheet S1 and the leading end of the sheet S2 overlap with each other, the retard roller 207 is finally stopped by the rotation load of the torque limiter.

A state until the rotation of the retard roller 207 stops will be specifically described. First, in the case where the sheet S1 is nipped in separation nip, the rotation load of the torque limiter is smaller than the feeding force by the sheet S1, and the retard roller 207 rotates in the feeding direction P. The rotational speed of the retard roller 207 becomes equal to the feeding speed of the sheet S1 in the case where sliding between the retard roller 207 and the sheet S1 does not generate. However, in actuality, the rotation of the retard roller 207 depends on the friction with the sheet S1, and therefore the sliding with the sheet S1 somewhat generates, so that the rotational speed of the retard roller 207 becomes a value somewhat slower than the feeding speed of the sheet S1 on average while repeating minute speed fluctuation.

When the leading end of the sheet S2 is started to reach the separation nip by the pick roller 205, the state of the retard roller 207 goes to a state in which the sheet S1 and the leading end of the sheet S2 contact each other. Here, the state of the retard roller 207 is changed from the state in which the feeding force is applied from only the sheet S1 to the state in which the feeding force by the sheet S2 is applied. In this transition state, the rotation load of the torque limiter is gradually larger than the feeding force and therefore the rotational speed of the retard roller 207 in the feeding direction P is gradually decelerated from the speed somewhat slower than the feeding speed toward stop, and therefore it takes time until the retard roller 207 stops.

Further, in order that the retard roller 207 starts the reverse rotation, there is a need that the state of the retard roller 207 goes through a stop (rest) state, so that it takes further time. Therefore, there is a tendency that the stop time of the retard roller 207 is longer with a faster feeding speed of the sheet S1, and correspondingly to the longer stop time, also a distance in which the sheet S2 is fed in a period until the retard roller 207 stops. Thus, when the time until the retard roller 207 stops becomes long, during the feeding of the sheet S1, there is a liability that the feeding operation of the sheet S2 subsequent to the S1 is influenced.

In FIG. 25, (d) is a partially schematic sectional view showing the sheet feeding device 201 in a state in which a loop generates on the sheet S2, and (e) is a partially schematic sectional view showing the sheet feeding device 201 in a state in which the leading end of the sheet S2 is fed to a side downstream of the separation nip with respect to the feeding direction P. Incidentally, constituent elements similar to those shown in (a) to (c) of FIG. 25 and the like are represented by the same reference numerals or symbols and will be omitted from description. As shown in (c) of FIG. 24, when the trailing end of the sheet S1 passes, the pick roller 205 contacts the sheet S2 subsequent to the sheet S1 and starts the sheet feeding of the sheet S2. Thereafter, the trailing end of the sheet S1 and the leading end of the sheet S2 are fed to the separation nip in a partially overlapping state, so that as shown in (d) of FIG. 24, when the rotation detecting unit detects the stop or the reverse rotation of the retard roller 207, the drive of the sheet feeding and driving unit is stopped.

That is, the drive of the sheet feeding and driving unit is continued until the rotation detecting unit detects the stop of the retard roller 207. For this reason, in the case where a time until the pick roller 205 stops is long, as shown in (d) of FIG. 25, there is a liability that flexure of the sheet S2 at the leading end portion generates (hereinafter referred to as a loop). This is caused by continuation of the feeding of the sheet S2 since the drive of the pick roller 205 is continued and by deceleration of the retard roller 207 toward the stop state for retaining the leading end of the sheet S2 at the separation nip. Particularly, when the basis weight is small (e.g., thin paper), there is a tendency that the loop of the sheet S2 is liable to generate between the pick roller 205 and the separation nip. When the loop of the sheet S2 further increases, there is also a liability that a phenomenon such as paper jam generates in some cases.

In order to solve a problem such as the loop generated on the sheet S2, it would be considered that the feeding force of the pick roller 205 is reduced or that the time until the retard roller 207 stops is reduced by increasing the rotation load of the torque limiter. However, when a sheet feeding and separating performance and durability and the like are intended to be compatibly realized, there is a liability that an adjustable range of respective parameters narrows and thus a cost increases for adjustment. In FIG. 25, (e) shows the case where the leading end of the sheet S2 goes over the separation nip. There is a liability that the rotation load of the torque limiter cannot withstand the sheet feeding force to cause the phenomenon shown in (e) of FIG. 25 in the case where it takes long time until the retard roller 207 stops although the leading end of the sheet S2 is intended to be retained at the separation nip by the retard roller 207. Such a phenomenon tends to be liable to generate when the basis weight of the sheet S is large (thick paper).

In order to prevent the phenomenon as shown in (e) of FIG. 25, similarly as in the case of (d) of FIG. 25, there is a need to make difficult adjustment of the respective parameters, so that there is a liability that the cost increases similarly. The generation of the phenomena of (d) and (e) of FIG. 25 results from the following long time. The time is a time from arrival of the leading end of the sheet S2 at the separation nip to actual stop of the pick roller 205 by detection of the rotation stop of the retard roller 207 by the rotation detection unit and by the drive of the sheet feeding and driving unit or to lose of the feeding force of the sheet S2 by the pick roller 205 after the sheet S2 is spaced from the pick roller 205. Hereinafter, this time is referred simply to as a stop time.

Therefore, as another countermeasure, in order to reduce the influence of the long stop time, there is a constitution in which the pick roller 205 and the retard roller 207 are interrelated with each other. In this example, in interrelation with an operation in which the leading end of the sheet S2 reaches the separation nip and the retard roller 207 gradually decelerates toward the stop state, also the pick roller 205 gradually decelerates and stops. For that reason, compared with the case where the pick roller 205 rotates at a predetermined feeding speed until the drive thereof stops, even when the stop time is the same, it is possible to reduce the feeding distance of the sheet S2. Therefore, the generation of the phenomena shown in (d) and (e) of FIG. 25 can be reduced. However, in this constitution, in order to feed the sheet S2, the driving force for driving the pick roller 205 is to be supplied from the rotational force of the retard roller 207. That is, to the retard roller 207, in addition to the rotation load of the torque limiter, a rotation load for driving the pick roller 205 is applied. The rotation load of the pick roller 205 fluctuates depending on the kind and the state of the sheet S2, and the environmental condition and therefore the adjustable range of the respective parameters such as the rotation load of the torque limiter further narrows, so that there is a liability that it becomes difficult to compatibly realize the sheet feeding and separating performance and the durability and the like in expensively.

Embodiment 1

(Sheet Feeding Device)

Figure 1:
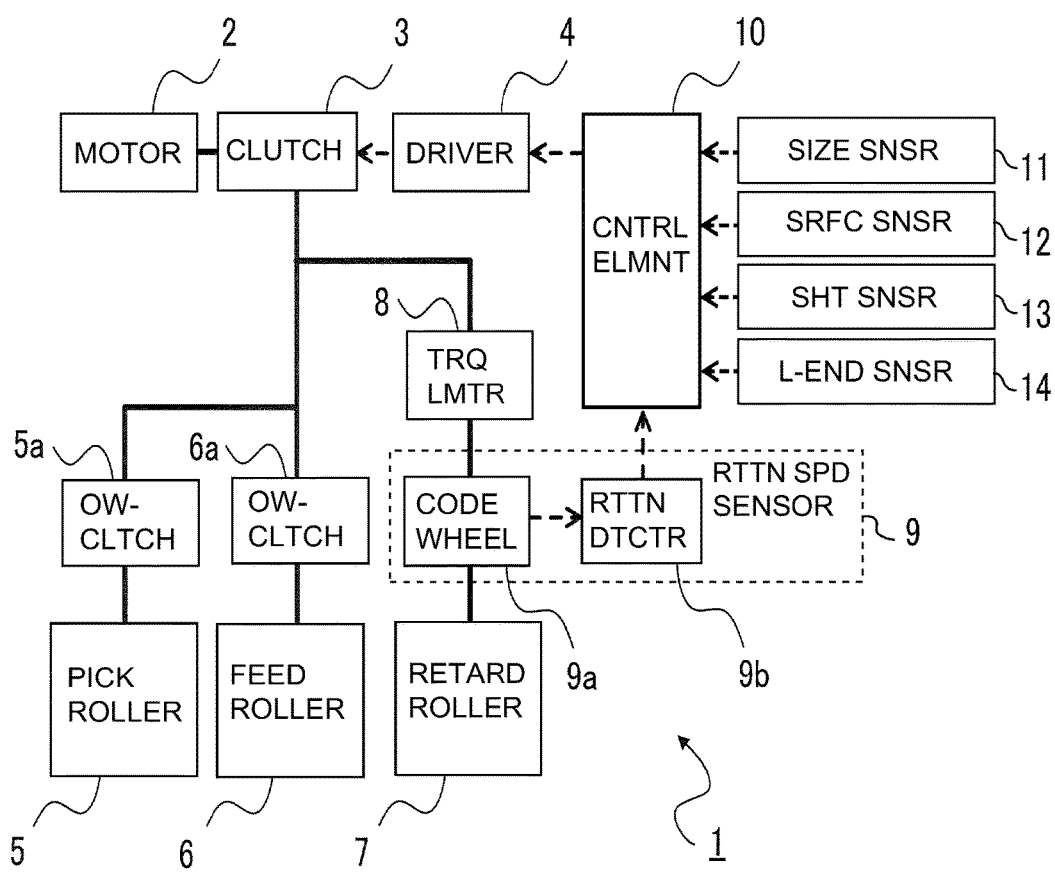
FIG. 1 is a block diagram showing a constitution relating to sheet feeding control in Embodiment 1.

An outline of a constitution of a sheet feeding device 1 in Embodiment 1 will be described using FIG. 1. A constitution of an image forming apparatus in this embodiment is the same as the constitution of the image forming apparatus described above using FIG. 22 and will be omitted from description. FIG. 1 is a block diagram showing the constitution of the sheet feeding device 1 in this embodiment. A drive transmission path in FIG. 1 will be described. Drive (driving force) from a motor 2 as a driving unit is transmitted to an electromagnetic clutch 2 as a driven unit. In the case where the electromagnetic clutch 3 is connected by a driving circuit 4 described later, the drive (driving force) is transmitted to a pick roller 5 as a sheet feeding unit 5, a feed roller 6 as a first roller, and a retard roller 7 as a second roller and via the drive transmission path indicated by a solid line. The feed roller 6 and the retard roller 7 constitute a separating unit. The drive to the pick roller 5 and the feed roller 6 is transmitted so as to drive these rollers in the feeding direction, and the drive to the retard roller 7 is transmitted so as to rotate the retard roller 7 to provide peripheral movement in the direction opposite to the feeding direction.

One of paths branched from the drive transmission path from the electromagnetic clutch 3 is connected to the retard roller 7. In the drive transmission path between the retard roller 7 and the electromagnetic clutch 3, a torque limiter 8 is provided so that in the case where the retard roller 7 rotates in the feeding direction, i.e., in the case where the retard roller 7 rotates to provide peripheral movement in the direction opposite to a driving direction, a rotation load T described later is applied to the retard roller 7. Further, between the torque limiter 8 and the retard roller 8, a code wheel 9a is provided and constitutes a rotational speed sensor 9 as a first detecting unit in combination with a rotation detecting element 9b, so that a constitution of detecting a value relating to rotation of the retard roller 7, e.g., a rotational speed (rotational frequency per unit time) is employed.

Another path branched from the drive transmission path from the electromagnetic clutch 3 is further branched into one path connected to the pick roller 5 via a one-way clutch 5a and the other path connected to the feed roller 6 via a one-way clutch 6a. These two one-way clutches 5a, 6a are constituted so as to permit rotation of associated rollers in the feeding direction and so as not to permit rotation of the associated rollers to provide peripheral movement in the direction opposite to the feeding direction. For that reason, even in the case where the drive is not transmitted, when the rotational force described later in the feeding direction is applied from the sheet, each of the pick roller 5 and the feed roller 6 is independently rotated in the feeding direction by the rotational force.

Next, a transmission path of signals and the like indicated by a broken line in FIG. 1 (hereinafter referred to as a signal transmission path) will be described. To a control element 10, the rotation detecting element 9b of the rotational speed sensor 9 is connected. The rotation detecting element 9b reaches the code wheel 9a rotating in synchronism with the rotation of the retard roller 7 and generates a pulse signal, and then outputs a signal, to the control element 10, depending on a rotation state of the retard roller 7. Further, to the control element 10, a sheet (paper) size sensor 11, a sheet surface sensor 12, a sheet presence-absence sensor 13 and a sheet leading end sensor 14 are connected, and also signals depending on respective•state are outputted. A driving circuit 4 control the drive of the electromagnetic clutch 3 by supplying electric power from an unshown electric power source to the electromagnetic clutch 3 and by interrupting (shutting off) the supply of the electric power.

(Driving Circuit)

Figure 2:
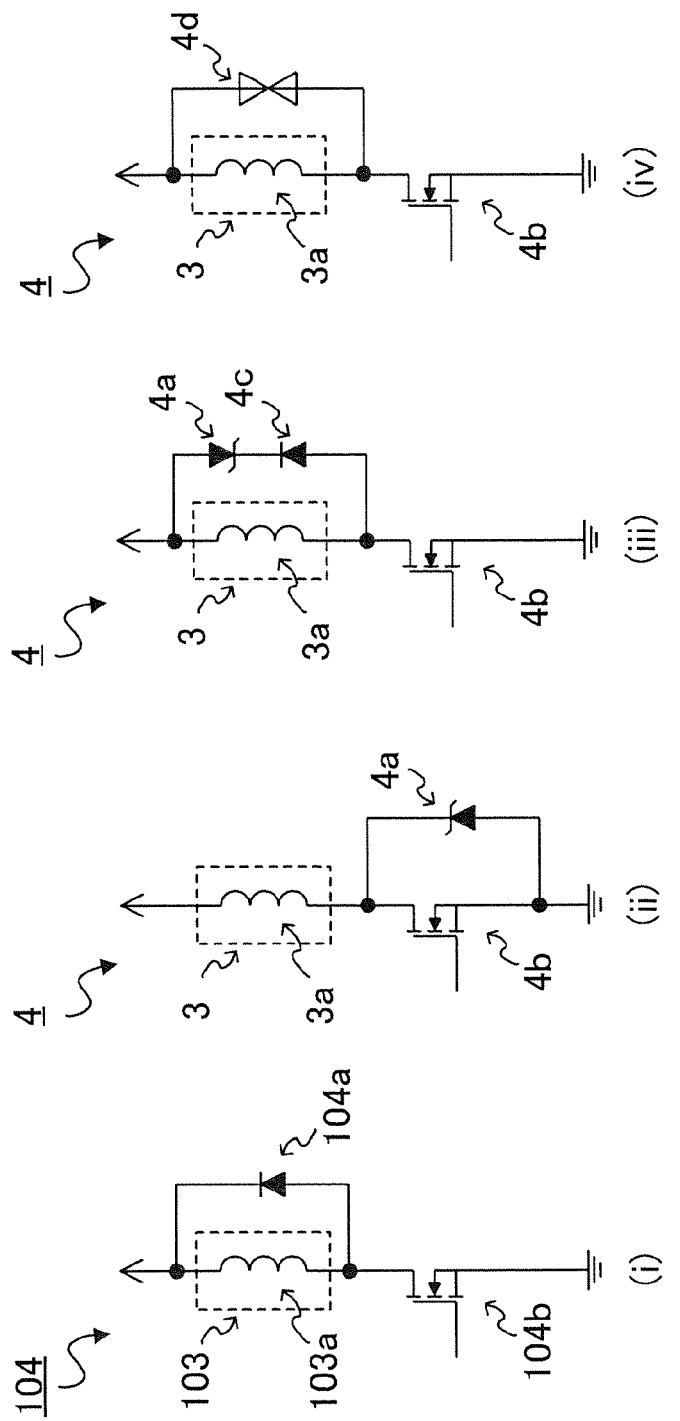
In FIG. 2, (i) to (iv) are schematic circuit views each showing a constitution of a driving circuit in Embodiment 1.

Using FIG. 2, a circuit constitution of the driving circuit 4 will be described. In FIG. 2, (i) is a schematic circuit diagram showing a constitution of the driving circuit 104 in the conventional example, and (ii) to (iv) are schematic circuit diagrams each showing a constitution of the driving circuit 4 in this embodiment. First, using (i) of FIG. 2, an operation of the driving circuit 4 in the conventional example will be described. When the drive is transmitted, the driving circuit 104 in the conventional example applies an exciting voltage from the electric power source to a coil 103a of the electromagnetic clutch 3.

When the exciting voltage is applied to the coil 103a, a current flowing through the coil 103a starts to increase, and when a resultant magnetic force reaches a sufficient magnetic force, the electromagnetic clutch 103 is connected, so that the drive is transmitted. Similarly, in the case where the drive transmission is interrupted, the supply of the electric power from the electric power source is interrupted. When the supply of the electric power is interrupted, a counter-electromotive voltage which is several tens of times the exciting voltage generates from the coil 103a, and therefore, as a counter-electromotive voltage absorbing circuit, a diode 104a is provided in parallel to the coil 103a. For that reason, the counter-electromotive voltage is suppressed to a forward voltage of about 0.8 V of the diode 104a, so that even when a field effect transistor (FET) 104b is one for a small signal, a voltage exerted on the FET 104 can be suppressed within a withstanding voltage, so that the driving circuit 104 can be protected. However, in the case where the diode 4 is used, a time until energy accumulated in the coil 103a is regenerated into the electric power source becomes long, and therefore there is a tendency that a time until the drive transmission is interrupted becomes long.

In this embodiment, in order to shorten the time until the drive transmission is interrupted, the driving circuit 4 has a constitution shown in each of (ii) to (iv) of FIG. 2. As shown in (ii) of FIG. 2, as the counter-electromotive voltage absorbing circuit, a constant-voltage diode 4a is connected to a source and a drain of a FET 4b, whereby a counter-electromotive voltage is suppressed to a value of not more than a rated voltage and thus the driving circuit 4. Further, by increasing the counter-electromotive voltage, the energy accumulated in the coil 3a of the electromagnetic clutch 3 can be consumed in a short time by being caused to flow into the ground. In FIG. 2, (iii) shows a constitution in which in parallel to the coil 3a of the electromagnetic clutch 3, a forward direction diode 4c and the constant-voltage diode 4a connected with the forward direction diode 4b in series are connected to the coil 3a. In FIG. 2, (iv) shows a constitution in which a varistor 4d is connected to the coil 3a of the electromagnetic clutch 3 in parallel to the coil 3a. By employing the constitutions as shown in (iii) and (iv) of FIG. 2, the time until the energy accumulated in the coil 3a is regenerated into the electric power source is shortened, and therefore, similarly as in the constitution of (ii) of FIG. 2, the time until the drive transmission is interrupted can be shortened.

(Arrangement of Sheet Feeding Device)

Figure 3:
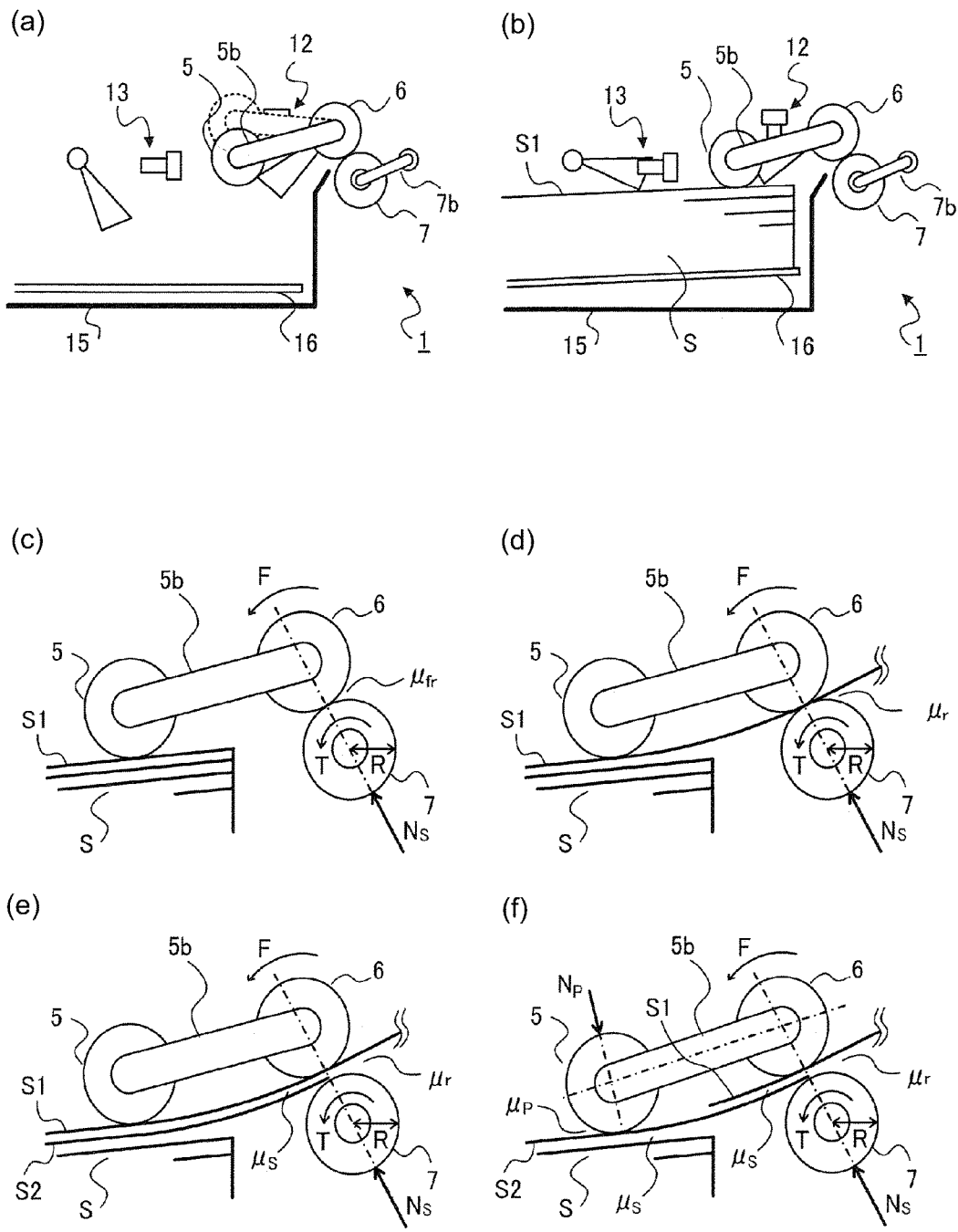
In FIG. 3, (a) to (f) are schematic views each showing a sheet feeding device and a separation nip before or after stacking of sheets in Embodiment 1.

An arrangement constitution of the sheet feeding device 1 will be described with reference to (a) and (b) of FIG. 3. In FIG. 3, (a) is a partially schematic sectional view showing the sheet feeding device 1 before the sheets S are stacked in the sheet feeding cassette 15, and (b) is a partially schematic sectional view showing the sheet feeding device 1 after the sheets S are stacked in the sheet feeding cassette 15. Here, constituent elements similar to those of the sheet feeding device 101 in the conventional example are presented by the same reference numerals or symbols and will be omitted from description. The pick roller 5 is provided swingably about a rotation of the feed roller 6 by a pick roller holder 5b, and is held swingaly between a retracted position indicated by a broken line and a sheet feeding position indicated by a solid line in (a) of FIG. 3.

Further, the pick roller holder 5b is interrelated with insertion and pulling-out of the sheet feeding cassette 15 by an unshown swinging unit for swinging the pick roller 5. As a result, the pick roller holder 5b is placed at the retracted position in a state in which the sheet feeding cassette 15 is inserted in the image forming apparatus 100 and is placed at the sheet feeding position in a state in which the sheet feeding cassette 15 is pulled out from the image forming apparatus 100. For that reason, when the sheet feeding cassette 15 is inserted in and pulled out from the image forming apparatus 100, the pick roller 5 is retracted from the sheets S stacked on the intermediary plate 16 (stacking portion) and the sheet feeding cassette 15 and the like, and therefore it becomes possible to prevent breaking or the like of the pick roller 5 by contact or the like.

After the sheet feeding cassette 15 is inserted, the pick roller 5 is in the sheet feeding position. At the time when the uppermost sheet S1 of the plurality of sheets S is raised to a position suitable for the sheet feeding operation, the pick roller 5 is contacted to the sheet S1 with a sheet feeding pressure Np ((f) of FIG. 3), which is suitable for the sheet feeding operation and which is described later, by an unshown urging unit for urging the pick roller 5 ((b) of FIG. 3). Thus, the pick roller 5 is not only rotated by the drive transmission but also capable of feeding the sheet. There-fore, compared with the pick roller 105 (FIG. 23) described in the conventional example, a time until the pick roller 5 swings from the retracted position to the sheet feeding position after the start of the sheet feeding and thus contacts the sheet can be shortened, so that the sheet interval corresponding to a necessary amount generating due to a variation in this time can be shortened.

The retard roller 7 is held swingably by a retard roller holder 7b so as to contact the feed roller 6. The retard roller 7 is contacted to the feed roller 6 with a separation pressure Ns ((c) of FIG. 3 and the like), which is suitable for a separating operation and which is described later, by an unshown urging unit for urging the feed roller 6, so that the separation nip is formed. The separation pressure Ns is set by a rotation load T, the sheet feeding pressure Np and respective friction coefficients so as to satisfy condition expressions described later.

The condition expressions of the separation pressure will be described with reference to (c) to (f) of FIG. 3. In FIG. 3, (c) is a partially schematic sectional view showing the separation nip before the uppermost sheet S1 of the plurality of sheets S is fed, (d) is a partially schematic sectional view showing the separation nip during the feeding of the sheet S1, (e) is a partially schematic sectional view showing the separation nip during separation between the sheet S1 and the sheet S2, and (f) if a partially schematic sectional view showing the separation nip when the sheet S2 is fed. In (c) of FIG. 3, F is the rotational direction (also the feeding direction of the sheet S at the separation nip) of the feed roller 6, $\mu_{fr}$ is a friction coefficient between the feed roller 6 and the retard roller 7, and R is radius of the retard roller 7. The rotation load T is specifically a shaft (axial) torque applied to the retard roller 7 by the torque limiter 8.

Here, the separation pressure Ns is set as follows. That is, the separation pressure Ns is set so that when the feed roller 6 rotates in the feeding direction (arrow F direction in (c) of FIG. 3), the retard roller 7 is rotated in the feeding direction by the rotational force applied thereto from the feed roller 6 against the rotation load T applied thereto. A condition expression A satisfying this setting is represented by the following formula.

$$\mu_{fr} \times Ns > T/R \qquad \text{condition expression A}$$

Next, in (d) of FIG. 3, $\mu_r$ is a friction coefficient between the sheet S1 and the retard roller 7. Here, the separation pressure Ns is set as follows. That is, the separation pressure Ns is set so that when only one sheet S1 is fed to and nipped in the separation nip, the retard roller 7 is rotated in the feeding direction by the rotational force applied thereto from the sheet S1 against the rotation load T applied thereto. A condition expression B satisfying this setting is represented by the following formula.

$$\mu_r \times Ns > T/R \qquad \text{condition expression B}$$

Next, in (e) of FIG. 3, $\mu_s$ is a friction coefficient between sheets, specifically between the sheet S1 and the sheet S2. Here, the separation pressure Ns is set as follows. That is, the separation pressure Ns is set so that when two sheets S1 and S2 are fed to and nipped in the separation nip, the rotation load T applied to the retard roller 7 is larger than the rotational force applied to the retard roller 7 from the sheet S2 and the retard roller 7 rotates to provide peripheral movement in the direction opposite to the feeding direction. A condition expression C satisfying this setting is represented by the following formula.

$$\mu_s \times Ns < T/R \qquad \text{condition expression C}$$

Next, in (d) of FIG. 3, $\mu_r$ is a friction coefficient between sheet S2 and the pick roller 5. Here, the separation pressure Ns is set so as to satisfy a relationship thereof with the rotation load T when the sheet S2 is fed by the pick roller 5 and the two sheets S1 and S2 are nipped and fed in the separation nip. That is, the separation pressure Ns is applied so that the rotation load T applied to the retard roller 7 is larger than the rotational force applied to the retard roller 7 by the sheet S2 and the retard roller 7 rotates to provide peripheral movement in the direction opposite to the feeding direction. A condition expression D satisfying this setting is represented by a formula shown below. As shown in (f) of FIG. 3, the friction coefficient μs is the friction coefficient between the sheets, and therefore is not only the friction coefficient between the sheet S1 and the sheet S2 but also a friction coefficient between the sheet S2 and a sheet subsequent to the sheet S2.

$$\mu_s \times Nx + (\mu_p \mu_s) \times Np < T/R \qquad \text{condition expression D}$$

Here, materials, hardness, surface roughness and the like of the feed roller 6 and the retard roller 7 are set so that the friction coefficient $\mu_{fr}$ between the feed roller 6 and the retard roller 7 is larger than the friction coefficient $\mu_r$ between the sheet S and the retard roller 7 ($\mu_{fr} > \mu_r$). Therefore, the condition expression A is embraced by the condition expression B.

Further, the material, hardness, surface roughness and the like of the pick roller 5 are set so that the friction coefficient $\mu_p$ between the sheet S and the pick roller 5 is larger than the friction coefficient $\mu_s$ between the sheets S ($\mu_p > \mu_s$). Therefore, the condition expression C is embraced by the condition expression D.

$$(1/\mu_s)(T/R) - ((\mu_p/\mu_s) - 1) Np > Ns > (1/\mu_r)(T/R)$$

In the case of the state of (f) of FIG. 3, setting is made so that the retard roller 7 rotates to provide peripheral movement in the direction opposite to the feeding direction. However, the pick roller 5 contacts the sheet S2 and is provided with a one way clutch 5a, and therefore, the sheet S2 is not returned toward an upstream side with respect to the feeding direction by the retard roller 7. That is, in (f) of FIG. 3, the retard roller 7 maintains its state in which the rotation thereof is at rest.

(Control Block Diagram)

Figure 4:
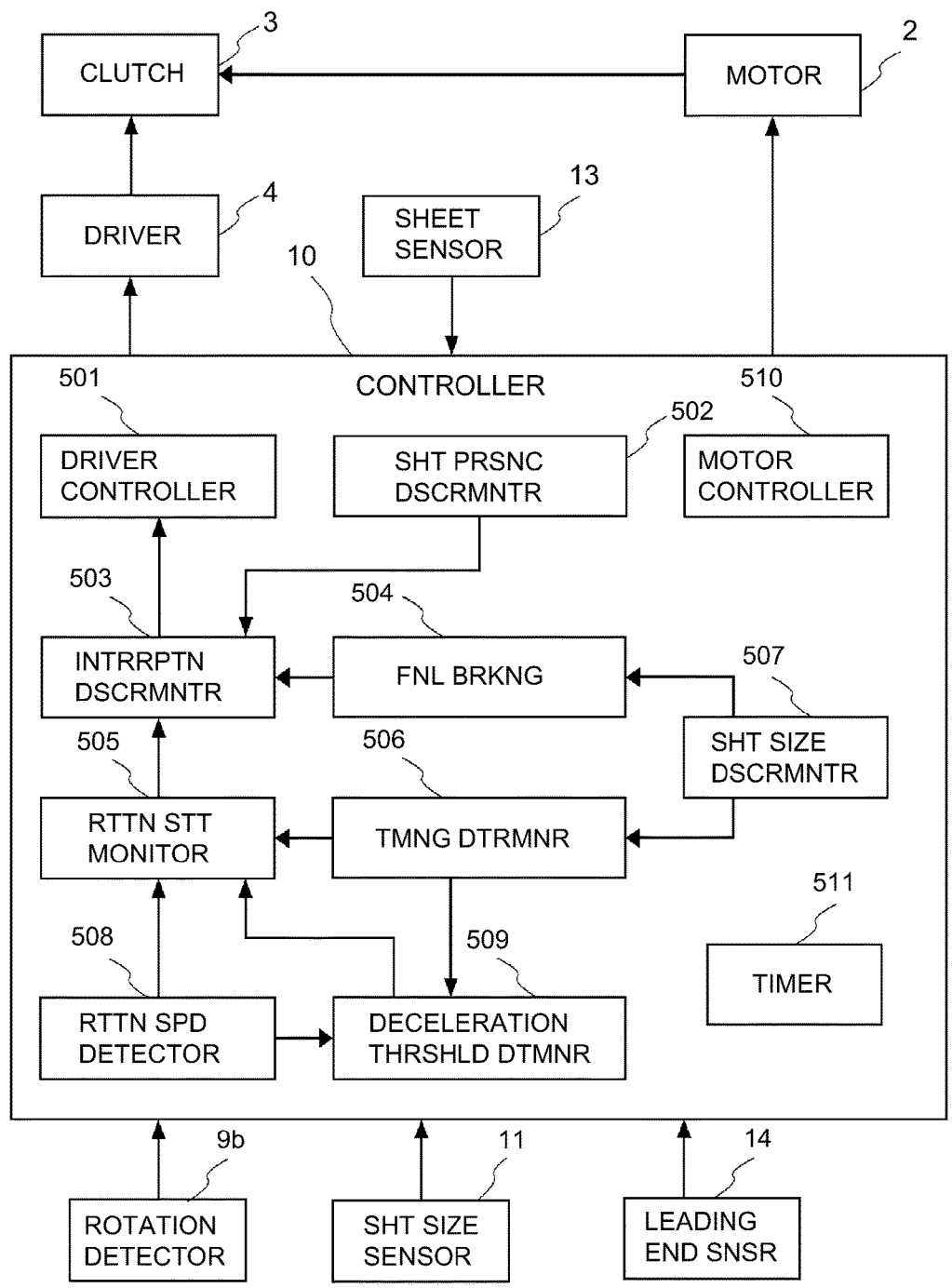
FIG. 4 is a control block diagram of the sheet feeding device in Embodiment 1.

A control block diagram of the sheet feeding device 1 in this embodiment is shown in FIG. 4. As shown in FIG. 4, the control element 10 includes a sheet feeding and driving controller 501, a sheet presence-absence discriminating portion 502, a sheet control interruption discriminating portion 503, a final interruption timing determining portion 504 and a rotation state monitoring portion 505. Further, the control element 10 includes a rotation state monitoring timing determining portion 506, a sheet size discriminating portion 507, a rotational speed detecting portion 508, a deceleration discriminating threshold determining portion 509, a monitor controller 510 and a timer 511. Incidentally, constituent elements which are the same as those described with reference to FIG. 1 are represented by the same reference numerals or symbols and will be omitted from description.

A sheet feeding operation in this embodiment will be described with reference to FIGS. 5 and 6. Since the sheet feeding operation is different depending on the state of the sheet S, the sheet feeding operation will be specifically described in the following order.

Sheet feeding operation 1: The sheet feeding operation is first performed after the sheets S are stacked on the intermediary plate 16. In this operation, a plurality of sheets S are continuously fed and the friction coefficient $\mu_s$ between the sheets S is relatively low.

Sheet feeding operation 2: The sheet feeding operation is first performed after the sheets S are stacked on the intermediary plate 16. In this operation, a plurality of sheets S are continuously fed and the friction coefficient $\mu_s$ between the sheets S is relatively large.

Sheet feeding operation 3: During continuous feeding of a plurality of sheets S, the number of sheets S stacked and remaining on the intermediary plate 16 is one.

(Sheet Feeding Operation 1)

Details of the sheet feeding operation 1 of the sheet feeding device 1 will be described. In FIG. 5, (a) is a partially schematic sectional view showing the sheet feeding device 1 immediately after start of drive, (b) is a partially schematic sectional view showing the sheet feeding device 1 during feeding of the sheet S1, (c) is a partially schematic sectional view showing the sheet feeding device 1 during feeding of the sheet S1 in a state different from the state in this embodiment, (d) is a partially schematic sectional view showing the sheet feeding device 1 in the first half of a feeding process of the sheet S1 (hereinafter referred to as the first half of feeding), (e) is a partially schematic sectional view showing the sheet feeding device 1 in the latter half of the feeding process of the sheet S1 (hereinafter referred to as the latter half of feeding), (f) is a partially schematic sectional view showing the sheet feeding device 1 during feeding of the sheet S1, (g) is a partially schematic sectional view showing the sheet feeding device 1 after continuous feeding of the sheet S2 described later, and (h) is a partially schematic sectional view showing the sheet feeding device after the sheet S1 is fed through the separation nip. Constituent elements which are the same as those described with reference to FIG. 1 and the like are represented by the same reference numerals or symbols and will be omitted from description.

Figure 5:
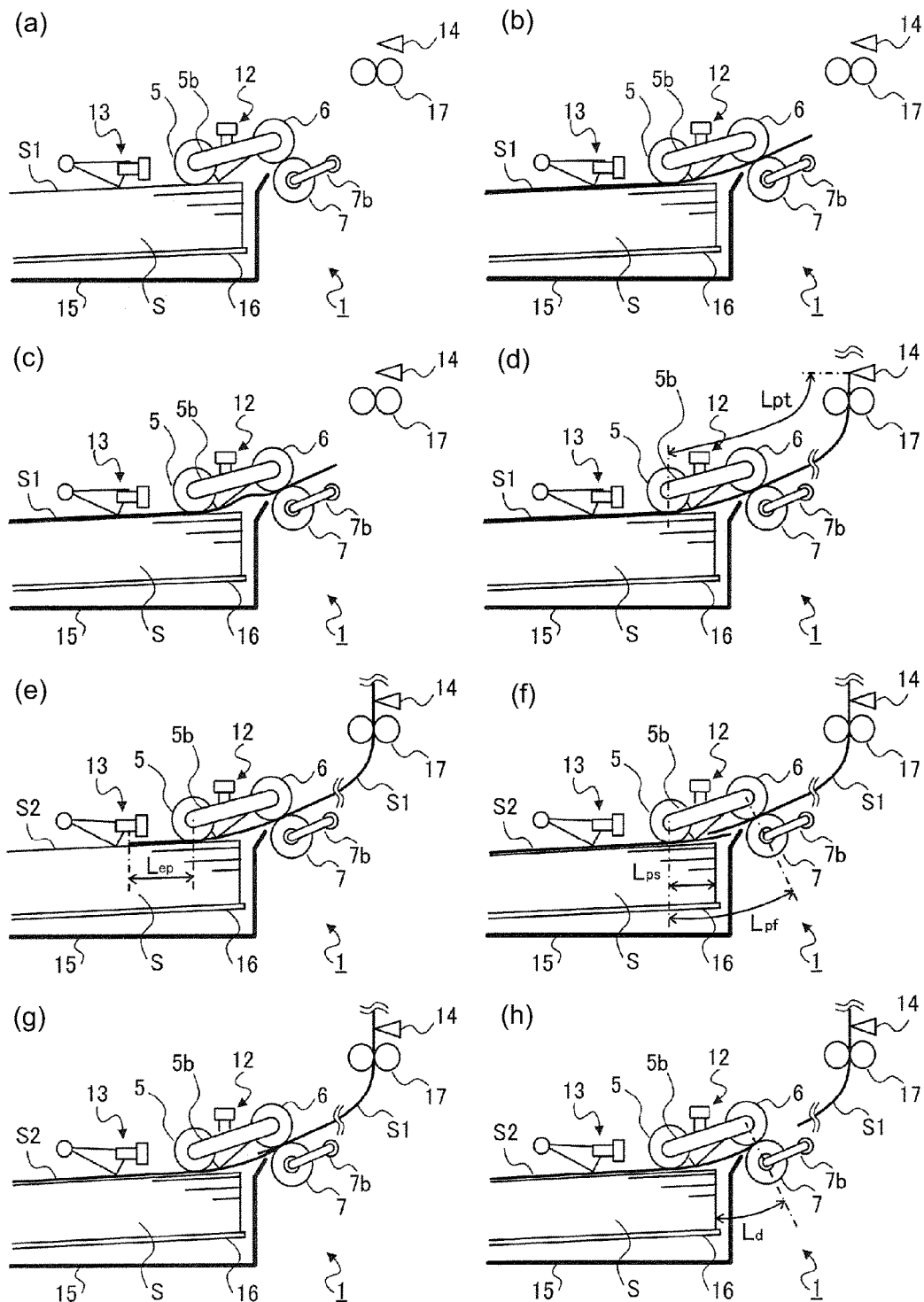
In FIG. 5, (a) to (h) are schematic views showing the sheet feeding device from start of drive to after feeding in Embodiment 1.

In FIG. 5, (a) shows a state immediately after the drive from the motor 2 is transmitted to the respective rollers through the electromagnetic clutch 3. When the sheet feeding and driving controller 501 starts the sheet feeding operation, the driving circuit 4 operates the electromagnetic clutch 3, so that the drive from the motor 2 is transmitted to the respective rollers. The pick roller 5 rotates in the feeding direction when the drive is transmitted, and feeds the contacting sheet S1 to the separation nip formed by the feed roller 6 and the retard roller 7. Here, the sheet feeding operation 1 is performed first after the sheets S are stacked on the intermediary plate 16, and therefore, the leading end of the sheet S1 is to be fed from the same position as the leading end of the stacked sheets S.

Further, in the sheet feeding operation 1, the friction coefficient $\mu_s$ between the sheets S is relatively small, and therefore the sheet fed to the separation nip by the pick roller 5 is only the uppermost sheet S1, i.e., only one sheet. Further, the driving force is applied to the feed roller 6 in the feeding direction and is applied to the retard roller 7 to provide peripheral movement in the direction opposite to the feeding direction, but as shown in (c) of FIG. 3, each of the feed roller 6 and the retard roller 7 is rotated in the feeding direction on the basis of the setting of the separation pressure Ns.

In FIG. 5, (b) shows a state in which the sheet S1 fed by the pick roller 5 reaches the separation nip and thereafter is fed by the pick roller 5 and the feed roller 6. Here, the feeding speed Vp of the pick roller 5 is set so as to be equal to or less than the feeding speed Vf of the feed roller 6

(Vp≤Vf). This is because in the case where the feeding speed Vp is set so as to be faster than the feeding speed Vf, as shown in (c) of FIG. 5, the pick roller 5 pushes the sheet S1 relatively and thus there is a liability that a loop generation on the sheet S1.

There is a liability that the loop as shown in (c) of FIG. 5 has the influence on the sheet feeding depending on a degree thereof, and therefore it is desirable that the loop is not generated. Although it is possible to avoid the generation of the loop also by the setting or the like of the sheet feeding pressure Np, in order to provide the setting of the sheet feeding pressure Np with a degree of freedom, the generation of the loop may desirably be avoided by providing a feeding speed difference (Vf≥Vp). Incidentally, even when the feeding speed Vp is set so as to be slower than the feeding speed Vf, the pick roller 5 is provided with the one-way clutch 5a, and therefore to the feed roller 6, an excessive load (back tension) by the pick roller 5 is not applied. Further, the feeding speed Vp is set on the basis of a relation between positions of the separation nip and the sheet S as described later.

In FIG. 5, (d) shows a state in which the sheet S1 is fed by the feed roller pair 17 as the feeding unit and the leading end of the sheet S1 reached the sheet leading end sensor 14 which is provided downstream of the feed roller pair 17 and which is described later. The sheet leading end sensor 14 as the second detecting unit is provided at a position of not more than a minimum sheet fed from the sheet feeding cassette 15. Specifically, a distance Lpt (indicated by a double-pointed arrow in (d) of FIG. 5) along a driving path from a contact position of the pick roller 5 with the sheet S to the sheet leading end sensor 14 is made not more than a length of the sheet, with respect to the feeding direction, having a minimum size of sheet sizes for which use is permitted in the image forming apparatus 100. The rotation state monitoring timing determining portion 506 determines motoring timing of the rotation detecting element 9b on the basis of the length of the sheet S with respect to the feeding direction discriminated by the sheet size discriminating portion 507. The size discriminating portion 507 discriminates the length of the sheet S with respect to the feeding direction from a detection result of the sheet size sensor 11 and a detection result of an actual length of the fed sheet S measured using the sheet leading end sensor 14. At this time, the rotation speed detecting portion 508 starts detection of an edge interval of a pulse signal of the rotational speed sensor 9. Further, the final interruption determining portion 504 determines final interruption timing used in control by the driving controller 501. The final interruption timing is determined so that the connection of the electromagnetic clutch 3 can be interrupted at timing before the trailing end of the sheet S passes through the separation nip between the feed roller 6 and the retard roller 7, on the basis of the length of the sheet S discriminated by the size discriminating portion 507 and the feeding speed of the sheet S.

In FIG. 5, (e) shows a state in which the sheet S1 is further fed and the trailing end of the sheet S1 as the first recording material reached a predetermined position of a distance Lep to the contact position with the pick roller 5. The distance Lep is a distance corresponding to timing determined by the monitoring timing determining portion 506. The monitoring timing determining portion 506 determines timing when the trailing end of the sheet S1 reaches the position of the distance Lep, on the basis of the length of the sheet S1 and the feeding speed Vp. When the trailing end of the sheet S1 reaches the position of the distance Lep, the control element 10 operates in the following manner. That is, the control element 10 determines a deceleration discriminating threshold on the basis of a detection result of the detecting portion 508 by the deceleration discriminating threshold determining portion 509. Further, the control element 10 starts discrimination as to whether the connection of the electromagnetic clutch 3 is continued or interrupted, by the sheet feeding control interruption discriminating process 503 on the basis of a monitoring result by the rotation state monitoring portion 505. Thereafter, when the trailing end of the uppermost sheet S1 passes through the nip of the pick roller 5, the pick roller 5 performs an operation in which the sheet S2 subsequent to the sheet S1 is continuously fed and the leading end of the sheet S2 is caused to reach the separation nip (hereinafter referred to as continuous feeding).

In FIG. 5, (f) shows a state in which the trailing end of the sheet S1 is fed toward a side downstream of the pick roller 5 with respect to the feeding direction and the pick roller 5 is contacted to the sheet S2 and the continuous feeding is started. At this time, as shown in (f) of FIG. 5, the leading end of the sheet S2 is fed until the leading end of the sheet S2 reaches the separation nip in a state in which the leading end of the sheet S2 overlaps with the trailing end of the sheet S1. In the case where the feeding speed Vp is set so as to be very slower than the feeding speed Vs (Vp<<Vs), before the leading end of the sheet S2 reaches the separation nip, the overlapping with the trailing end of the sheet S1 is eliminated, so that the state as shown in (f) of FIG. 3 is not formed and the continuous feeding cannot be made.

For that reason, the feeding speed Vp is set so as to satisfy condition expressions shown below. In (f) of FIG. 5 and the condition expressions, Lpf is a distance from the contact position between the pick roller 5 and the sheet S to the separation nip, and Lps is a distance from the contact position between the pick roller 5 and the sheet S to a leading end position of the sheet S stacked on the intermediary plate 16. Further, tz is a stop time from contact of the leading end of the continuously fed sheet S2 with the retard roller 7 to stop of the pick roller 5 and will be described later specifically. The condition expressions satisfying this setting are represented by the following formulas.

$$Lpf/Vf > ((Lpf-Lps)/Vp) + tz$$

Therefore, $Vp > ((Lps-Lps)/(Lpf-Vf \times tz)) \times Vf$ holds.

Further, from a condition expression (Vf≥Vp) in which the above-described loop is not generated on the sheet S1, the following formula holds.

$$Vf \geq Vp > ((Lpf-Lps)/(Lpf-Vf \times tz)) \times Vf$$

That is, in order to provide the setting of the feeding speed Vp with the degree of freedom, it is only required that the distance Lps is increased and the time tz is decreased.

As shown in (g) of FIG. 5, when the leading end of the continuously fed sheet S2 contacts the retard roller 7, a speed change of the retard roller 7 generates. The monitoring portion 505 compares a current peripheral speed Vr of the retard roller 7 detected by the detecting portion 508 with the deceleration discriminating threshold determined by the threshold determining portion 509 and in the case where the current peripheral speed Vr of the retard roller 7 is below the deceleration discriminating threshold, the rotation state is discriminated as no rotation. In the case where the monitoring result of the monitoring portion 505 is no rotation, the interruption discriminating portion 503 discriminates that the connection of the electromagnetic clutch 3 is interrupted (hereinafter referred to as sheet feeding control interruption), and the drive controller 501 stops the drive for the sheet feeding.

After the sheet feeding of the sheet S1 is completed, as shown in (h) of FIG. 5, the leading end of the sheet S2 is positioned at the separation nip, also leading ends of subsequent sheets S are similarly positioned at the separation nip. That is, sheet feeding starting positions of the second sheet S and the later sheets are uniformized (aligned), and therefore it becomes possible to reduce a degree of the sheet feeding variation Ld generated by a variation in sheet feeding starting position. Further, in a state of (f) of FIG. 5 and the later states, in the case where the monitoring result of the monitoring portion 505 is not no rotation, a process is made in the following manner. When the timing is the final interruption timing determined by the final image formation timing determining portion 504, i.e., timing when a predetermined time as a second time has elapsed, the interruption discriminating portion 503 makes discrimination as being the sheet feeding control interruption. Then, the drive controller 501 stops the sheet feeding drive, so that erroneous feeding of the sheet S2 as described with reference to (d) and (e) of FIG. 25 is prevented.

(Sheet Feeding Operation 2)

Details of the sheet feeding operation 2 of the sheet feeding device 1 will be described using (a) and (b) of FIG. 6. Constituent elements which are the same as those in FIG. 5 are represented by the same reference numerals or symbols and will be omitted from description. In FIG. 6, (a) is a partially schematic sectional view showing the sheet feeding device 1 in the first half of a separating operation between the sheet S1 and the sheet S2, and (b) is a partially schematic sectional view showing the sheet feeding device 1 in the latter half of the separating operation between the sheet S1 and the sheet S2. In FIG. 6, (a) shows a state in which when the pick roller 5 feeds the contacting sheet S1, the friction coefficient $\mu_s$ between the sheets S is relatively large and therefore also the sheet S2 is fed together with the sheet S1, and thus the sheet S2 reached the separation nip. At this time, as shown in (e) of FIG. 3, the retard roller 7 is set so as to rotate to provide peripheral movement in the direction opposite to the feeding direction on the basis of the setting of the separation pressure Ns, but maintains the rotation stop state depending on the kind of sheet S and various settings. In this embodiment, the case where the retard roller 7 maintains the rotation stop state will be described.

Figure 6:
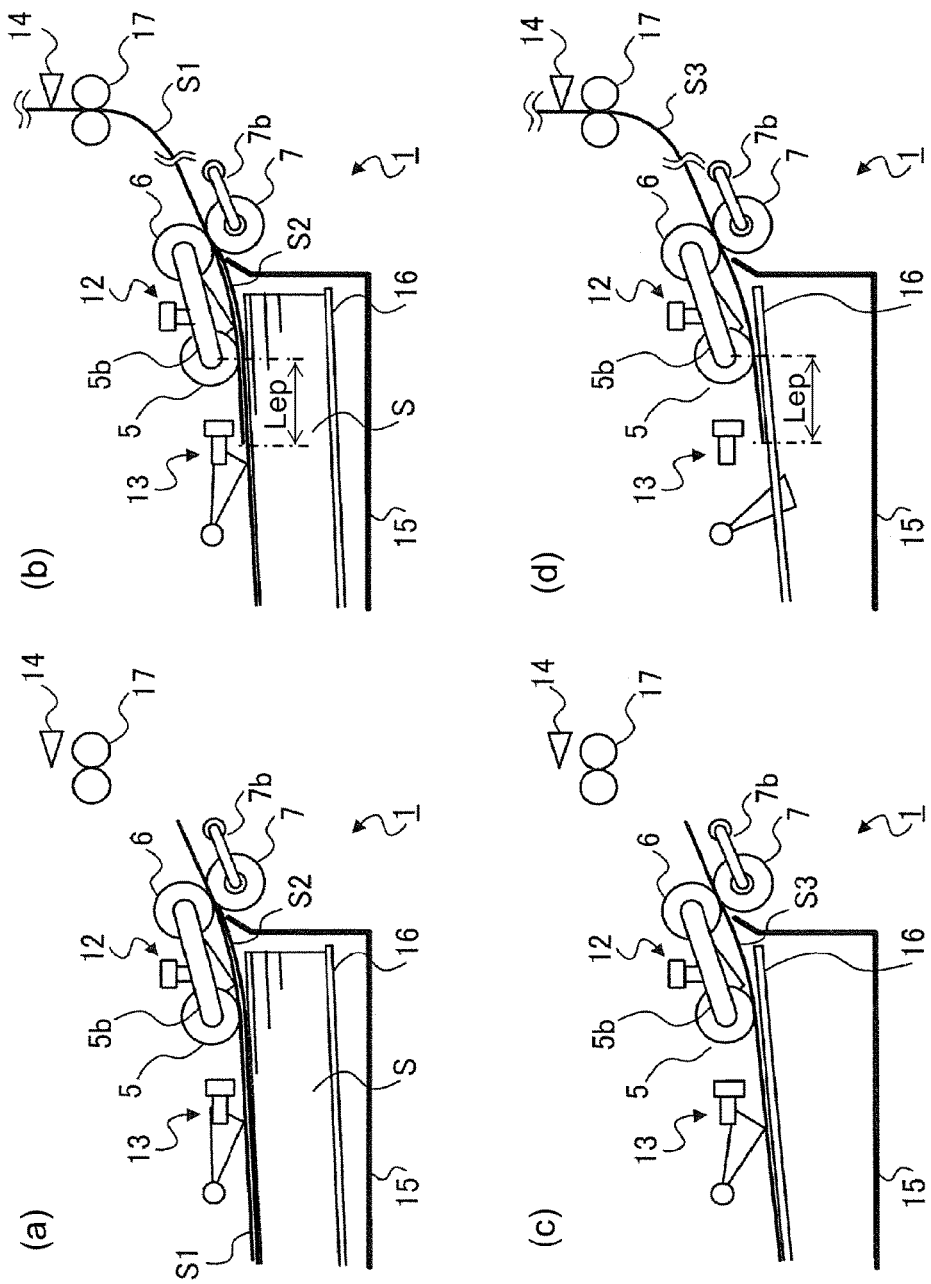
In FIG. 6, (a) to (d) are schematic views each showing a pick roller and the separation nip in Embodiment 1.

In FIG. 6, (b) shows a state in which the sheet S1 is further fed and the trailing end of the sheet S1 reached the position of the distance Lep to the pick roller 5. At this time, the threshold determining portion 509 determines a lower limit of the deceleration discriminating threshold as a threshold. Thereafter, the monitoring portion 505 discriminates that the current peripheral speed Vr of the retard roller 7 is below the deceleration discriminating threshold since the current peripheral speed is 0 (stop), so that the rotation state is no rotation and the monitoring portion 505 outputs information thereof to the interruption discriminating portion 503. In the case where the monitoring result of the monitoring portion 505 is no rotation, the interruption discriminating portion 503 discriminates as being the sheet feeding control interruption and provides an instruction to interrupt the connection of the electromagnetic clutch 3 and thus stops the sheet feeding drive. After the state of (b) of FIG. 6, the drive transmission from the electromagnetic clutch 3 is interrupted, so that the pick roller 5 and the feed roller 6 lose their driving forces, but are rotated in the feeding direction during a period in which these rollers contact the sheet S1 fed by the feed roller pair 17.

The pick roller 5 and the feed roller 6 are provided with the one-way clutches 5a and 6a, respectively, and therefore rotation thereof is not prevented. When the feeding of the sheet S1 is completed, similarly as when the sheet feeding operation 1 is completed as shown in (h) of FIG. 5, the leading end of the sheet S2 is positioned at the separation nip, and also leading ends of subsequent sheets S are similarly positioned at the separation nip. Further, even when the trailing end of the sheet S1 passed through the pick roller 5 and the pick roller 5 contacts the sheet S2, the drive to the pick roller 5 is interrupted and therefore the pick roller 5 does not feed the sheet S2.

(Sheet Feeding Operation 3)

Details of the sheet feeding operation 3 of the sheet feeding device 1 will be described using (c) and (d) of FIG. 6. In FIG. 6, (c) is a partially schematic sectional view showing the sheet feeding device 1 in the first half of a feeding operation of a sheet, contacting the intermediary plate 16, of the sheets S stacked on the intermediary plate 16, i.e., a final sheet S3, and (d) is a partially schematic sectional view showing the sheet feeding device 1 in the latter half of the feeding operation between the final sheet S3. In FIG. 6, (c) shows a state in which the sheet S3 as the final sheet S is fed by the sheet feeding operation 1 or the sheet feeding operation 2, and 8d) shows a state in which the trailing end of the sheet S3 reached the position of the distance Lep to the pick roller 5. As described above, the position where the sheet presence-absence sensor 13 as the third detecting unit contacts the sheet S is in a side upstream of the distance Lep with respect to the feeding direction. When the trailing end of the sheet S3 is in the position of the distance Lep, at the time of the start of the discrimination shown in (d) of FIG. 6, the sheet presence-absence sensor 13 detects absence of the subsequent sheet S on the sheet feeding cassette 15 (on the sheet feeding portion). For this reason, the sheet presence-absence discriminating portion 502 discriminates as being no sheet (absence of the sheet), and outputs information thereof to the interruption discriminating portion 503.

In the case where a discrimination result of the sheet presence-absence discriminating portion 502 is no sheet, the interruption discriminating portion 503 discriminates as being the sheet feeding control interruption and provides an instruction to interrupt the connection of the electromagnetic clutch 3 and thus stops the sheet feeding drive. Accordingly, in a state in which there is no sheet S on the intermediary plate 16, it becomes possible to prevent generation of abrasion or the like of the pick roller 5 due to execution of the continuous feeding operation.

[Peripheral Speed Change of Retard Roller and Discriminating Condition]

(Case of Sheet Feeding Operation 1)

Figure 7:
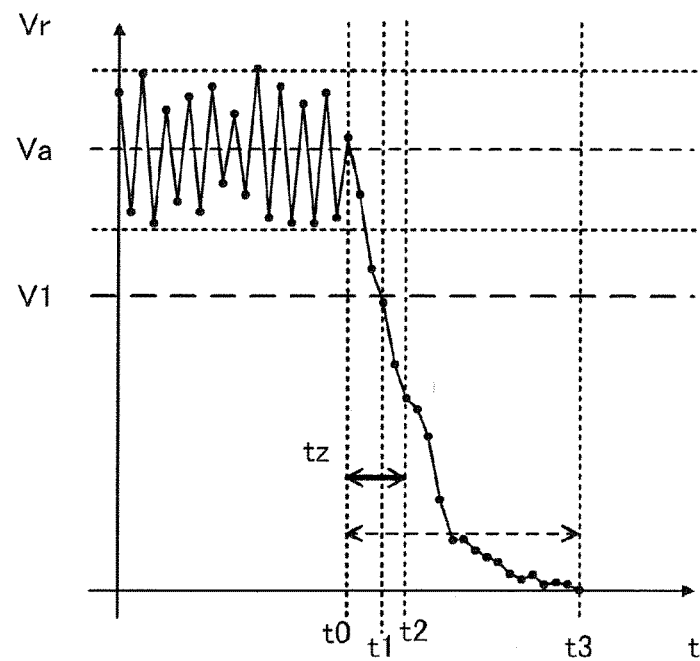
In FIG. 7, (a) and (b) are graphs each showing a change in peripheral speed of a retard roller in Embodiment 1.
Figure 7:
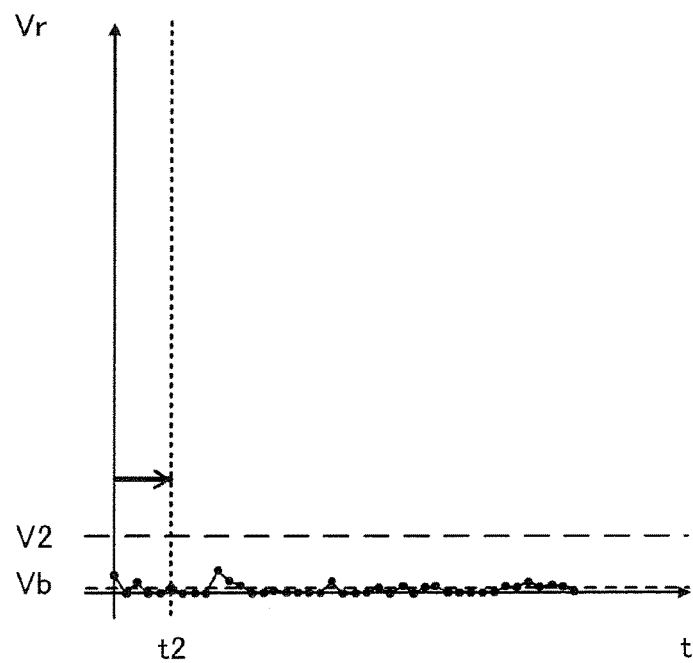

A peripheral speed change of the retard roller 7 and a discriminating condition will be described using FIG. 7. In FIG. 7, (a) is a graph showing the peripheral speed change of the retard roller 7 in the sheet feeding operation 1. In (a) of FIG. 7, the abscissa represents a time t, and the ordinate represents the peripheral speed Vr of the retard roller 7. In (a) of FIG. 7, t0 is timing when the leading end of the continuously fed sheet S2 contacts the retard roller 7, t1 is timing when the control element 10 discriminates the change in peripheral speed Vr, t2 is timing when the pick roller 5 stops, t3 is timing when the retard roller 7 stops, and tz is a stop time from the contact of the leading end of the continuously fed sheet S2 with the retard roller 7 to stop of the pick roller 5 and is a time (elapsed time) from t0 to t2. Incidentally, in (a) of FIG. 7, a stop time in the conventional example is represented by a broken line (from t0 to t3).

Further, V1 is a first discriminating peripheral speed which is a deceleration discriminating threshold as a first threshold for discriminating the change in peripheral speed Vr by the control element 10, and Va is an average peripheral speed of the retard roller 7 in a state in which one sheet S is nipped in the separation nip, and these speeds will be specifically described later. The control element 10 monitors the rotation state of the retard roller 7 by the detecting portion 508 on the basis of a pulse period of the rotation detecting element 9b, but in this embodiment, the peripheral speed Vr of the retard roller 7 is used for explanation. From the pulse period, in addition to the Vr, a rotational frequency or the like can be derived as a value relating to the rotation of the retard roller 7 by calculation, and these values are all treated similarly, so that the discriminating condition is not limited to the peripheral speed Vr.

As shown in (a) of FIG. 7, before t0, i.e., before the leading end of the sheet S2 contacts the retard roller 7, the retard roller 7 rotates at the average peripheral speed Va with minute speed fluctuation. The minute speed fluctuation generated in the peripheral speed Vr of the retard roller 7 is generated because the friction coefficient $\mu_r$ shown in (d) of FIG. 3 is not completely constant but causes a minute fluctuation. The control element 10 continuously monitors the rotation state of the retard roller 7 from start of the monitoring which is timing when the leading end of the sheet S1 reaches the sheet leading end sensor 14, and calculates the average peripheral speed Va from the peripheral speed Vr in a certain section. When the trailing end of the sheet S reaches the position of the distance Lep, the control element 10 may also start the monitoring of the peripheral speed Vr of the retard roller 7 at timing of a lapse of a predetermined time from the timing when the leading end of the sheet S1 reaches the sheet leading end sensor 14.

In a first discriminating condition, the threshold determining portion 500 calculates the first discriminating peripheral speed V1 on the basis of the average peripheral speed Va and a predetermined deceleration rate and outputs the first discriminating peripheral speed V1 to the monitoring portion 505. For example, in the case where the deceleration rate is 60%, a value obtained by multiplying the average peripheral speed Va by 0.6 is the first discriminating peripheral speed V1. In the case where the peripheral speed Vr is not less than the first discriminating peripheral speed V1 (not less than a first value) inputted from the threshold determining portion 509, the monitoring portion 505 discriminates that the retard roller 7 rotates, and at timing when the peripheral speed Vr is below the first discriminating peripheral speed V1 (less than the first value), discriminates that the retard roller 7 is not in a rotation state (no rotation). Therefore, in (a) of FIG. 7, the monitoring portion 505 discriminates that the retard roller 7 rotates at timing before the time t0, and discriminates that the retard roller 7 is not in the rotation state at timing of t1 when the peripheral speed Vr is below the first discriminating peripheral speed V1.

Thus, the monitoring portion 505 discriminates the rotation state of the retard roller 7 by using the first discriminating peripheral speed V1. As a result, a time from the arrival of the leading end of the sheet S2 at the retard roller 7 to the discrimination of the change in peripheral speed Vr of the retard roller 7 can be reduced compared with a time in the case where the discrimination is made by the stop of the retard roller 7. The time until the change in peripheral speed Vr of the retard roller 7 is discriminated is a time from t0 to t1. Further, a time (double-pointed arrow indicated by a broken line in (a) of FIG. 7) from contact of the leading end of the sheet S2 with the retard roller 7 to the stop of the retard roller 7 is a time from t0 to t3. The driving circuit 4 to which the instruction to stop the drive of the drive controller 501 is provided interrupts the drive transmission from the motor 2 to the electromagnetic clutch 3 in a time from t1 to t2, and therefore the stop time tz (double-pointed arrow indicated by a solid line in (a) of FIG. 7) of the pick roller 5 is only a toner from t0 to t2.

By the above-described constitution, before the trailing end of the uppermost sheet S1 of the sheets stacked on the intermediary plate 16 passes through the separation nip, the leading end of the sheet S2 continuously fed by the pick roller 5 can be caused to reach the separation nip. Then, after the leading end of the sheet S2 contacts the retard roller 7, the drive transmission of the electromagnetic clutch 3 is interrupted in a short time through the driving circuit 4, so that the pick roller 5 can be stopped instantaneously. For that reason, it is possible to suppress generation of a problem, as described with reference to (d) of FIG. 25, for which there was a possibility of occurrence in the conventional example.

Further, in the constitution in this embodiment, in order to solve the above described problem, there is no need to narrow the adjustable range of the respective parameters, and therefore, it is possible to compatibly realize the sheet feeding and separating performance and durability and the like and to reduce a cost for the adjustment. Further, every feeding of the sheet S, i.e., during every sheet feeding, the threshold determining portion 509 calculates the first discriminating peripheral speed V1 on the basis of the average peripheral speed Va and the predetermined deceleration rate. For this reason, even in the case where changes generate in friction coefficients $\mu_r$, $\mu_s$, $\mu_p$ and the like, the first discriminating peripheral speed V1 depending on the associated change is calculated for every sheet feeding and can be set as a discriminating condition. Therefore, for example, compared with the case where a certain peripheral speed is set as a discriminating peripheral speed in advance, even after the respective rollers are abraded due to the kind and state of the sheet S, the environmental condition, long-term use, a proper first discriminating peripheral speed V1 can be obtained. For this reason, a deceleration rate from the average peripheral speed Va can be set at a small value. For that reason, it leads to shortening of the above described time from t0 to t1, so that the adjustable range of the respective parameters can be broadly ensured.

(Case of Sheet Feeding Operation 2)

In FIG. 7, (b) is a graph showing the peripheral speed change of the retard roller 7 in the sheet feeding operation 2, wherein the abscissa represents a time t, and the ordinate represents the peripheral speed Vr of the retard roller 7. In (b) of FIG. 7, V2 is a second discriminating peripheral speed which is a deceleration discriminating threshold as a first threshold for discriminating the change in peripheral speed Vr by the control element 10, and Vb is an average peripheral speed of the retard roller 7 in a state in which two sheets S are nipped in the separation nip, and these speeds will be specifically described later. As described above with reference to (a) and (b) of FIG. 6, in the case where the friction coefficient $\mu_s$ between the sheets S is relatively large, the rotation of the retard roller 7 stops. In the first discriminating condition in this embodiment, the first discriminating peripheral speed V1 is calculated on the basis of the average peripheral speed Va and the predetermined deceleration rate. However, the retard roller 7 has already been at rest, and therefore the average peripheral speed Va is close to zero, and similarly also the first discriminating peripheral speed V1 is substantially zero. For that reason, as a second detecting condition in this embodiment, as shown in (b) of FIG. 7, a second discriminating peripheral speed V2 is set as a peripheral speed at which the retard roller 7 is in a state close to a rest (stop) state. The second discriminating peripheral speed V2 is a minimum of values settable as the deceleration discriminating threshold, i.e., a lower limit.

Therefore, in (b) of FIG. 6, in a stage (t2) where the trailing end of the sheet S1 reaches the position of the distance Lep upstream of the contact position between the pick roller 5 and the sheet S1 with respect to the feeding direction and the monitoring portion 505 starts discrimination, an average peripheral speed Vb of the retard roller 7 is below the second discriminating peripheral speed V2. For this reason, the monitoring portion 505 discriminates the retard roller 7 as being in no rotation state, and the drive controller 501 instructs the driving circuit 4 to stop the drive and thus stops the drive transmission of the electromagnetic clutch 3. That is, the sheet feeding starting positions of the sheets S are uniformized, and therefore it is possible to reduce the sheet feeding variation Ld generating due to a variation in sheet feeding starting position. Thus, by providing the second discriminating peripheral speed V2 in addition to the first discriminating peripheral speed V1, the deceleration rate from the average peripheral speed Vb can be set at a small value and the rotation state of the retard roller 7 can be properly discriminated.

(Sheet Feeding Control)

Figure 8:
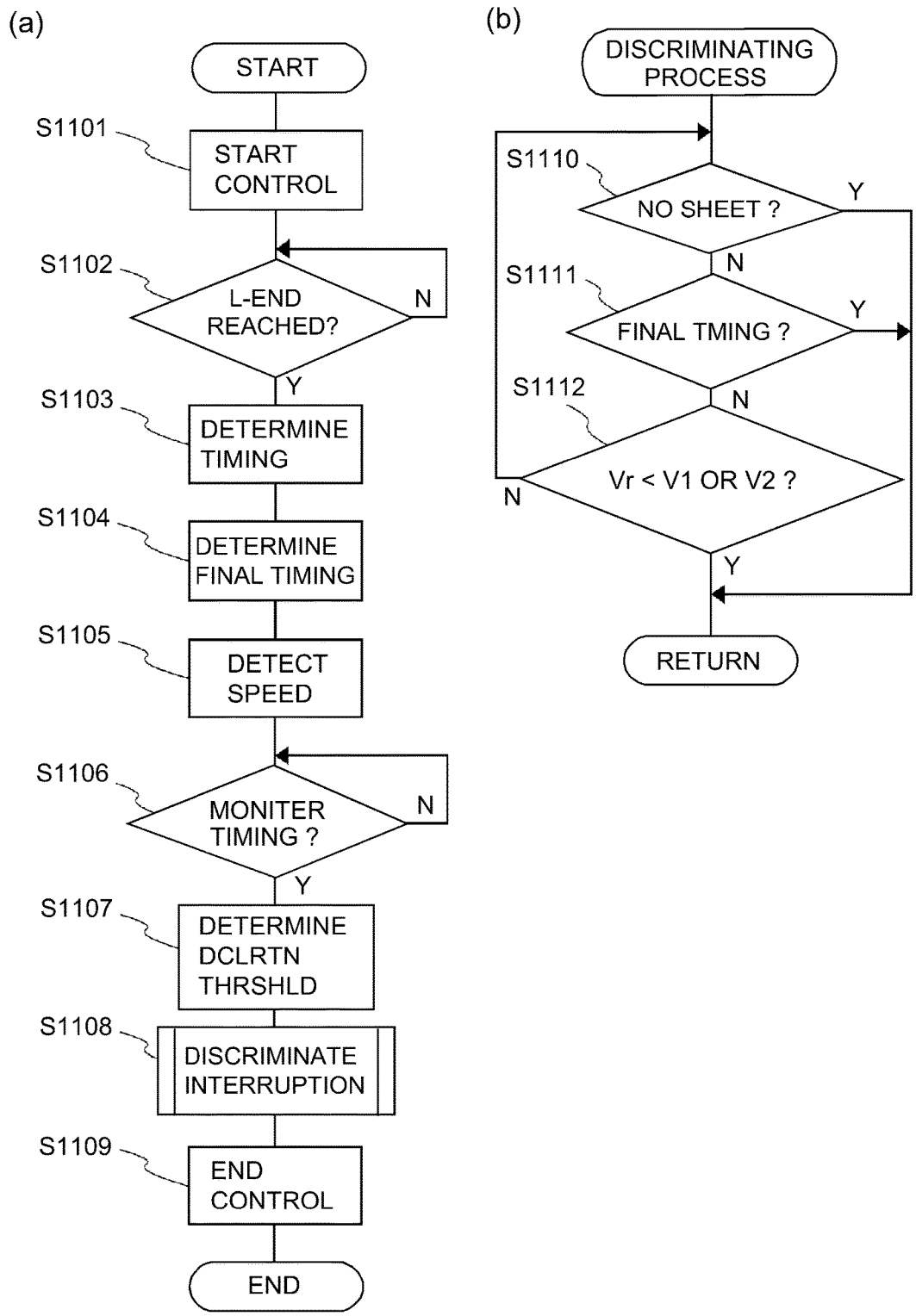
In FIG. 8, (a) and (b) are flowcharts showing a sheet feeding operation in Embodiment 1.

In FIG. 8, (a) is a flowchart for illustrating the sheet feeding operation in this embodiment. When a printing operation is started and a preliminary preparation is completed, the control element 10 starts a process starting from S (step) 1101. In S1101, the control element 10 starts sheet feeding control. As a result, the control element 10 provides an instruction so that the drive controller 501 controls the driving circuit 4 to establish the drive transmission (connection) of the electromagnetic clutch 3, so that sheet feeding of the sheet S by the pick roller 5 is started. In S1102, the control element 10 discriminates whether or not the leading end of the sheet S reaches the sheet leading end sensor 14, on the basis of the signal inputted from the sheet leading end sensor 14. In S1102, in the case where the control element 10 discriminates that the leading end of the sheet S does not reach the sheet leading end sensor 14, the control element 10 returns the process to S1102. In S1102, in the case where the control element 10 discriminates that the leading end of the sheet S reached the sheet leading end sensor 14, the control element 10 causes the process to go to S1103 and resets a timer 511 and the starts the timer 511. In S1103, the control element 10 controls the monitoring timing determining portion 506 to determine monitoring timing of the rotation state of the retard roller 7. In other words, the monitoring timing determining portion 506 determines timing when the trailing end of the sheet S reaches the position of the distance Lep.

In S1104, on the basis of a length of the sheet S with respect to the feeding direction discriminated by the size discriminating portion 507, the control element 10 controls the final interruption timing determining portion 504 to determine final interruption timing of the sheet feeding operation. In S1105, the control element 10 controls the detecting portion 508 to start rotational speed detection of the retard roller 7. In S1106, the control element 10 makes reference to the timer 511 and discriminates whether or not the timing reaches the monitoring timing determined in S1103. In other words, the control element 10 discriminates whether or not the trailing end of the sheet S1 reaches the position of the distance Lep from the contact position with the pick roller 5 in the upstream side with respect to the feeding direction. In S1106, in the case where the control element 10 discriminates that the timing does not reach the monitoring timing, the control element 10 returns the process to S1106, and in the case where the control element 10 discriminates that the timing reached the monitoring timing, the control element 10 causes the process to go to S1107. Incidentally, the control element 10 calculates the average peripheral speed Va or the average peripheral speed Vb in a predetermined section in a period from start of the detection of the rotational speed of the retard roller 7 by the detecting portion 508 to arrival of the timing at the monitoring timing.

In S1107, on the basis of the calculated average peripheral speed Va or average peripheral speed Vb of the retard roller 7, the control element 10 controls the threshold determining portion 509 to determine the first discriminating peripheral speed V1 or the second discriminating peripheral speed V2 as the deceleration discriminating threshold. In S1108, the control element 10 controls the interruption discriminating portion 503 to make interruption discrimination of the sheet feeding control on the basis of the detection result of the detecting portion and the deceleration discriminating threshold. The process in S1108 will be specifically described later. In S1108, in the case where a condition in which the interruption discrimination is made as sheet feeding control interruption described later is satisfied, in S1109, the control element 10 controls the drive controller 501 to instruct the driving circuit 4 to establish the drive connection of the electromagnetic clutch 3, and ends the sheet feeding control.

(Sheet Feeding Control Interruption Discriminating Process)

In FIG. 8, (b) is a flowchart for illustrating a sheet feeding control interruption discriminating process of S1108 in (a) of FIG. 8. In S1110, the control element 10 controls the sheet presence-absence discriminating portion 502 to discriminate whether or not no sheet (state) is detected. In S1110, in the case where the sheet presence-absence discriminating portion 502 discriminates that no sheet is detected, the control element 10 discriminates that a sheet feeding control interrupting condition is satisfied and ends the sheet feeding control interruption discriminating process, and then causes the process to go to S1109 of (a) of FIG. 8.

In S1110, in the case where the sheet presence-absence discriminating portion 502 discriminates that the presence of the sheet is detected, the control element 10 causes the process to go to S1111. In S1111, the control element 10 makes reference to the timer 511 and thus discriminates whether or not the timing reaches the final interruption timing of the sheet feeding operation determined by the final interruption timing determining portion 504 in S1104 of (a) of FIG. 8. In S1111, in the case where the control element 10 discriminates that the timing reached the final interruption timing, the control element 10 discriminates that the sheet feeding control interruption discriminating condition is satisfied and end the sheet feeding control interruption discriminating process, and then causes the process to go to S1109 of (a) of FIG. 8.

In S1111, in the case where the control element 10 discriminates that the timing does not reach the final interruption timing, the control element 10 causes the process to go to S1112. In S1112, the control element 10 discriminates whether or not the current peripheral speed Vr of the retard roller 7 detected by the detecting portion 508 is smaller than the deceleration discriminating threshold determined by the threshold determining portion 509 in S1107. In S1112, in the case where the control element 10 discriminates that the current peripheral speed Vr of the retard roller 7 is not less than the deceleration discriminating threshold (Vr≥V1 or Vr≥V2), the control element 10 returns the process to S1110. In S1112, in the case where the control element 10 discriminates that the current peripheral speed Vr or the retard roller 7 is smaller than the deceleration discriminating threshold (Vr<V1 or Vr<V2), the control element 10 discriminated that the sheet S reaches the retard roller 7. Then, the control element 10 ends the sheet feeding control interruption discriminating process and causes the process to go to S1119 of (a) of FIG. 8.

(Sheet Feeding Control Interruption Discriminating Process)

Incidentally, as described above, the peripheral speed Vr of the retard roller 7 depends on a fluctuation in friction coefficient $\mu_r$. For this reason, in the case where a portion where the friction coefficient $\mu_r$ is low is locally generated or in the like case, even before the leading end of the sheet S2 contacts the separation nip (before 0 of (a) of FIG. 7), there is a possibility that the peripheral speed Vr is below the first discriminating peripheral speed V1 (Vr<V1). In this case, the control element 10 controls the interruption discriminating portion 503 to discriminate that the sheet feeding control is interrupted and controls the drive controller 501 to instruct the driving circuit 4 to stop, so that the drive transmission of the electromagnetic clutch 3 is interrupted. The connection between the motor 2 and the electromagnetic clutch 3 is interrupted, and therefore the rotation of the pick roller 5 is stopped, so that the leading end of the sheet S2 cannot reach the separation nip. Further, in order to avoid such a phenomenon, when the first discriminating peripheral speed V1 is set at a small value, the stop time tz becomes long.

Figure 9:
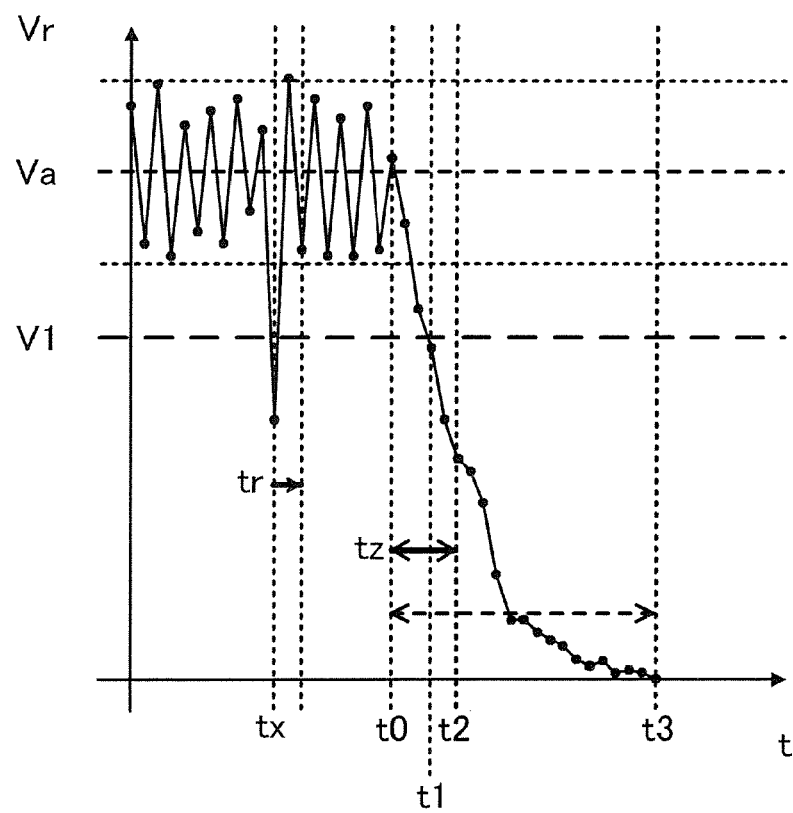
FIG. 9 is a graph showing a change in peripheral speed of the retard roller in Embodiment 1.

Therefore, sheet feeding control interruption discrimination meeting a local change in peripheral speed Vr of the retard roller 7 will be described. FIG. 9 is a graph showing a peripheral speed change of the retard roller 7 in the case where a local fluctuation generates, and description overlapping with the description with reference to (a) of FIG. 7 and the like will be described. FIG. 9 shows a state in which the peripheral speed Vr of the retard roller 7 is below the first discriminating peripheral speed V1 at tx which is the timing before t0 which is naturally the timing when the sheet S2 contacts the separation nip. At this timing tx, the interruption discriminating portion 503 discriminates that the sheet feeding control is interrupted and the drive controller 501 instructs the driving circuit 4 to stop. When a time from the stop instruction of the driving circuit 4 to the interruption of the drive transmission of the electromagnetic clutch 3 is checked specifically, it takes time although the time is short.

This is because a current flowing through the coil 3a of the electromagnetic clutch 3 lowers and it takes time (i.e., armature releasing time) (first time) until the drive transmission cannot be continued. Therefore, in the case where the peripheral speed Vr of the retard roller 7 exceeds the first discriminating peripheral speed V1 within a restoring time tr which is a time within this armature releasing time, discrimination that the peripheral speed Vr locally lowers is made, so that the drive controller 501 instructs the driving circuit 4 again to drive.

Figure 10:
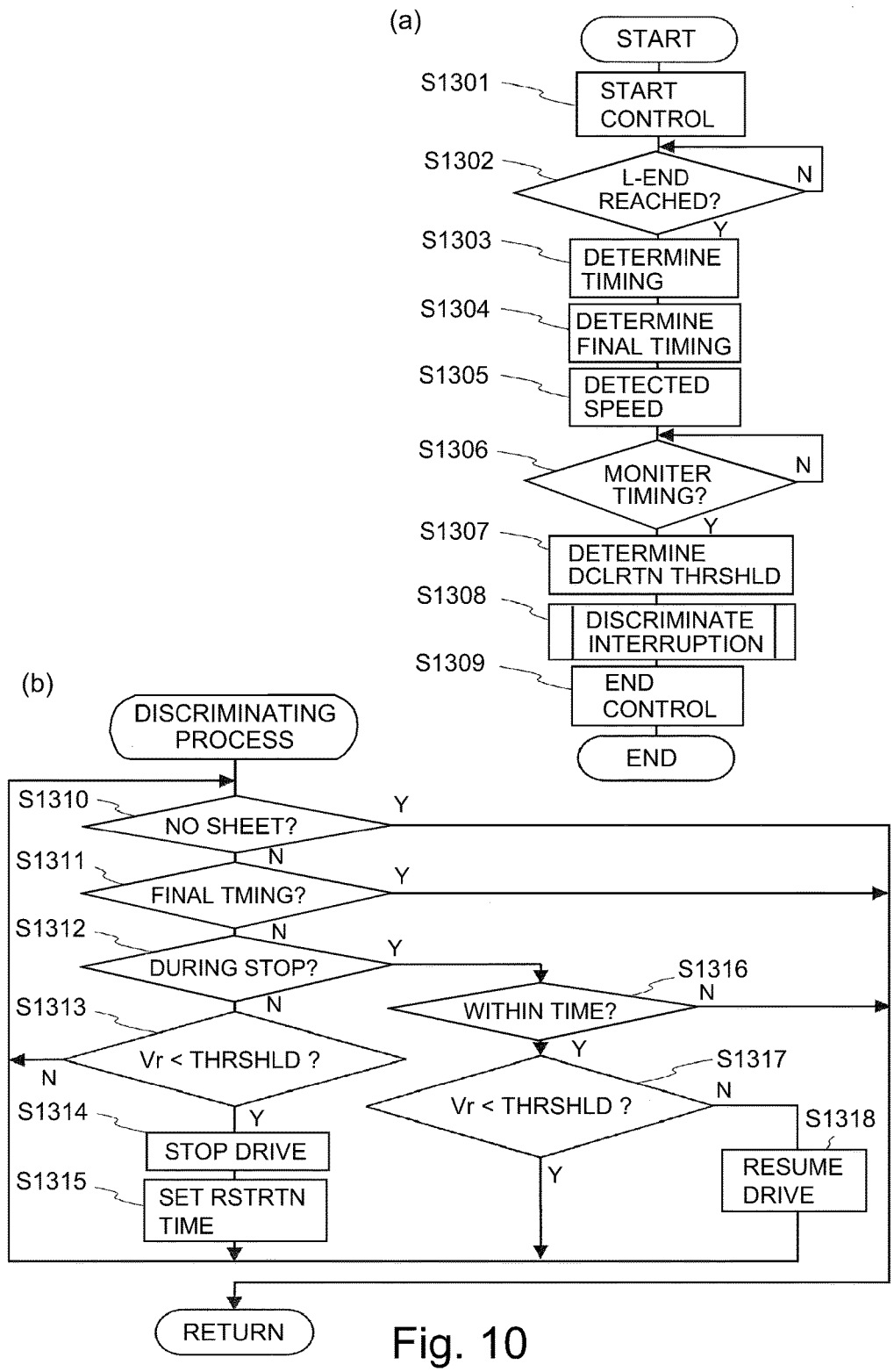
In FIG. 10, (a) and (b) are flowcharts showing a sheet feeding operation in Embodiment 1.

In FIG. 10, (a) is a flowchart for illustrating the sheet feeding operation meeting the local fluctuation in this embodiment. In (a) of FIG. 10, S1301-S1307 and S1309 are the same process as in S1101-S1107 and S1109 of (a) of FIG. 8 and will be omitted from description. In FIG. 10, (b) is a flowchart for illustrating the sheet feeding control interruption discriminating process in S1308 of (a) of FIG. 10. In (b) of FIGS. 10, S1310 and S1311 are the same process as in S1110 and S1111 of (b) of FIG. 8 and will be omitted from description.

In S1311, in the case where the control element 10 discriminates that the timing does not reach the final interruption timing, the control element 10 causes the process to go to S1312. In S1312, the control element 10 discriminates whether or not the sheet feeding drive is at rest. In S1312, in the case where the control element 10 discriminates that the sheet feeding drive is not at rest, i.e., the sheet feeding drive is during the drive of the pick roller 5, the control element 10 causes the process to go to S1313. In S1312, in the case where the control element 10 discriminates that the sheet feeding drive is at rest, the control element 10 causes the process to go to S1316. In S1313, the control element 10 discriminates whether or not the current peripheral speed Vr of the retard roller 7 detected by the detecting portion 508 is smaller than the deceleration discriminating threshold determined by the threshold determining portion 509 in S1307. In S1313, in the case where the control element 10 discriminates that the current peripheral speed Vr of the retard roller 7 is not less than the deceleration discriminating threshold, the control element 10 returns the process to S1310. In S1313, in the case where the control element 10 discriminates that the current peripheral speed Vr or the retard roller 7 is smaller than the deceleration discriminating threshold, the control element 10 causes the process to go to S1314. In S1314, the control element 10 controls the drive controller 501 to stop the sheet feeding drive and resets the timer 511, and then start the timer 511. In S1315, the control element 10 sets the restoring time tr following within the armature releasing time of the driving circuit 4 and returns the process to S1310.

In S1316, the control element 10 discriminates whether or not the restoring time tr set in S1315 elapsed by making reference to the timer 511. In S1316, in the case where the control element 10 discriminates that the restoring time tr does not elapse, the control element 10 causes the process to go to S1317. In S1317, the control element 10 discriminates whether or not the current peripheral speed Vr of the retard roller 7 is smaller than the deceleration discriminating threshold. In S1317, in the case where the control element 10 discriminates that the current peripheral speed Vr is smaller than the deceleration discriminating threshold, the control element 10 returns the process to S1310. In S1317, in the case where the control element 10 discriminates that the current peripheral speed Vr is not less than the deceleration discriminating threshold, the control element 10 discriminates that the local peripheral speed lowering generates in the retard roller 7 and causes the process to go to S1318. In S1318, the control element 10 controls the drive controller 501 to resume the sheet feeding drive and returns the process to S1310. In S1316, in the case where the control element 10 discriminates that the restoring time tr elapsed, the control element 10 discriminates that the sheet S reached the retard roller 7 and causes the process to go to S1309 of (a) of FIG. 10.

As described above, even in the case where the portion where the friction coefficient $\mu_r$ is locally low as shown at the timing tx in FIG. 9 generates, the rotation of the pick roller 5 is continued, so that the leading end of the sheet S2 is caused to reach the separation nip. Further, there is no need to set the first discriminating peripheral speed V1 at a small value, and therefore the stop time tz is shortened, so that it becomes possible to reduce the sheet feeding variation Ld. Thus, in this embodiment, before the trailing end of the sheet S1 during feeding passes through the separation nip, the pick roller 5 causes the leading end of the subsequent sheet S2 to reach the separation nip. Then, the pick roller 5 is stopped in a short time from the contact of the leading end of the subsequent sheet S2 with the retard roller 7. As a result, the sheet feeding starting positions of the subsequent sheet S2 and later sheets are aligned at the separation nip, and therefore it is possible to reduce the sheet feeding variation Ld generated due to a variation in sheet feeding starting position. Therefore, it is possible to provides a sheet feeding device capable of reducing the sheet feeding variation Ld and narrowing the sheet feeding interval.

In this embodiment, the constitutions, the units, the arrangements, the parameter settings, the condition expressions, the flowcharts and the like which are described above should be appropriately changed depending on structures and various conditions of the devices (apparatuses) to which the present invention is applied, and achieve the same effect as in this embodiment. As regards the rotation state of the retard roller 7, as the rotation detecting element 9, it is possible to use an optical rotary encoder, a magnetic rotary encoder, a photo-interrupter and the like depending on necessary accuracy, speed and installation place. Further, as the code wheel, it is possible to use a disc of a transparent member on which a radial line is printed, a disc formed by molding of a metal or plastic member and provided with a slit, a magnetic plate magnetized in a certain period, and the like.

As described above, according to this embodiment, with an inexpensive constitution, a variation in leading end position of the sheet during sheet feeding is reduced and the sheet feeding interval can be shortened.

Embodiment 2

(Sheet Feeding Device)

Figure 11:
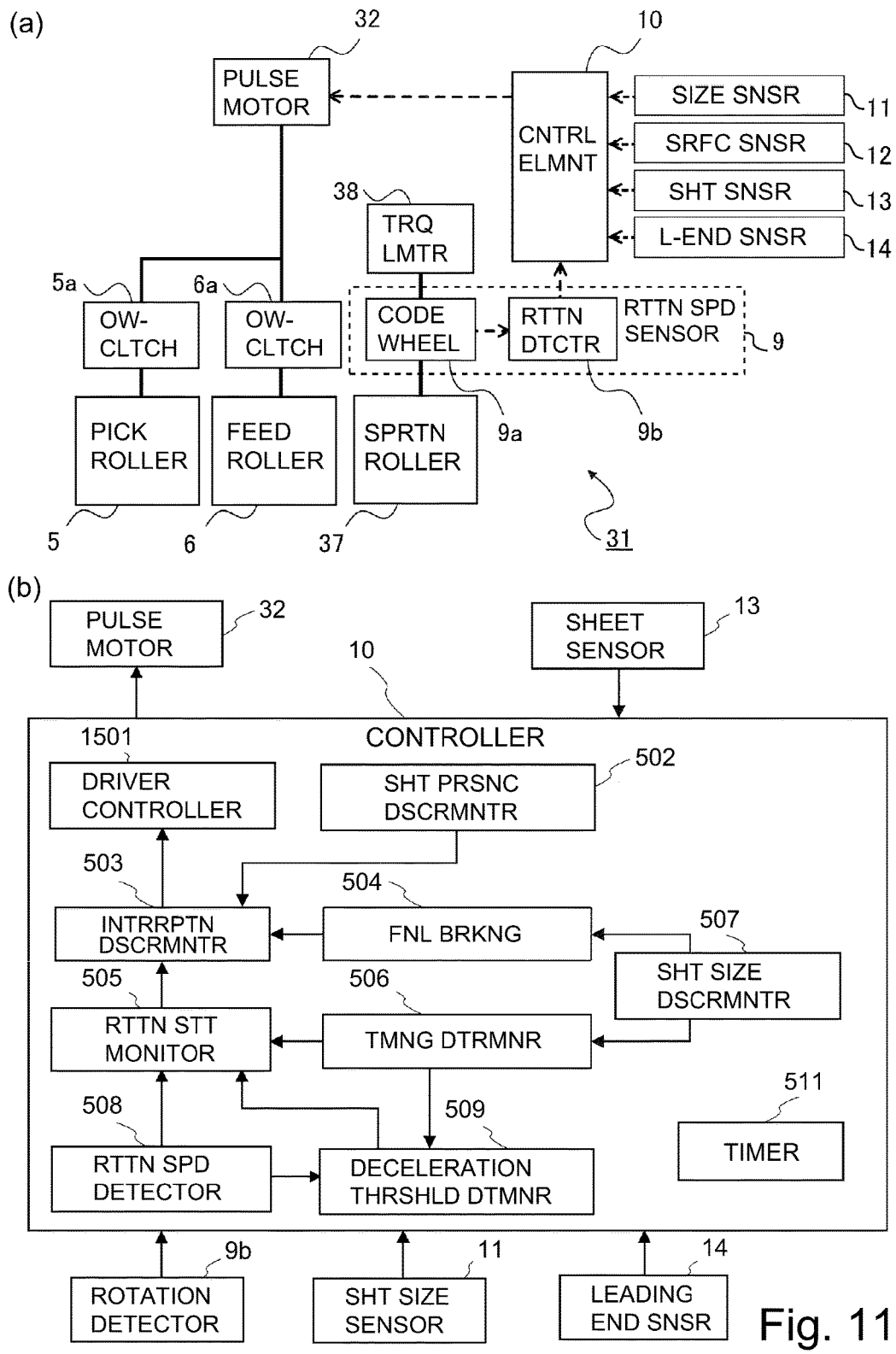
FIG. 11, (a) is a block diagram showing a constitution relating to sheet feeding control in Embodiment 2, and (b) is a control block diagram of a sheet feeding device in Embodiment 2.

An outline of a constitution of a sheet feeding device 31 in Embodiment 2 will be described using (a) of FIG. 11. In FIG. 11, (a) is a block diagram showing the constitution of the sheet feeding device 31 in this embodiment. Constituent elements which are the same as those of the sheet feeding device 1 in Embodiment 1 are represented by the same reference numerals or symbols and will be omitted from description. First, a drive transmission path in (a) of FIG. 11 will be described.

Drive from a pulse motor 32 as a driving unit is transmitted to the pick roller 5 via a one-way clutch 5a and to the feed roller 6 via a one-way clutch 6a so as to rotate these rollers in the feeding direction. These two one-way clutches 5a, 6a are constituted so as to permit rotation of associated rollers in the feeding direction and so as not to permit rotation of the associated rollers to provide peripheral movement in the direction opposite to the feeding direction. For that reason, even in the case where the drive is not transmitted, when the rotational force described later in the feeding direction is applied from the sheets, each of the pick roller 5 and the feed roller 6 is independently rotated in the feeding direction by the rotational force.

A separation roller 37 as a second roller is provided with a torque limiter 38 fixed at an end thereof. In the case where the separation roller 37 rotates to provide peripheral movement in the feeding direction, i.e., in the direction opposite to the driving direction, the rotation load T similar to that in Embodiment 1 is given by the action of the torque limiter 38. Further, between the torque limiter 38 and the separation roller 37, a code wheel 9a is provided and constitutes a rotational speed sensor 9 in combination with a rotation detecting element 9b, so that the rotation of the separation roller 37 is detected. To the separation roller 37, drive by the motor is not inputted.

Next, a transmission path of signals and the like in (a) of FIG. 11 will be described. In this embodiment, the pulse motor 32 is connected to the control element 10, so that the sheet feeding drive is made. A control block diagram of the sheet feeding device 31 in this embodiment is shown in (b) of FIG. 11. Constituent elements similar to those in FIG. 4 in Embodiment 1 are represented by the same reference numerals or symbols and will be omitted from description. In this embodiment, a sheet feeding drive controller 1501 controls drive of the pulse motor 32.

Figure 12:
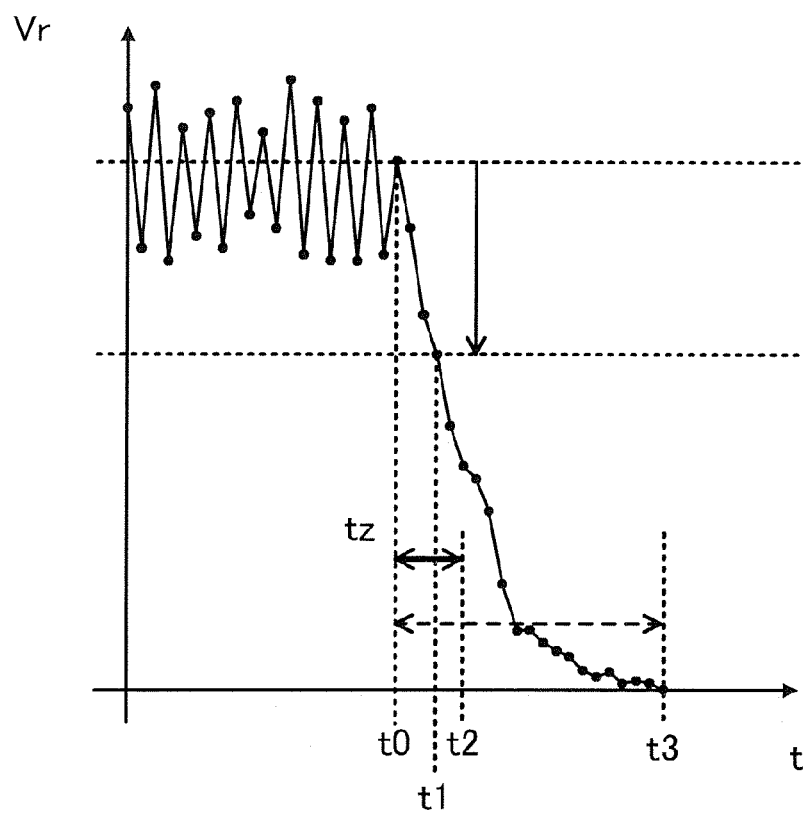
FIG. 12 is a graph showing a change in peripheral speed of a separation roller in Embodiment 2.

FIG. 12 is a graph showing a peripheral speed change of the separation roller 37 in this embodiment, wherein the abscissa represents a time t and the ordinate represents the peripheral speed Vr of the separation roller 37. As shown in FIG. 12, before a time to, i.e., before the leading end of the sheet S2 contacts the separation roller 37, the separation roller 37 rotates with minute peripheral speed change. The peripheral speed Vr of the separation roller 37 lowers from t0 which is timing when the sheet S2 reaches the separation roller 37. In this embodiment, in addition to the first and second discriminating conditions described in Embodiment 1, as a third discriminating condition, the following condition is used. In this embodiment, in the case where the change in peripheral speed Vr of the separation roller 37 shows a deceleration tendency not less than the number of predetermined times, the interruption discriminating portion 503 discriminates that the rotation state of the separation roller 37 is no rotation (state). That is, the third discriminating condition is whether or not the number of times of deceleration of the peripheral speed Vr of the separation roller 37 is not less than the number of predetermined times. Therefore, in FIG. 12, before the time t0, the interruption discriminating portion 503 discriminates the rotation state of the separation roller 37 as being in the state of rotation. The interruption discriminating portion 503 discriminates the rotation state of the separation roller 37 as being in the no rotation state at timing t1 when the change in peripheral speed Vr of the separation roller 37 shows the deceleration tendency, and the driving controller 501 stops the drive of the pulse motor 32. In FIG. 12, timing when the number of times of a decrease in peripheral speed Vr of the separation roller 37 is 3 (times) is t1.

For this reason, a time from arrival of the leading end of the sheet S2 at the separation roller 37 to discrimination of the stop of the drive of the pulse motor 32 can be considerably reduced compared with a time (double-pointed arrow indicated by a broken line in FIG. 12) until the stop is discriminated by the stop of the separation roller in the conventional example. A time from t0 to t1 is the time from the arrival of the leading end of the sheet S2 at the separation roller 37 to the discrimination of the stop of the drive of the pulse motor 32. A time from t0 to t3 is a time from the arrival of the leading end of the sheet S2 at the separation roller 37 to stop discrimination by the stop of the separation roller 37. The pulse motor 37 stops in s short time (from t1 to t2), and therefore the stop time tz is a time from t0 to t2.

(Sheet Feeding Control Interruption Discriminating Process)

Figure 13:
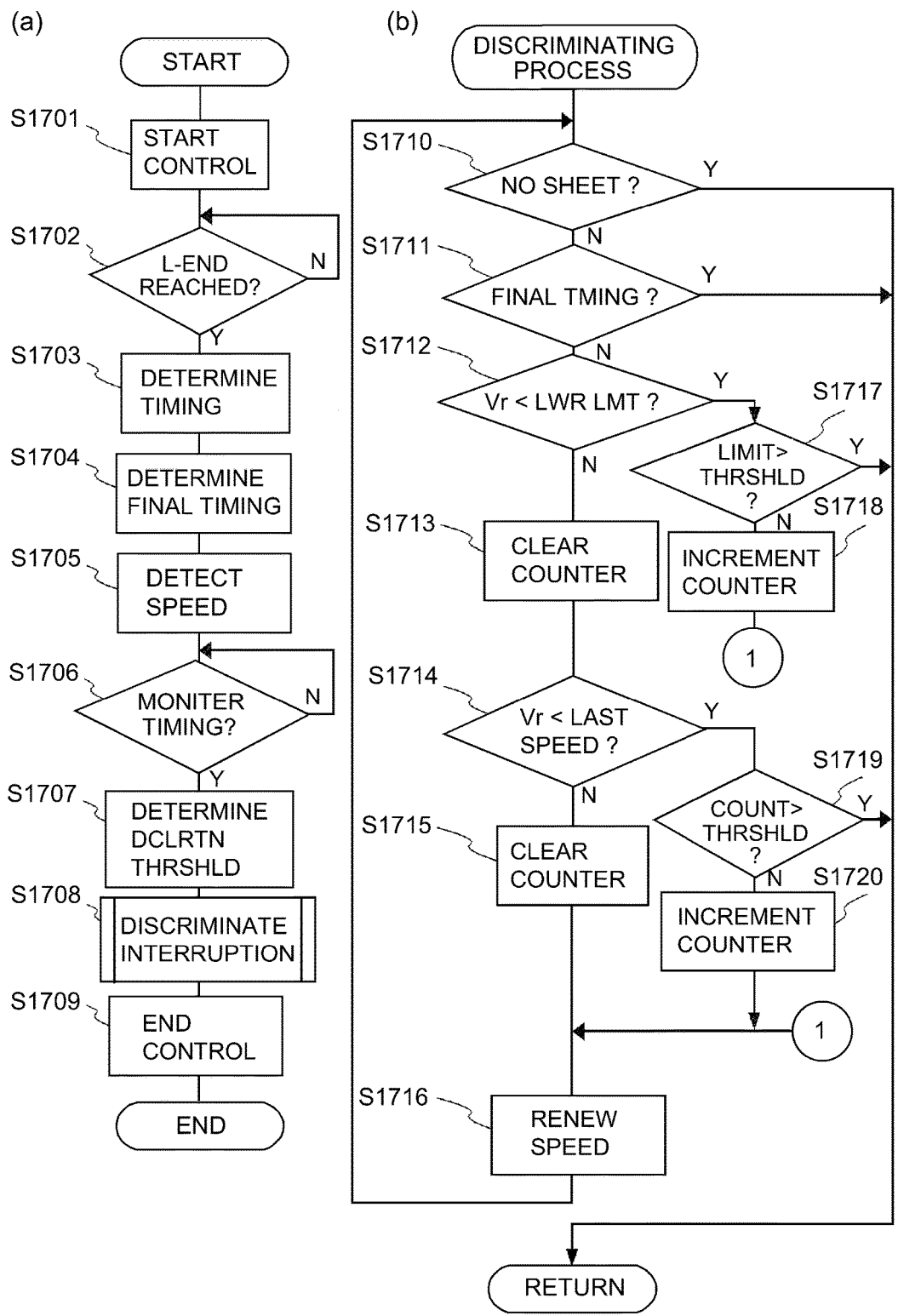
In FIG. 13, (a) and (b) are flowcharts showing a sheet feeding operation in Embodiment 2.

In FIG. 13, (a) is a flowchart for illustrating the sheet feeding operation in this embodiment. In (a) of FIG. 13, the process from S1701 to S1707 is the same as the process from S1101 to S1107 of (a) of FIG. 8 and will be omitted from description. In S1708, the control element 10 makes the sheet feeding control interruption discrimination. Details of the process of S1708 will be described later. The process of S1709 is the same as the process of S1109 of FIG. 8 and will be omitted from description.

In FIG. 13, (b) is a flowchart for illustrating the sheet feeding control interruption discriminating process of S1708 of 8a) of FIG. 13. The control element 10 resets an unshown counter for counting the number of times when the peripheral speed Vr is below the deceleration discriminating threshold (hereinafter referred to as a lower limit number) in advance. In the case as shown in (b) of FIG. 7 in Embodiment 1, the deceleration tendency of the peripheral speed Vr cannot be detected. Therefore, in order to meet also the sheet feeding operation 2 of (b) of FIG. 7, the control element 10 counts the number of times when the peripheral speed Vr is below the deceleration discriminating threshold and stops the drive of the pulse motor 32 when this number exceeds a predetermined value.

Further, as described above, in order to discriminate whether or not the change in peripheral speed Vr continuously showed the deceleration tendency not less than the number of predetermined times, the control element 10 resets an unshown counter for counting the number of times of deceleration (hereinafter referred to as a deceleration number) in advance. In (b) of FIG. 13, the process of S1710 and S1711 is the same as the process of S1110 and S1111 of (b) of FIG. 8 and will be omitted from description. In S1712, the control element 10 discriminates whether or not the current peripheral speed Vr of the separation roller 37 is smaller than the lower limit peripheral speed. In this embodiment, as the lower limit peripheral speed, the first discriminating peripheral speed V1 as the discriminating peripheral speed in the case of the sheet feeding operation 1 in Embodiment 1 is used. Incidentally, the second discriminating peripheral speed V2 as the discriminating peripheral speed in the case of the sheet feeding operation 2 in Embodiment 1 may also be used. In S1712, in the case where the control element 10 discriminates that the current peripheral speed Vr of the separation roller 37 is not less than the lower limit peripheral speed, the control element 10 causes the process to go to S1713. In S1712, in the case where the control element 10 discriminates that the current peripheral speed Vr of the separation roller 37 is smaller than the lower limit peripheral speed, the control element 10 causes the process to go to S1717.

In S1717, the control element 10 discriminates whether or not the lower limit number is more than a lower limit number threshold as a second number of times by making reference to the unshown counter. In this embodiment, the lower limit number threshold is 3, for example. In S1717, in the case where the control element 10 discriminates that the lower limit number is not less than the lower limit number threshold, the control element 10 causes the process to go to S1718. In S1718, the control element 10 increments and renews the counter for counting the lower limit number and causes the process to go to S1716. In S1717, in the case where the control element 10 discriminates that the lower limit number exceeds the lower limit number threshold, the control element 10 discriminates that the sheet S reached the separation roller 37 and ends the sheet feeding control interruption discriminating process, and then causes the process to go to S1709 of (a) of FIG. 13.

In S1713, the control element 10 clears (resets) the counter for counting the lower limit number, and in S1714, the control element 10 discriminates whether or not the current peripheral speed Vr of the separation roller 37 is smaller than the last peripheral speed. In S1714, in the case where the control element 10 discriminates that the current peripheral speed Vr of the separation roller 37 is not less than the last peripheral speed, the control element 10 causes the process to go to S1715. In S1714, in the case where the control element 10 discriminates that the current peripheral speed Vr of the separation roller 37 is smaller than the last peripheral speed, the control element 10 causes the process to go to S1719.

In S1719, the control element 10 discriminates whether or not the deceleration number is more than a deceleration number threshold as a first number of times by making reference to the unshown counter. In this embodiment, as described with reference to FIG. 12, the deceleration number threshold is 2, for example. In S1719, in the case where the control element 10 discriminates that the deceleration number is not less than the deceleration number threshold, the control element 10 causes the process to go to S1720. In S1719, the control element 10 increments and renews the counter for counting the deceleration number and causes the process to go to S1716. In S1719, in the case where the control element 10 discriminates that the lower limit number is more than the deceleration number threshold, the control element 10 discriminates that the sheet S reached the separation roller 37 and ends the sheet feeding control interruption discriminating process, and then causes the process to go to S1709 of (a) of FIG. 13. For example, in the case where the deceleration number is more than 2 when the deceleration number threshold is 2, i.e., in the case where the deceleration tendency continuously exhibits 3 times, as shown in FIG. 12, the sheet feeding control is discriminated as being interrupted. In S1715, the control element 10 clears the counter for counting the deceleration number, and in S1716, the control element 10 renews the last peripheral speed by the current peripheral speed Vr and then returns the process to S1710.

By the above-described constitution, before the trailing end of the uppermost sheet S1 of the sheets S stacked on the intermediary plate 16 passes through the separation nip, the leading end of the sheet S2 continuously fed by the pick roller 5 can be caused to reach the separation nip. Then, after the leading end of the sheet S2 contacts the separation roller 37, the driving controller 501 stops the pulse motor 32 in a short time, so that the pick roller 5 can be stopped instantaneously. After the feeding of the sheet S1 is completed, the leading end of the sheet S2 is positioned at the separation nip, and also as regards the subsequent sheets S, similarly, leading ends thereof are positioned at the separation nip, so that sheet feeding starting positions are uniformized. For this reason, it becomes possible to reduce the sheet feeding variation Ld generating to the variation in sheet feeding starting position.

Therefore, it is possible to provide the sheet feeding device capable of reducing the sheet feeding variation Ld and narrowing the sheet feeding interval inexpensively. Incidentally, in FIG. 12, the condition of the sheet feeding operation 1 described in Embodiment 1 was described, but also as regards the conditions of the sheet feeding operations 2 and 3 described in Embodiment 1, similar effects can be obtained similarly. Further, in this embodiment, similarly as in Embodiment 1, the constitutions and the like should be appropriately changed depending on the device to which the present invention is applied, and a similar effect can be obtained.

As described above, according to this embodiment, with an inexpensive constitution, a variation in leading end position of the sheets when the sheets are fed is reduced, so that the sheet feeding interval can be shortened.

Embodiment 3

Figure 14:
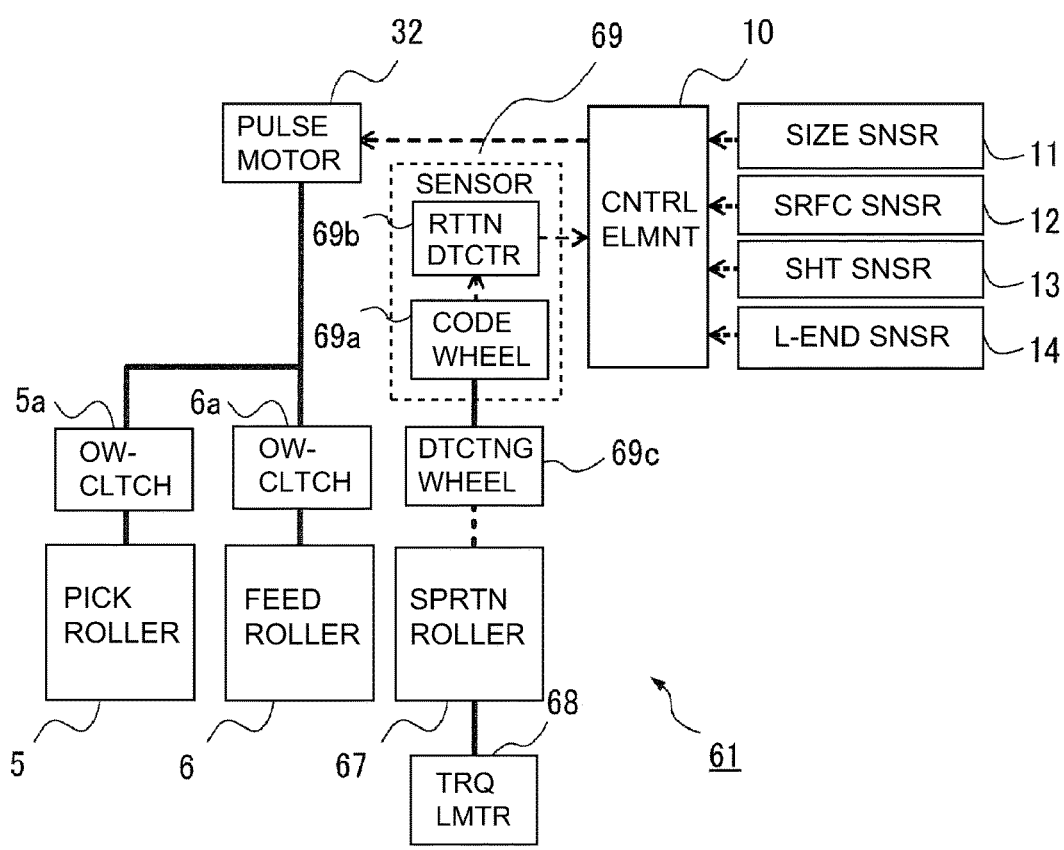
FIG. 14 is a block diagram showing a constitution relating to sheet feeding control in Embodiment 3.

A control block diagram and a flowchart of the sheet feeding operation in Embodiment 3 are the same as those in Embodiments 1 and 2, and therefore will be omitted from description. An outline of a constitution of a sheet feeding device 61 in this embodiment will be described using FIG. 14. In FIG. 14, (a) is a block diagram showing the constitution of the sheet feeding device 61 in this embodiment.

Constituent elements which are the same as those of the sheet feeding device 31 in Embodiment 2 are represented by the same reference numerals or symbols and will be omitted from description. First, a drive transmission path in (a) of FIG. 11 will be described. A separation roller 67 as a second roller is provided with a torque limiter 68 fixed at an end thereof, and in the case where the separation roller 67 rotates to provide peripheral movement in the feeding direction, i.e., in the direction opposite to the driving direction, the rotation load T similar to that in Embodiment 1 is given.

Further, a detecting wheel 69c rotatable independently of the separation roller 67 is provided substantially coaxial with the separation roller 67 and detects the feeding speed of the sheet S in contact with the sheet S when the sheet S is fed. Therefore, a difference from Embodiment 2 is that in Embodiment 2, the rotation detection of the separation roller 37 is made and on the other hand in this embodiment, detection of the feeding speed of the sheet S by the detecting wheel 69c is made. For that reason, there is no need to detect the rotation of the separation roller 67, so that a degree of freedom in terms of arrangement can be obtained. A rotational speed sensor 69 in this embodiment includes a code wheel 69a and a rotation detecting element 69b. The detecting wheel 69c is connected to the rotation detecting element 69b via the code wheel 69a, and an output of the rotation detecting element 69a is inputted into the control element 10.

On the other hand, the detecting wheel 69c is disposed substantially coaxial with the rotational speed sensor 69, and therefore a detection result of the detecting wheel 69c can be treated with substantially no difference, and therefore a similar effect can be obtained by a constitution similar to the constitution of Embodiment 2. Incidentally, the detecting wheel 69c may preferably be disposed in a side slightly upstream of the separation nip between the feed roller 6 and the separation roller 67 with respect to the feeding direction. In the case where the detecting wheel 69c is disposed in a side downstream of the separation nip with respect to the feeding direction, there is a liability that the following phenomenon occurs. In this case, there is a liability that the sheet S2 does not contact the detecting wheel 69c when during feeding of the uppermost sheet S1 of the sheets S stacked on the intermediary plate 16, the subsequent sheet S2 is continuously fed and the leading end of the sheet S2 reaches the separation nip.

In this case, a continuously feeding operation of the sheet S is continued and the leading end of the sheet S2 runs over the separation nip, and therefore there is liability that the phenomenon described with reference to (e) of FIG. 25 generates. However, the shoot feeding variation Ld is larger as the detecting wheel 69c is disposed in a side more upstream of the separation nip with respect to the feeding direction. This is because in the case where the sheet S is detected in the side upstream of the separation nip, a variation in leading end position of the sheets S continuously fed from a position where the detecting wheel 69c makes detection in contact with the sheet S to the separation nip generates. Accordingly, the detecting wheel 69c may preferably be disposed in the side slightly upstream of the separation nip with respect to the feeding direction.

Also in this embodiment, when the leading end of the sheet S1 reaches the sheet leading end sensor 14, the control element 10 starts detection of the feeding speed of the sheet S1 (or S2) and calculates a monitoring timing from the feeding speed of the sheet S1. When the timing reaches the monitoring timing, the control element 10 makes the sheet feeding control interruption discrimination. The control element 10 discriminates that the sheet feeding control is interrupted in the case where the feeding speed of the sheet S as the first discriminating condition or the second discriminating condition is below the deceleration discriminating threshold V1 (or V2). The sheet feeding control interruption may also be discriminated under the third discriminating condition of Embodiment 2. In the case where these conditions are satisfied, the control element 10 stops the pulse motor 32. Incidentally, this embodiment is also applicable to embodiments described later.

As described above, before the trailing end of the sheet S1 during the feeding passes through the separation nip, the pick roller 5 causes leading end of the subsequent sheet S2 to reach the separation nip. Then, after the leading end of the subsequent sheet S2 contacts the detecting wheel 69c, the pick roller 5 is stopped in a short time, so that sheet feeding starting positions of the subsequent sheet S2 and later sheets are uniformized in the neighborhood of the separation nip. For this reason, it becomes possible to reduce the sheet feeding variation Ld generating to the variation in sheet feeding starting position. Therefore, it is possible to provide the sheet feeding device capable of reducing the sheet feeding variation Ld and narrowing the sheet feeding interval inexpensively. Incidentally, to the constitution of Embodiment 1, the detecting wheel 69c for detecting the feeding speed of the sheet S may also be applied. Further, in this embodiment, similarly as in Embodiments 1 and 2, the constitutions and the like should be appropriately changed depending on the device to which the present invention is applied, and a similar effect can be obtained even in such a case.

As described above, according to this embodiment, with an inexpensive constitution, a variation in leading end position of the sheets when the sheets are fed is reduced, so that the sheet feeding interval can be shortened.

Embodiment 4

Figure 15:
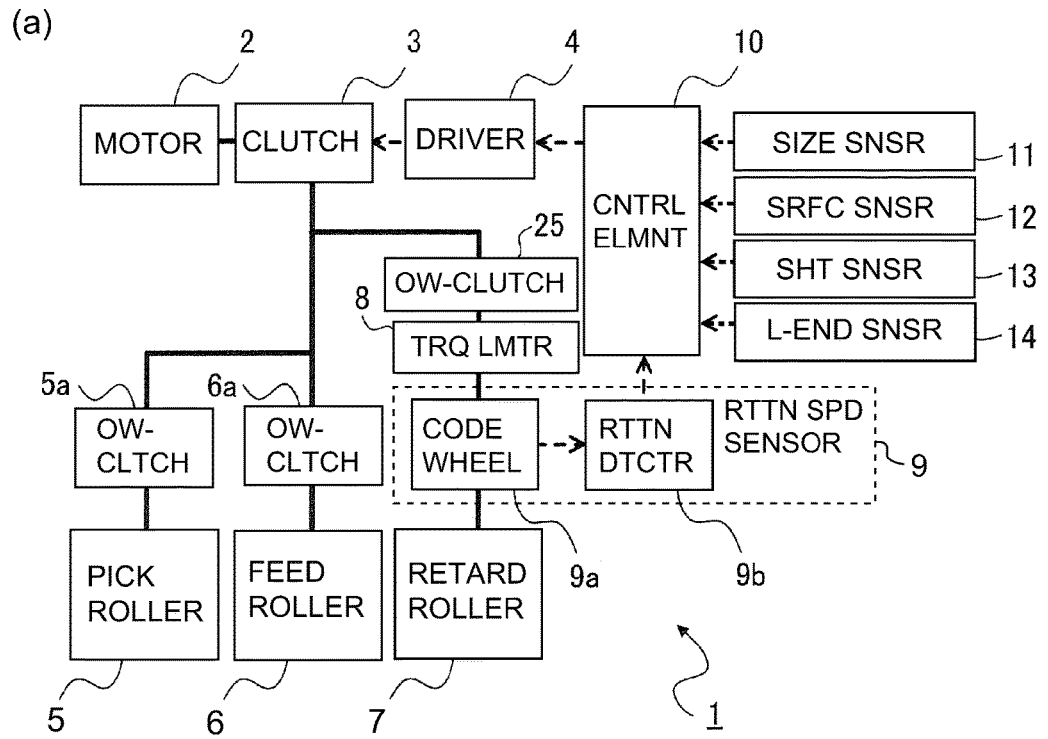
In FIG. 15, (a) and (b) are block diagram showing constitutions of sheet feeding control in Embodiments 4 and 5, respectively.
Figure 15:
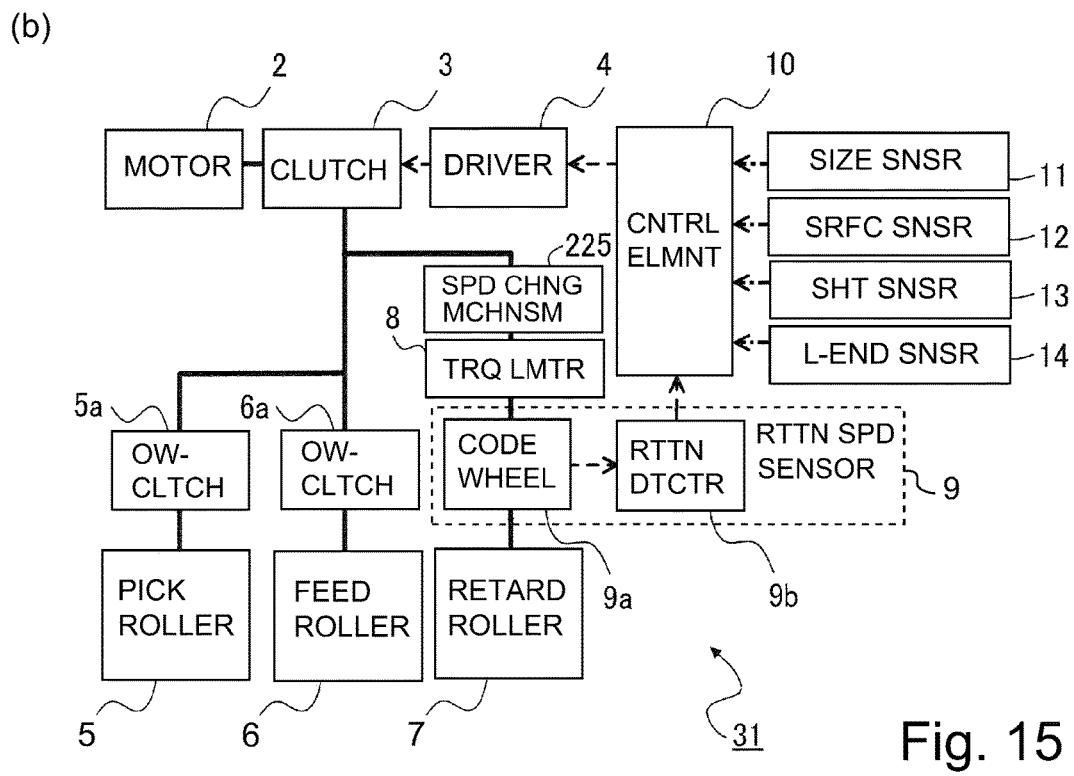

In FIG. 15, (a) is a block diagram showing a constitution of a sheet feeding device 1 in Embodiment 4. A difference from the sheet feeding device 1 in Embodiment 1 is that in a drive transmitting path branched from the electromagnetic clutch 3, a one-way clutch 25 is provided between the electromagnetic clutch 3 and the torque limiter 8. The one-way clutch 25 is constituted so as not to permit rotation of the retard roller in the feeding direction and so as to permit rotation of the retard roller 7 to provide peripheral movement in the direction opposite to the feeding direction. Constituent elements similar to those in Embodiment 1 are represented by the same reference numerals or symbols and will be omitted from description. Further, also a constitution of the control element 10 and the like is similar to that in FIG. 4 of Embodiment 1.

As described in Embodiment 1, the monitoring timing determining portion 506 determines the monitoring timing of the rotation detecting element 9b on the basis of a length of the sheet S acquired from the size discriminating portion 507. In this embodiment, in addition, the final interruption timing determining portion 504 determines final interruption timing of the drive controller 501 on the basis of the length of the sheet S acquired from the size discriminating portion 507. Further, when the leading end of the sheet S1 reaches the sheet leading end sensor 14, the detecting portion 508 starts detection of an edge interval of the pulse signal of the rotational speed sensor 9.

The one-way clutch 25 disposed between the electromagnetic clutch 3 and the torque limiter 8 shown in (a) of FIG.

15 will be described. First, the case where there is no one-way clutch 25 will be described. When the drive transmission of the electromagnetic clutch 3 is interrupted by the drive controller 501, the driving force is not transmitted to the drive transmitting path positioned in a side downstream of the electromagnetic clutch 3. For that reason, when an external force is applied to the retard roller 7, the retard roller 7 is rotated together with the torque limiter 8 in a direction in which the external force is applied.

As shown in (g) of FIG. 5 and (a) of FIG. 6, when the leading end of the sheet S2 is positioned at the separation nip and the sheet S1 is fed by the feed roller pair 17, the sheet S2 is subjected to a force for moving the sheet S2 toward a downstream side in the feeding direction by the frictional force between the sheet S1 and the sheet S2. That is, the sheet S2 is fed toward the downstream side in the feeding direction by the frictional force with the sheet S1, and as shown in (e) of FIG. 25, a state in which the leading end of the sheet S2 runs over the separation nip.

Next, the case where the one-way clutch 25 exists will be described. As described above, the one-way clutch 25 is constituted so as not to permit the rotation of the retard roller 7 in the feeding direction and so as to permit the rotation of the retard roller 7 to provide peripheral movement in the direction opposite to the feeding direction. When the drive transmission of the electromagnetic clutch 3 is interrupted by the drive controller 501, the driving force is not transmitted to the transmitting path positioned in the downstream side of the electromagnetic clutch 3. However, even when the force for rotating the retard roller 7 in the feeding direction is applied to the retard roller 7, the retard roller 7 is not rotated due to the action of the one-way clutch 25. However, in the case where a force not less than the rotation load of the torque limiter 8 is applied to the retard roller 7, the retard roller 7 is rotated in the feeding direction.

Accordingly, as shown in (g) of FIG. 5 and (a) of FIG. 6, by the frictional force between the sheets S1 and S2, even in the case where the sheet S2 is subjected to a force for moving the sheet S2 toward the downstream side in the feeding direction, the retard roller 7 is kept in the rest (stop) state. This is because the rotation load T imparted to the retard roller retard roller 7 is larger than the rotational force received from the sheet S2. As a result, as shown in (e) of FIG. 25, the leading end of the sheet S2 is not in a state in which it runs over the separation nip, but is positioned at the separation nip. Incidentally, the constitutions described in Embodiment 1 with reference to FIGS. 7 to 10 are similarly employed also in this embodiment and will be omitted from description.

As described above, according to this embodiment, with an inexpensive constitution, a variation in leading end position of the sheets when the sheets are fed is reduced, so that the sheet feeding interval can be shortened.

Embodiment 5

Using (b) of FIG. 15, a constitution of a sheet feeding device 31 in Embodiment 5 will be described. Constituent elements similar to those of the sheet feeding device 1 described in Embodiment 4 with reference to (a) of FIG. 15 are represented by the same reference numerals or symbols and will be omitted from description. Further, also a control block diagram and an operation flowchart are similar to those in Embodiment 4 and therefore will be omitted from description. A difference in constitution of the sheet feeding device 31 of (b) of FIG. 15 from the sheet feeding device 1 of (a) of FIG. 15 in Embodiment 4 is that between a drive transmitting path branched from the electromagnetic clutch 3 and the torque limiter 8, a speed changing mechanism 225 is provided.

The speed changing mechanism 225 is a driving train consisting of a stepped gear and is constituted so as to decrease the speed from the electromagnetic clutch 3 toward the retard roller 7. In other words, the speed increases from the retard roller 7 toward the electromagnetic clutch 3.

When the drive transmission of the electromagnetic clutch 3 is interrupted by the drive controller 501, the driving force is not transmitted to the drive transmitting path positioned in a side downstream of the electromagnetic clutch 3. At this time, when the retard roller 7 is intended to be rotated in the feeding direction, a speed increasing load acts on the retard roller 7.

When the speed increasing load is smaller than the rotation load of the torque limiter 8, the retard roller 7 is not rotated. However, when a force not less than the rotation load of the torque limiter 8 is applied to the retard roller 7, the retard roller 7 is rotated.

Accordingly, as shown in (g) of FIG. 5 and (a) of FIG. 6, by the frictional force between the sheets S1 and S2, even in the case where the sheet S2 is subjected to a force for moving the sheet S2 toward the downstream side in the feeding direction, the retard roller 7 is kept in the rest (stop) state. This is because the rotation load T imparted to the retard roller retard roller 7 is larger than the rotational force received from the sheet S2. As a result, as shown in (e) of FIG. 25, the leading end of the sheet S2 is not in a state in which it runs over the separation nip, but is positioned at the separation nip.

As described above, according to this embodiment, with an inexpensive constitution, a variation in leading end position of the sheets when the sheets are fed is reduced, so that the sheet feeding interval can be shortened.

Embodiment 6

Figure 16:
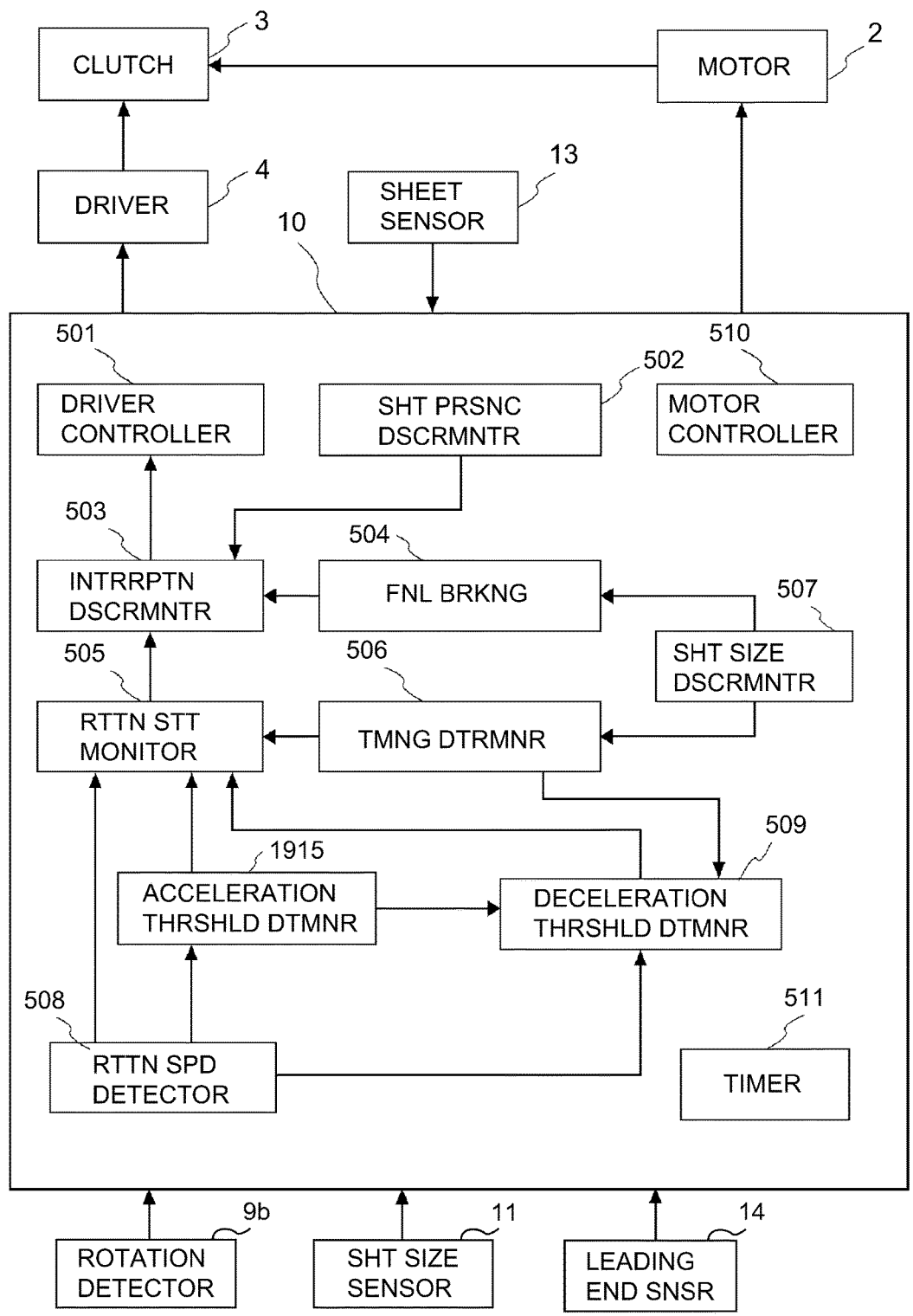
FIG. 16 is a control block diagram of a sheet feeding device in Embodiment 6.

A constitution as to sheet feeding control in Embodiment 6 is the same as those described in Embodiments 1 and 2 and therefore will be omitted from description. A sheet feeding device in this embodiment will be described using FIG. 17. Constituent elements similar to those of the sheet feeding device 1 in Embodiment 1 are represented by the same reference numerals or symbols and will be omitted from description. In FIG. 16, the control element 10 in this embodiment includes an acceleration discriminating threshold determining portion 1915 for determining an acceleration discriminating threshold described later by which the monitoring portion 505 discriminates the rotation state of the retard roller 7.

Figure 17:
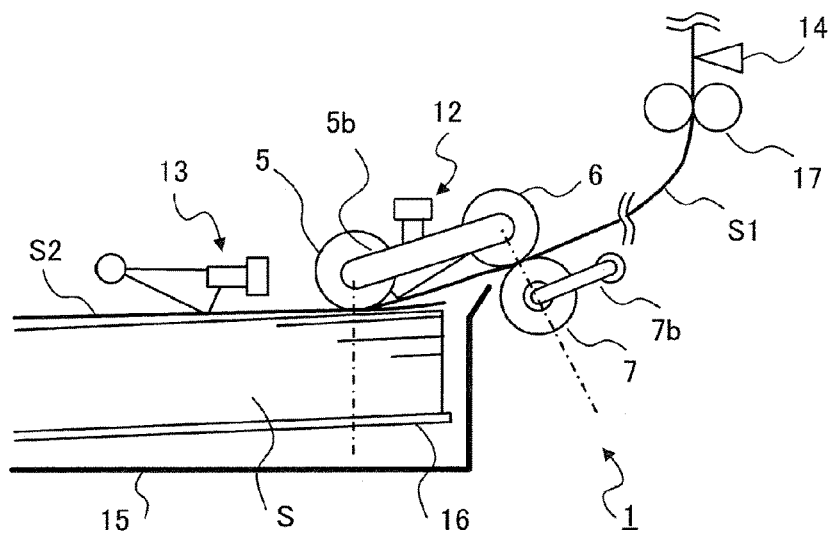
In FIG. 17, (a) is a schematic view showing a neighborhood of a sheet feeding device in Embodiment 6, and (b) is a graph showing a change in peripheral speed of a retard roller in Embodiment 6.
Figure 17:
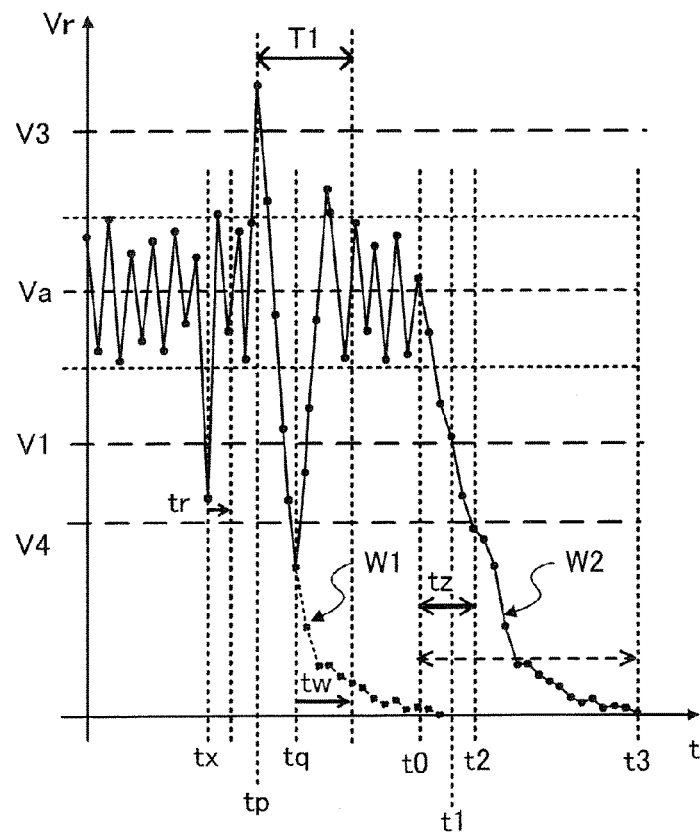

In FIG. 17, (a) is a partially schematic sectional view showing the sheet feeding device 1 immediately after the trailing end of the sheet 1 passes through the pick roller 5, i.e., during transition from the state of (e) of FIG. 5 to the state of (f) of FIG. 5. Constituent elements similar to those described with reference to FIG. 5 and the like are represented by the same reference numerals or symbols and will be omitted from description. In this embodiment, when the state changes from the state of (e) of FIG. 5 to the state of (f) of FIG. 5, particularly at timing when the trailing end of the sheet S1 passes through the pick roller 5 as shown in (a) of FIG. 17, shock generates. For this reason, as shown in (b) of FIG. 17, the rotational speed read from the rotating detecting element 9b by the control element 10 largely fluctuates in some cases. This embodiment relates to control in such a case where the rotational speed largely fluctuates.

As shown in (a) and (b) of FIG. 7, in the case where the sheet S2 is continuously fed, the retard roller 7 has not already rotate, and therefore the fluctuation in rotational speed due to the shock as shown in (b) of FIG. 17 is not detected. Even if in the case where a minute rotation fluctuation is detected, the electromagnetic clutch 3 has already been interrupted, and therefore the process is performed similarly as in Embodiments 1 to 5 and thus will be omitted from description.

The reason why the rotational speed read from the rotation detecting element 9b by the control element 10 is as follows. First is the case where the rotational speed of the retard roller 7 itself changes toward not only an acceleration side but also a deceleration side. Second is the case where although the rotational speed of the retard roller 7 is constant, a waveform detected due to vibration of the code wheel 9a or the rotation detecting element 9b or the like changes toward not only the acceleration side but also the deceleration side. Further, the case of a combination of the first and second cases exists.

In FIG. 9 described in Embodiment 1, a peripheral speed fluctuation generating due to the minute fluctuation is assumed since particularly the friction coefficient $\mu_r$ between the retard roller 7 and the sheet S1 is not completely constant. Such a peripheral speed fluctuation of the retard roller 7 is detected so that the peripheral speed is slow due to minute slip particularly in a place where the friction coefficient between the retard roller 7 and the sheet S1 is small.

On the other hand, in (b) of FIG. 17, in addition to the peripheral speed fluctuation as shown in FIG. 9, also the case where the above-described fluctuation due to the shock is assumed. Description similar to that described with reference to FIG. 9 will be omitted. The peripheral speed fluctuation of the retard roller 7 due to the shock generates at predetermined timing, different from the case of the peripheral speed fluctuation generating due to the minute fluctuation in friction coefficient, and more largely changes also toward the acceleration side as at timing tp shown in (b) of FIG. 17. Here, W1 indicated by a broken line shows the case where the above-described fluctuation due to the shock is not taken into consideration, and at timing t1 when the leading end of the sheet S2 does not reach the separation nip, the retard roller 7 is stopped. On the other hand, W2 indicated by a solid line shows the case where the control of this embodiment in which the above-described fluctuation due to the shock is taken into consideration, and at timing t3 when the leading end of the sheet S2 reaches the separation nip.

In (b) of FIG. 17, a state in which the peripheral speed Vr of the retard roller 7 is naturally below the first discriminating peripheral speed V1 at timing tx before t0 which is timing when the sheet S2 contacts the separation nip is shown. As regards the peripheral speed fluctuation of the retard roller 7 at the timing tx, description will be omitted since control similar to that in Embodiment 1 is effected. An acceleration discriminating threshold determining portion 1915 determines a third discriminating peripheral speed V3 as an acceleration discriminating threshold which is a second value on the basis of the peripheral speed Vr of the retard roller 7 and a predetermined acceleration rate. For example, a value obtained by multiplying the peripheral speed Vr by the acceleration rate is used as the third discriminating peripheral speed V3. The third discriminating peripheral speed V3 is larger than the first discriminating peripheral speed V1 (V3>V1). In this embodiment, at the timing tp, the interruption discriminating portion 503 changes a deceleration discriminating condition. For example, in (b) of FIG. 17, the interruption discriminating portion 503 not only changes the deceleration discriminating threshold from V1 to V4 but also extend a restoring time tr to tw (>tr).

In FIG. 17, (b) shows a state in which thereafter at timing tq, the peripheral speed Vr of the retard roller 7 is below a fourth discriminating peripheral speed V4. At the timing tq, the interruption discriminating portion 503 discriminates that the sheet feeding control is interrupted, and the drive controller 501 once instructs the driving circuit 4 to stop. Similarly as at the timing tx of FIG. 9 in Embodiment 1, in the case where the peripheral speed Vr of the retard roller 7 is not less than the fourth discriminating peripheral speed V4 within the restoring time tw, the drive instruction is provided again, so that the electromagnetic clutch 3 continues the transmission. Thus, by effecting the control of this embodiment, the fluctuation in peripheral speed Vr of the retard roller 7 in a time T1 shown in (b) of FIG. 17 can be excluded from the sheet feeding control interruption discrimination. Further, in the case where the peripheral speed Vr of the retard roller 7 is kept in a state in which the peripheral speed Vr is below the fourth discriminating peripheral speed V4 within the strong time tw, the sheet feeding is interrupted as shown in the figure by W1. The speed relationship is:

$$V3>Va>V1>V4.$$

After the storing time tw has elapsed, in other words, after the peripheral speed Vr of the retard roller 7 is not influenced by the above-described shock, the deceleration discriminating threshold is returned from V4 to V1, so that the restoring time tw is returned to tr.

Figure 18:
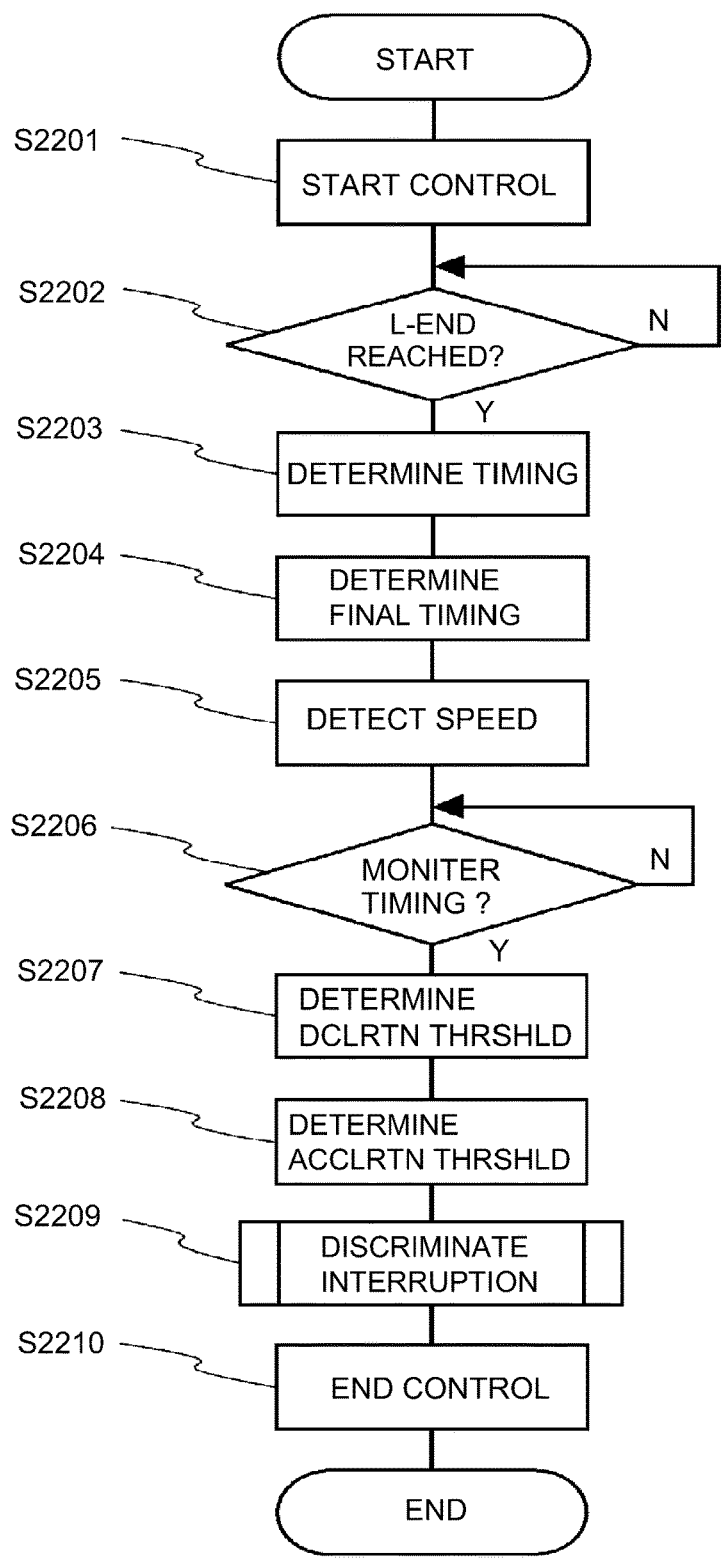
FIG. 18 is a flowchart showing a sheet feeding operation in Embodiment 6.

FIG. 18 is a flowchart for illustrating a process meeting the case where the peripheral speed Vr of the retard roller 7 locally fluctuates toward the acceleration side. Incidentally, the process of S2201-S2207 is the same as the process of S1301-S1307 and therefore will be described. In S2208, the control element 10 controls the acceleration discriminating threshold determining portion 1915 to determine the acceleration discriminating threshold on the basis of a detecting result of the detecting portion 508. In S2209, the control element 10 controls the interruption discriminating portion 502 to make the sheet feeding control interruption discrimination. The process of S2210 is the same as the process of S1309 and therefore will be omitted from description.

(Sheet Feeding Control Interruption Discriminating Process)

Figure 19:
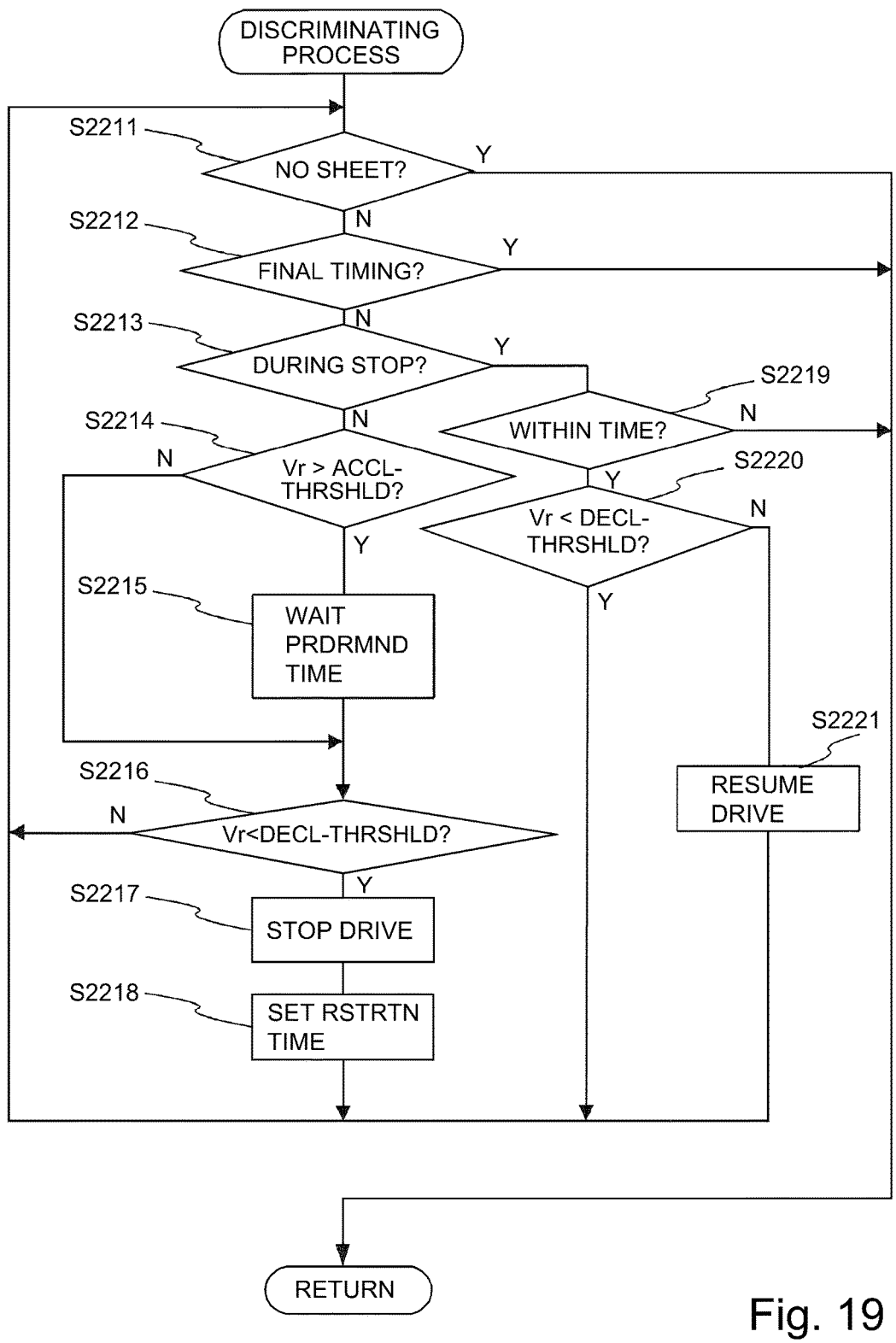
FIGS. 19, 20 and 21 are flowcharts each showing a sheet feeding control interruption discriminating process.

FIG. 19 is a flowchart for illustrating the process of S2209 of FIG. 18. The process of S2211-S2213 of FIG. 19 is the same as the process of S1310-S1312 of (b) of FIG. 10, and therefore will be omitted from description. In S2214, the control element 10 discriminates whether or not the current peripheral speed Vr of the retard roller 7 is larger than the acceleration discriminating threshold (third discriminating peripheral speed V3) determined in S2208. In S2214, in the case where the control element 10 discriminates that the current peripheral speed Vr of the retard roller 7 is larger than the acceleration discriminating threshold, the control element 10 causes the process to go to S2215. In S2215, the control element 10 is on stand-by (waits) for a predetermined time. For example, the control element 10 is on stand-by for the above-described time T1. As a result, the fluctuation, due to the shock, of the peripheral speed Vr of the retard roller 7 within the time T1 can be left out of consideration of the discrimination of the sheet feeding control interruption, i.e., can be disregarded.

In S2214, in the case where the control element 10 discriminates that the peripheral speed Vr of the retard roller 7 is not more than the acceleration discriminating threshold, the control element 10 causes the process to go to S2216. In S2216, the control element 10 effects the discriminating process by using the deceleration discriminating threshold determined in S2207 of FIG. 18.

Further, the process of S2217-S2221 of FIG. 19 is the same as the process of S1314-S1318 of (b) of FIG. 10, and therefore will be omitted from description. By the discrimination of S2214, in the case where a state in which the current peripheral speed Vr of the retard roller 7 is faster than the acceleration discriminating threshold does not generate, the same process as that in Embodiment 1 is performed. In order to eliminate erroneous detection with respect to such a fluctuation, in general, for the purpose of removing chattering, a measured data, i.e., the peripheral speed Vr of the retard roller 7 in this case is integrated and averaged or is read plural times. Then, in the case where the number of times of continuation is not less than a predetermined number, the control element 10 discriminates the peripheral speed as being in the accelerated state.

However, as described also in Embodiment 1, it takes the storing time tr until the electromagnetic clutch 3 interrupts the drive transmission. For this reason, different from general control, the interruption discriminating portion 503 once makes the sheet feeding control interruption discrimination and outputs a signal for interrupting the electromagnetic clutch 3 to the drive controller 501. However, when the time is within the restoring time tr, the state in which the electromagnetic clutch 3 is not interrupted, i.e., the rotation of the retard roller 7 can be continued. A time from timing when the trailing end of the sheet S1 passes through the pick roller 5 to arrival of the sheet S2 at the retard roller 7 is within a certain range. For this reason, in the process of S2215, the process goes to S2216 after being on stand-by for a predetermined time, so that the drive transmission is continued.

(Another Sheet Feeding Control Interruption Discriminating Process)

Figure 20:
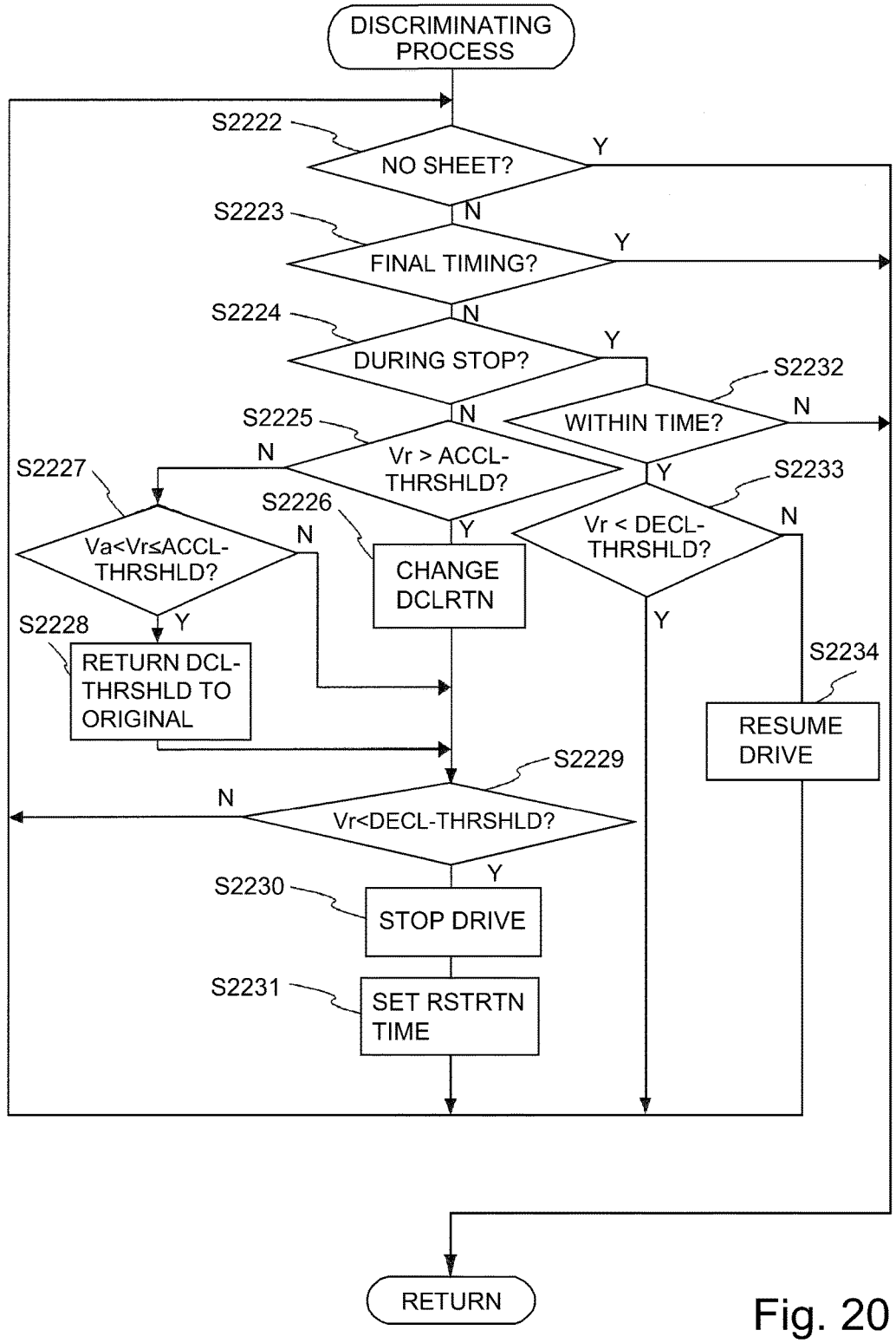

Another sheet feeding control interruption discriminating process for excluding the fluctuation due to the shock of the peripheral speed Vr of the retard roller 7 in the above-described time T1 will be described using a flowchart of FIG. 20. The process of S2222-S2225 of FIG. 20 is the same as the process of S2211-S2214 of FIG. 19, and therefore will be omitted from description. In S2225, in the case where the control element 10 discriminates that the current peripheral speed Vr of the retard roller 7 is larger than the acceleration discriminating threshold, the control element 10 causes the process to go to S2226. In S2226, the control element 10 changes the deceleration discriminating threshold determined in S2207 of FIG. 18, e.g., from V1 to V4 (<V1), and causes the process to go to S2229.

In S2225, in the case where the control element 10 discriminates that the current peripheral speed Vr of the retard roller 7 is not more than the acceleration discriminating threshold, the control element 10 causes the process to go to S2227. In S2227, the control element 10 discriminates whether or not the current peripheral speed Vr of the retard roller 7 is larger than the average peripheral speed Va of the retard roller 7 and is not more than the acceleration discriminating threshold. In S2227, in the case where the control element 10 discriminates that a condition such that the current peripheral speed Vr of the retard roller 7 is larger than the average peripheral speed Va of the retard roller 7 and is not more than the acceleration discriminating threshold is not satisfied, the control element 10 causes the process to go to S2229. In S2227, in the case where the control element 10 discriminates that the current peripheral speed Vr of the retard roller 7 is larger than the average peripheral speed Va and is less than the acceleration discriminating threshold, the control element 10 causes the process to go to S2228. In S2228, the control element 10 returns the changed deceleration discriminating threshold to an original value, e.g., from V4 to V1, and causes the process to go to S2229. Incidentally, the process of S2229-S2234 is the same as the process of S2216-S2221 of FIG. 19, and therefore will be omitted from description.

(Another Sheet Feeding Control Interruption Discriminating Process)

Figure 21:
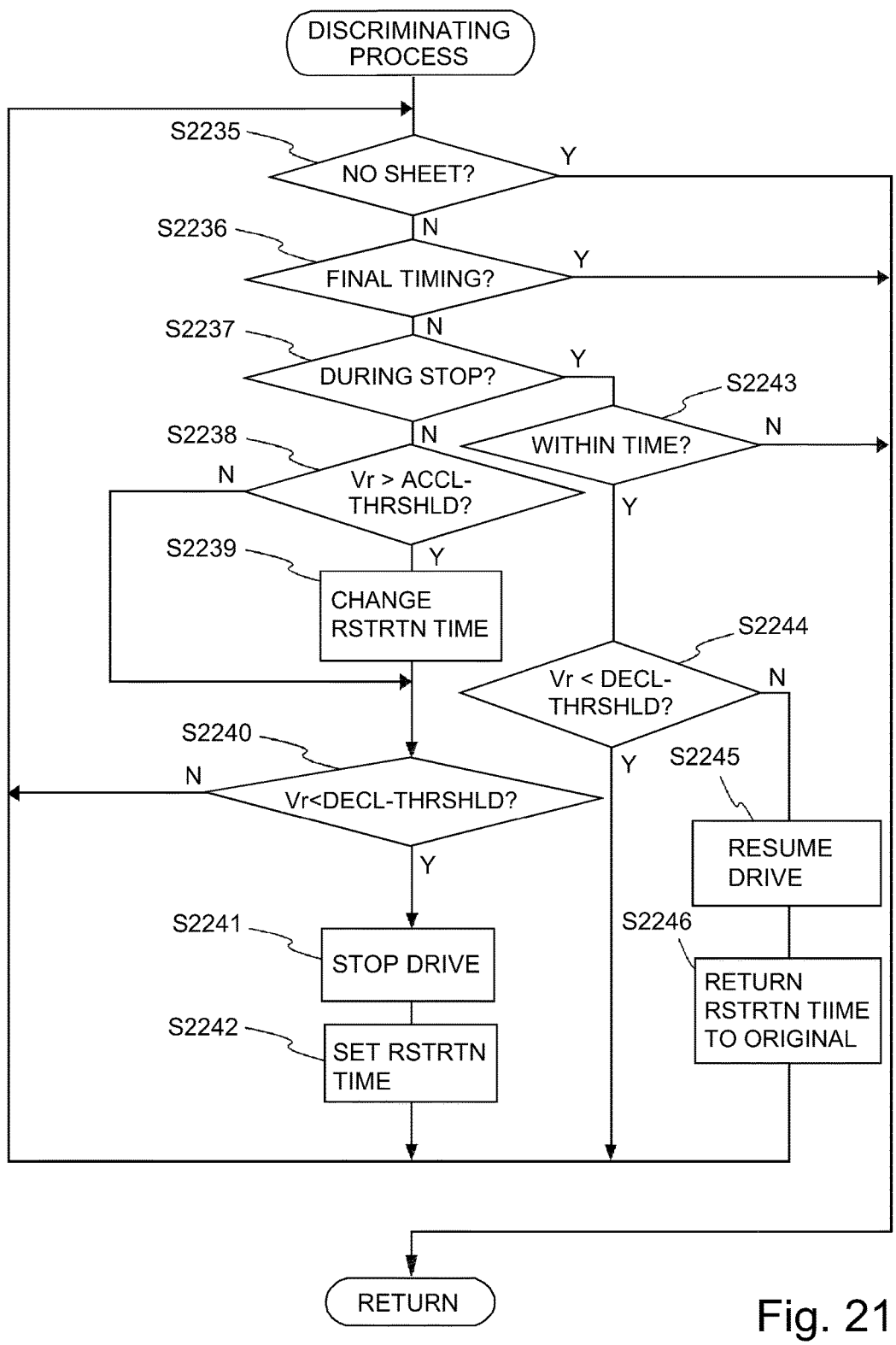

Another sheet feeding control interruption discriminating process for excluding the fluctuation due to the shock of the peripheral speed Vr of the retard roller 7 in the above-described time T1 will be described using a flowchart of FIG. 21. The process of S2235-S2238 of FIG. 20 is the same as the process of S2211-S2214 of FIG. 19, and therefore will be omitted from description. In S2238, in the case where the control element 10 discriminates that the current peripheral speed Vr of the retard roller 7 is larger than the acceleration discriminating threshold, the control element 10 causes the process to go to S2239. In S2239, the control element 10 changes the storing time tr, as described with reference to (b) of FIG. 17, e.g., from tr to tw (<tr), and causes the process to go to S2240. In S2238, in the case where the control element 10 discriminates that the current peripheral speed Vr of the retard roller 7 is not more than the acceleration discriminating threshold, the control element 10 causes the process to go to S2240. Incidentally, the process of S2240-S2245 is the same as the process of S2216-S2221 of FIG. 19, and therefore will be omitted from description. In S2246, the control element 10 returns the extended storing time, e.g., from tw to tr and returns the process to S2235. Incidentally, the process of waiting for the predetermined time of FIG. 19, the process of changing the deceleration discriminating threshold of FIG. 20, and the process of changing the restoring time of FIG. 21 are described separately, but as shown in (b) of FIG. 16, the change in deceleration discriminating threshold and the change in restoring time may also be carried out in combination. That is, at least one of the processes from FIG. 19 to FIG. 21 may only be required to be carried out, and a plurality of processes may also be carried out in combination.

As described above, even in the case where the peripheral speed Vr of the retard roller 7 largely fluctuates locally due to the shock at the timing tp, the rotation of the pick roller 5 is continued, so that the leading end of the sheet S2 can be caused to reach the separation nip. Therefore, it is possible to provide the sheet feeding device capable of reducing the sheet feeding variation Ld and narrowing the sheet feeding interval. Also in this embodiment, similarly as in Embodiments 1 to 5, the constitution should be appropriately changed depending on the device to which the present invention is applied, and therefore even in such a case, a similar effect can be obtained.

As described above, according to this embodiment, with an inexpensive constitution, a variation in leading end position of the sheets when the sheets are fed is reduced, so that the sheet feeding interval can be shortened.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-241223 filed on Dec. 10, 2015, which is hereby incorporated by reference herein in its entirety.

What is claimed is:

1. A sheet feeding device comprising:
   a stacking portion on which a plurality of recording materials are stacked;
   a feeding rotary member configured to feed the plurality of recording materials stacked on the stacking portion one by one, wherein the feeding rotary member feeds a first recording material which is an uppermost recording material stacked on the stacking portion and feeds a second recording material positioned under the first recording material;
   a conveying rotary member configured to convey the recording material fed by the feeding rotary member;
   a separating rotary member configured to form a nip with the conveying rotary member, wherein the separating rotary member is rotated in a predetermined direction so as to convey the first recording material when the first recording material is fed to the nip, and the separating rotary member stops in rotation or rotates in a direction opposite to the predetermined direction so as to separate the first recording material and the second recording material when the first recording material and the second recording material are fed to the nip;
   a detecting unit configured to detect a rotational speed of the separating rotary member;
   a driving unit configured to execute a feeding operation by the feeding rotary member;
   a threshold determining unit configured to determine a threshold speed depending on the rotational speed of the separating rotary member detected by the detecting unit in a period in which the separating rotary member is rotated in the predetermined direction in a state where the first recording material is fed to the nip after the feeding operation of the first recording material is started;
   a feeding control unit configured to control the driving unit to execute the feeding operation of the second recording material subsequently to passing of a trailing end of the first recording material through the feeding rotary member in an overlapping state where the first recording material and the second recording material partially overlap,
   wherein, in a case where the rotational speed of the separating rotary member detected by the detecting unit is faster than the threshold speed, the feeding control unit controls the driving unit to continue the feeding operation of the second recording material,
   wherein, in a case where the rotational speed of the separating rotary member detected by the detecting unit becomes slower than the threshold speed while the separating rotary member is rotated in the predetermined direction, the feeding control unit controls the driving unit to stop the feeding operation of the second recording material in a state where a leading end of the second recording material reaches the nip,
   wherein the sheet feeding device further comprises a second detecting unit, provided downstream of the nip with respect to a recording material feeding direction, the second detecting unit being configured to detect a leading end of the recording material, and
   wherein the threshold determining unit determines the threshold speed according to the rotational speed of the separating rotary member in a period from when the second detecting unit detects a leading end of the first recording material to when a distance between the trailing end of the first recording material and the feeding rotary member with respect to the feeding direction becomes a predetermined distance.

2. The sheet feeding device according to claim 1, wherein the threshold speed is faster than 0 and is slower than the rotational speed of the separating rotary member in the period in which the separating rotary member is rotated in the predetermined direction in the state in which the first recording material is fed to the nip.

3. The sheet feeding device according to claim 1, wherein the threshold determining unit acquires the threshold speed by multiplying, by a predetermined deceleration rate, an average rotational speed of the separating rotary member in the period in which the separating rotary member is rotated in the predetermined direction in the state in which the first recording material is fed to the nip.

4. The sheet feeding device according to claim 1, wherein the threshold determining unit acquires the threshold speed for each feeding of the single recording material.

5. The sheet feeding device according to claim 1, wherein when the rotational speed of the separating rotary member detected by the detecting unit becomes faster than the threshold speed before a lapse of a restoring time from the time when the rotational speed of the separating rotary member detected by the detecting unit becomes slower than the threshold speed, the feeding control unit controls the driving unit so as to start the feeding operation again.

6. The sheet feeding device according to claim 5, wherein the threshold determining unit acquires a second threshold speed faster than the threshold speed by multiplying, by a predetermined acceleration rate, an average rotational speed of the separating rotary member in the period in which the separating rotary member is rotated in the predetermined direction in the state in which the first recording material is fed to the nip, and
   wherein when the rotational speed detected by the detecting unit is faster than the second threshold speed, the control unit executes at least one of a process of changing the threshold speed to a slower rotational speed, a process of extending the restoring time, and a process of stand by for a predetermined time.

7. The sheet feeding device according to claim 1, further comprising:
   a second conveying rotary member provided between the nip and the second detecting unit with respect to the recording material feeding direction and configured to convey the recording material fed by the conveying rotary member,
   wherein the feeding control unit controls the driving unit so as to continue the feeding operation until at least the second detecting unit detects the leading end of the first recording material even when the rotational speed of the separating rotary member is slower than the threshold speed, and controls the driving unit so as to stop the feeding operation after the second detecting unit detects the leading end of the first recording material.

8. The sheet feeding device according to claim 1, further comprising a third detecting unit configured to detect presence or absence of the recording material stacked on the stacking portion,
   wherein when the third detecting unit detects absence of the recording material stacked on the stacking portion, the feeding control unit controls the driving unit so as to stop the feeding operation before the feeding rotary member contacts with the stacking portion.

9. The sheet feeding device according to claim 1, wherein the detecting unit includes (a) a code wheel provided coaxially with the separating rotary member and rotating together with the separating rotary member and (b) a rotation detecting element configured to output a state signal depending on a rotation state of the code wheel.

10. The sheet feeding device according to claim 1, wherein the driving unit includes a motor and an electromagnetic clutch configured to transmit a driving force from the motor to the feeding rotary member, the conveying rotary member, and the separating rotary member,
wherein when the feeding control unit controls the driving unit so as to start the feeding operation, the electromagnetic clutch transmits the driving force from the motor to the respective rollers, and when the control unit controls the driving unit so as to stop the feeding operation, the electromagnetic clutch interrupts the driving force from the motor to the respective rollers.

11. The sheet feeding device according to claim 10, further comprising a torque limiter provided between the separating rotary member and the electromagnetic clutch and configured to apply a load to the separating rotary member,
wherein the load is set so as to be smaller than a force received by the separating rotary member when the first recording material is fed and so as to be larger than a force received by the separating rotary member when the first recording material and the second recording material are fed in the overlapping state.

12. The sheet feeding device according to claim 11, further comprising a one-way clutch provided between the electromagnetic clutch and the torque limiter,
wherein when connection of the electromagnetic clutch is interrupted, the one-way clutch does not permit rotation of the separating rotary member in the predetermined direction but permits rotation of the separating rotary member in the direction opposite to the predetermined direction.

13. The sheet feeding device according to claim 11, further comprising a speed changing mechanism provided between the electromagnetic clutch and the torque limiter,
wherein the speed changing mechanism includes a driving train decelerating from the electromagnetic clutch toward the separating rotary member.

14. The sheet feeding device according to claim 1, wherein the driving unit includes a motor and an electromagnetic clutch configured to transmit a driving force from the motor to the feeding rotary member and the conveying rotary member,
wherein when the feeding control unit controls the driving unit so as to start the feeding operation, the electromagnetic clutch transmits the driving force from the motor to the respective rollers, and when the control unit controls the driving unit so as to stop the feeding operation, the electromagnetic clutch interrupts the driving force from the motor to the respective rollers.

15. The sheet feeding device according to claim 14, further comprising a torque limiter fixed at an end thereof and configured to apply a load to the conveying rotary member,
wherein the load is set so as to be smaller than a force received by the separating rotary member when the first recording material is fed and so as to be larger than a force received by the separating rotary member when the first recording material and the second recording material are fed in the overlapping state.

16. The sheet feeding device according to claim 1, wherein the rotational speed of the separating rotary member detected by the detecting unit is a peripheral speed of the separating rotary member or a rotational frequency of the separating rotary member.

17. A sheet feeding device comprising:
a stacking portion on which a plurality of recording materials are stacked;
a feeding rotary member configured to feed the plurality of recording materials stacked on the stacking portion one by one, wherein the feeding rotary member feeds a first recording material which is an uppermost recording material stacked on the stacking portion and a second recording material positioned under the first recording material;
a conveying rotary member configured to convey the recording material fed by the feeding rotary member;
a separating rotary member configured to form a nip with the conveying rotary member, wherein the separating rotary member is rotated in a predetermined direction so as to convey the first recording material when the first recording material is fed to the nip, and the separating rotary member stops in rotation or rotates in a direction opposite to the predetermined direction so as to separate the first recording material and the second recording material when the first recording material and the second recording material are fed to the nip;
a detecting unit provided upstream of the nip with respect to a recording material feeding direction and configured to detect a feeding speed of the recording material;
a driving unit configured to execute a feeding operation by the feeding rotary member; and
a threshold determining unit configured to determine a threshold speed depending on the feeding speed of the recording material detected by the detecting unit in a period in which the separating rotary member is rotated in the predetermined direction in a state where the first recording material is fed to the nip after the feeding operation of the first recording material is started;
a feeding control unit configured to control the driving unit to execute the feeding operation of the second recording material subsequently to passing of a trailing end of the first recording material through the feeding rotary member in an overlapping state where the first recording material and the second recording material partially overlap,
wherein, in a case where the feeding speed detected by the detecting unit is faster than the threshold speed, the feeding control unit controls the driving unit to continue the feeding operation of the second recording material,
wherein, in a case where the feeding speed detected by the detecting unit becomes slower than the threshold speed while the separating rotary member is rotated in the predetermined direction, the feeding control unit controls the driving unit to stop the feeding operation of the second recording material in a state where a leading end of the second recording material reaches the nip,
wherein the sheet feeding device further comprises a second detecting unit, provided downstream of the nip with respect to a recording material feeding direction, the second detecting unit being configured to detect a leading end of the recording material, and
wherein the threshold determining unit determines the threshold speed according to the rotational speed of the separating rotary member in a period from when the second detecting unit detects a leading end of the first recording material to when a distance between the trailing end of the first recording material and the feeding rotary member with respect to the feeding direction becomes a predetermined distance.

18. A sheet feeding device comprising:
a stacking portion on which a plurality of recording materials are stacked;
a feeding rotary member configured to feed the plurality of recording materials stacked on the stacking portion one by one, wherein the feeding rotary member feeds a first recording material which is an uppermost recording material stacked on the stacking portion and a second recording material positioned under the first recording material;
a conveying rotary member configured to convey the recording material fed by the feeding rotary member;
a separating rotary member configured to form a nip with the conveying rotary member, wherein the separating rotary member is rotated in a predetermined direction so as to convey the first recording material when the first recording material is fed to the nip, and the separating rotary member stops in rotation or rotates in a direction opposite to the predetermined direction so as to separate the first recording material and the second recording material when the first recording material and the second recording material are fed to the nip;
a detecting unit configured to detect a rotational speed of the separating rotary member;
a driving unit configured to execute a feeding operation by the feeding rotary member; and
a feeding control unit configured to control the driving unit to execute the feeding operation of the second recording material subsequently to passing of a trailing end of the first recording material through the feeding rotary member in an overlapping state where the first recording material and the second recording material partially overlap,
wherein, in a case where the rotational speed of the separating rotary member detected by the detecting unit does not continuously decrease a number of times exceeding a threshold number of times, the feeding control unit controls the driving unit to continue the feeding operation of the second recording material, and
wherein, in a case where the rotational speed of the separating rotary member continuously decreases a number of times exceeding the threshold number of times, the feeding control unit controls the driving unit to stop the feeding operation of the second recording material in a state where a leading end of the second recording material reaches the nip.

* * * * *